United States Patent
Terada et al.

(10) Patent No.: US 6,611,601 B2
(45) Date of Patent: Aug. 26, 2003

(54) ECHO SOUND SIGNAL SUPPRESSING APPARATUS

(75) Inventors: Yasuhiro Terada, Yokohama (JP); Minoru Matsui, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 66 days.

(21) Appl. No.: 10/047,657

(22) Filed: Jan. 15, 2002

(65) Prior Publication Data

US 2002/0126855 A1 Sep. 12, 2002

(30) Foreign Application Priority Data

Jan. 22, 2001 (JP) .......................................... 2001-012871

(51) Int. Cl.[7] ................................................. H04B 3/20
(52) U.S. Cl. ................. 381/66; 379/406.01; 379/406.15
(58) Field of Search .............................. 381/66, 71.11, 381/71.8; 379/406.01–406.16; 370/286, 289

(56) References Cited

U.S. PATENT DOCUMENTS

| | | | | |
|---|---|---|---|---|
| 4,894,820 A | * | 1/1990 | Miyamoto et al. | 379/406.01 |
| 5,305,309 A | * | 4/1994 | Chujo et al. | 370/286 |
| 5,353,348 A | * | 10/1994 | Sendyk et al. | 379/406.08 |
| 5,463,618 A | * | 10/1995 | Furukawa et al. | 370/289 |
| 5,633,936 A | * | 5/1997 | Oh | 381/66 |
| 5,661,795 A | * | 8/1997 | Maeda | 379/406.05 |
| 5,699,424 A | * | 12/1997 | Hirano | 379/406.08 |
| 5,761,318 A | * | 6/1998 | Shimauchi et al. | 381/66 |
| 5,818,945 A | * | 10/1998 | Makino et al. | 381/66 |
| 5,937,060 A | * | 8/1999 | Oh | 379/406.01 |
| 6,049,606 A | * | 4/2000 | Ding et al. | 381/66 |
| 6,173,058 B1 | * | 1/2001 | Takada | 381/66 |
| 6,266,422 B1 | * | 7/2001 | Ikeda | 381/71.11 |

* cited by examiner

*Primary Examiner*—Xu Mei
(74) *Attorney, Agent, or Firm*—Pearne & Gordon LLP

(57) ABSTRACT

An echo sound signal suppressing apparatus for suppressing an echo sound signal to ensure speech communication between a far-end speaker and a near-end speaker, comprising: first power value calculating means for calculating the power value of the second sound signal; second power value calculating means for calculating the power value of the echo replica sound signal produced by the echo replica sound signal producing means; echo sound suppressing means for suppressing the echo sound difference signal component outputted from the difference signal producing means to a minimum level with the power value of the second sound signal calculated by the first power value calculating means and the power value of the echo replica sound signal calculated by second power value calculating means with the near-end speaker sound signal component being allowed to pass therethrough, the echo sound suppressing means having an output terminal to the communication line to output the near-end speaker sound signal component under the condition that the echo sound signal component is reduced to its smallest level.

69 Claims, 29 Drawing Sheets

ECHO SOUND SIGNAL SUPPRESSING APPARATUS

BACKGROUND OF THE INVENTION

1. Technical Field of the Invention

The present invention relates to an echo sound signal suppressing apparatus for and an echo sound signal suppressing method of suppressing an echo sound signal to ensure an echo-reduced interactive speech communication among far-end speakers and near-end speakers in at least two conference rooms distant from each other and each having therein a hand-free speakerphone provided to enable both the speakers to speak and listen with no handset microphone-speaker unit, and more particularly to an echo sound signal suppressing apparatus and an echo sound signal suppressing method which can enhance the quality of a second sound from the near-end speakers to be received by the far-end speakers by discriminating the second sound signal component from the echo sound signal component and the outside noise signal generated in the neighborhood of the near-end speakers.

2. Description of the Related Art

Up until now, there have been proposed a wide variety of echo sound signal suppressing apparatuses of this type one typical example of which is shown in FIG. 29. The conventional echo sound signal suppressing apparatus used for the interactive speech communication between the far-end speakers and the near-end speakers will be described hereinafter with reference to only two speakers including a far-end speaker and a near-end speaker for brevity. The conventional echo sound signal suppressing apparatus comprises a first amplifier 4, a loudspeaker 1, a microphone 2, a second amplifier 5, an input terminal 10, and an output terminal 11.

The first amplifier 4 is designed to amplify a first sound signal from the far-end speaker. The first sound signal comprises a far-end speaker sound signal component indicative of the far-end speaker sound from far-end speaker and a first noise signal component indicative of the far-end outside noises generated in the neighborhood of the far-end speaker, the first sound signal having a power value, and the first noise signal component having a power value. The loudspeaker 1 is adapted to output a first sound in its loudened state after converting the first sound signal from the far-end speaker to the first sound, the loudspeaker 1 having an input terminal connected to a communication line to have the first sound signal pass therethrough.

The microphone 2 is operative to input three different sounds before converting the three different sounds to a second sound signal. The three different sounds comprises a second sound from the near-end speaker, an echo sound indicative of the first sound reflected under the influence of the objects outside the near-end speaker, and near-end outside noises generated in the neighborhood of the near-end speaker. The objects include attendants taking part in the conference, and other bodies serving to reflect sounds. The second sound signal comprises a near-end speaker sound signal component indicative of the second sound from the near-end speaker, an echo sound signal component indicative of the echo sound, and a second noise signal component indicative of the near-end outside noises generated in the neighborhood of the near-end speaker. The second sound signal has a power value, and the second noise signal component has a power value. The second amplifier 5 is designed to amplify the second sound signal received by the microphone 2. The conventional echo sound signal suppressing apparatus further comprises echo replica sound signal producing means 8b, difference signal producing means 8c, attenuation level calculating means 7, and echo sound suppressing means 6. The echo replica sound signal producing means 8b is designed to produce an echo replica sound signal based on both the first sound signal and the second sound signal and having a power value. The difference signal producing means 8c is operative to produce a difference signal by subtracting the echo replica sound signal from the second sound signal. The difference signal comprises the near-end speaker sound signal component and a difference signal component indicative of subtracting the echo replica sound signal from the second sound signal. The difference signal component has a power value, and the difference signal has a power value.

The attenuation level calculating means 7 is designed to divide three different information comprising the first sound signal, the second sound signal, and the difference signal into a plurality of frames along the time axis to calculate three different power values of the sequential frame comprising a power value of the first sound signal of the sequential frame, a power value of the second sound signal of the sequential frame, and a power value of the difference signal of the sequential frame before calculating an evaluation value of the power value of the difference signal of the sequential frame. The evaluation value of the power value of the difference signal is calculated by the following equation (1), $$EC(n) = 10\log_{10} \sum_{i=0}^{L-1} e(n-i)^2 \bigg/ \sum_{i=0}^{L-1} y(n-i)^2 \quad (1)$$

wherein the legend "EC(n)" is indicative of the evaluation value of the power value of the difference signal of the sequential frame, the legend "e(n−i)" is indicative of the difference signal, and the legend "y(n−i)" is indicative of the second sound signal.

The attenuation level calculating means 7 is also designed to compare the power value of the difference signal of the current frame with the power value of the difference signal of the preceding frame to judge whether or not the sequences of the evaluation value of the power value of the difference signal for each of the sequential frame tend to a convergence value. The attenuation level calculating means 7 further serves to calculate an attenuation level sufficient to suppress the echo sound signal based on the four different information comprising the power value of the first sound signal, the power value of the second sound signal, the power value of the difference signal, and the convergence value when the attenuation level calculating means 7 is designed to judge whether or not the convergence value of the power value of the difference signal of the sequential frame exceeds a predetermined threshold value while the attenuation level calculating means 7 is designed to judge whether or not the power value of the far-end speaker sound signal exceeds a predetermined threshold power value.

The echo sound suppressing means 6 is operative to suppress the echo sound signal to output the near-end speaker sound signal with the suppressed echo sound signal component based on the attenuation value after receiving the attenuation value from the attenuation level calculating means 7. The echo sound signal not suppressed leads to the fact that the conventional echo sound signal suppressing apparatus tends to output the second sound signal with the echo sound signal to the far-end speaker when the attenuation level calculating means 7 is designed to make judgments as the power value of the difference signal exceeds a predetermined threshold value under the condition that the echo sound indicative of the first sound reflected under the influence of the fluctuation of the objects outside of the near-end speaker is received by the microphone, while the near-end speaker does not speak.

The second sound signal inputted from the microphone 2 to the attenuation level calculating means 7 through the amplifier 5 contains a far-end sound signal component, an echo sound signal component, and a second noise signal component mixed to one another. The near-end sound signal component of the second sound signal thus mixed cannot be discriminated by the attenuation level calculating means 7 from the echo sound signal component and the second noise signal component, thereby making it impossible for the echo sound signal suppressing apparatus to suppress only the echo sound signal component and the noise signal component to a minimum level. The echo sound signal component thus not suppressed results in deteriorating the quality of the second sound of the near-end speaker during the interactive speech communication between the far-end speaker and the near-end speaker. In other words, the echo sound signal suppressing apparatus makes it impossible for the far-end speaker to receive a clear sound from the near-end speaker without echo and outside noises generated in the neighborhood of the near-end speaker.

SUMMARY OF THE INVENTION

It is, therefore, an object of the present invention to provide an echo sound signal suppressing apparatus which can enhance the quality of the second sound from the near-end speaker to be received by the far-end speaker by discriminating the second sound signal component from the echo sound signal component and the outside noise signal generated in the neighborhood of the near-end speaker.

It is another object of the present invention to provide an echo sound signal suppressing apparatus which can suppress the echo sound signal component and the outside noises signal to a minimum level to realize echo and noises reduced interactive speech communication between the far-end speaker and the near-end speaker without the echo and noises and with the clear sound received by the far-end speaker.

The first aspect of the echo sound signal suppressing apparatus according to present invention comprising: a loudspeaker for outputting a first sound in its loudened state after converting a first sound signal from the far-end speaker to the first sound, the loudspeaker having an input terminal connected to a communication line to have the first sound signal pass therethrough, the first sound signal comprising a far-end speaker sound signal component indicative of a first sound from the far-end speaker, and a first noise signal component indicative of far-end outside noises generated in the neighborhood of the far-end speaker, the first noise signal component having a power value; a microphone for inputting three different sounds before converting the three different sounds to a second sound signal, the three different sounds comprising a second sound from the near-end speaker, an echo sound indicative of the first sound reflected under the influence of the objects outside the near-end speaker, and near-end outside noises generated in the neighborhood of the near-end speaker, the second sound signal comprising a near-end speaker sound signal component indicative of the second sound from the near-end speaker, an echo sound signal component indicative of the echo sound, and a second noise signal component indicative of the near-end outside noises generated in the neighborhood of the near-end speaker, the second sound signal having a power value, and the second noise signal component having a power value; echo replica sound signal producing means for producing an echo replica sound signal with the first sound signal and the second sound signal, the echo replica sound signal having a power value; difference signal producing means for producing a difference signal by subtracting the echo replica sound signal from the second sound signal, the difference signal comprising the near-end speaker sound signal component and a difference signal component indicative of subtracting the echo replica sound signal from the second sound signal, and having a power value; first power value calculating means for calculating the power value of the second sound signal; second power value calculating means for calculating the power value of the echo replica sound signal produced by the echo replica sound signal producing means; echo sound suppressing means for suppressing the echo sound difference signal component outputted from the difference signal producing means to a minimum level with the power value of the second sound signal calculated by the first power value calculating means and the power value of the echo replica sound signal calculated by second power value calculating means with the near-end speaker sound signal component being allowed to pass therethrough, the echo sound suppressing means having an output terminal to the communication line to output the near-end speaker sound signal component under the condition that the echo sound signal component is reduced to its smallest level.

The second aspect of the echo sound signal suppressing apparatus according to present invention comprising: first filtering means for filtering the second sound signal to be discharged to the first power value calculating means as a band-limited second sound signal indicative of the second sound having a frequency bandwidth limited to a predetermined frequency range; and second filtering means for filtering the echo replica signal to be discharged to the second power value calculating means as a band-limited echo replica signal indicative of the echo replica signal having a frequency bandwidth limited to a predetermined frequency range; and in which the first power value calculating means is operative to calculate the power value of the band-limited second sound signal of the sequential frame after receiving the band-limited second sound signal from the first filtering means; and the second power value calculating means is operative to calculate the power values of the band-limited echo replica sound signals of the sequential frames after receiving the band-limited echo replica sound signal from the second filtering means, echo sound suppressing means for suppressing the echo sound difference signal component outputted from the difference signal producing means to a minimum level with the power value of the band-limited second sound signal calculated by the first power value calculating means and the power value of the band-limited echo replica sound signal calculated by second power value calculating means with the near-end speaker sound signal component being allowed to pass therethrough, the echo sound suppressing means having an output terminal to the communication line to output the near-end speaker sound signal component under the condition that the echo sound signal component is reduced to its smallest level.

The third aspect of the echo sound signal suppressing apparatus according to present invention comprising: first sound signal dividing means for dividing the first sound signal into a plurality of sub-band section along a frequency axis of the first sound signal, the first sound signal of the sub-band section comprising a far-end speaker sound signal component of the sub-band section and a first noise signal component of the sub-band section; second sound signal dividing means for dividing the second sound signal into a plurality of the sub-band section along the frequency axis of the second sound signal, the second sound signal of the sub-band section comprising a near-end speaker sound signal component of the sub-band section, an echo sound signal component of the sub-band section, and a second noise signal component of the sub-band section, the second noise signal component of the sub-band section having a power value of the sub-band section; and difference signal synthesizing means for synthesizing the difference signal after receiving the difference signals of the sub-band sections; and in which the echo replica sound signal producing means is operative to produce an echo replica sound signal of the sub-band section with the first sound signal of the sub-band section and the second sound signal of the sub-band section, the echo replica sound signal of the sub-band section having a power value of the sub-band section; the difference signal producing means is operative to produce a difference signal of the sub-band section by subtracting the echo replica sound signal of the sub-band section from the second sound signal of the sub-band section, the difference signal of the sub-band section comprising a near-end speaker sound signal component of the sub-band section, a difference signal component of sub-band section indicative of subtracting the echo replica sound signal of the sub-band section from the second sound signal of the sub-band section, and the second noise signal component of the sub-band section, the difference signal of the sub-band section having a power value of the sub-band section; the first power value calculating means is operative to calculate the power value of the second sound signal of the sub-band section; the second power value calculating means is operative to calculate the power value of the echo replica sound signal of the sub-band section; the echo sound suppressing means is operative to suppress the difference signal component of the sub-band section outputted from the difference signal producing means to a minimum level of the sub-band section with the power value of the second sound signal of the sub-band section calculated by the first power value calculating means and the power value of the echo replica sound signal of the sub-band section calculated by the second power value calculating means, the echo sound suppressing means having an output terminal to the communication line to output the near-end speaker sound signal component of the sub-band section under the condition that the echo sound signal component of the sub-band section is reduced to its smallest level of the sub-band section.

BRIEF DESCRIPTION OF THE DRAWINGS

The objects, features and advantages of the present invention will become apparent as the description proceeds when taken in conjunction with the accompanying drawings, in which.

DESCRIPTION OF THE PREFERRED EMBODIMENTS

The embodiments of the echo sound signal suppressing apparatus according to the present invention will be described in detail hereinafter.

The echo sound signal suppressing apparatus according to the present invention will be described hereinafter for brevity with reference to only two speakers including a far-end speaker and a near-end speaker in two conference rooms distant from each other, however, may be of course used for the interactive speech communication between far-end speakers and near-end speakers attending in two conference rooms distant from each other. The echo sound signal suppressing apparatus according to the present invention can of course be used for more than two conference rooms constituting as a whole a communication network.

Figure 1:
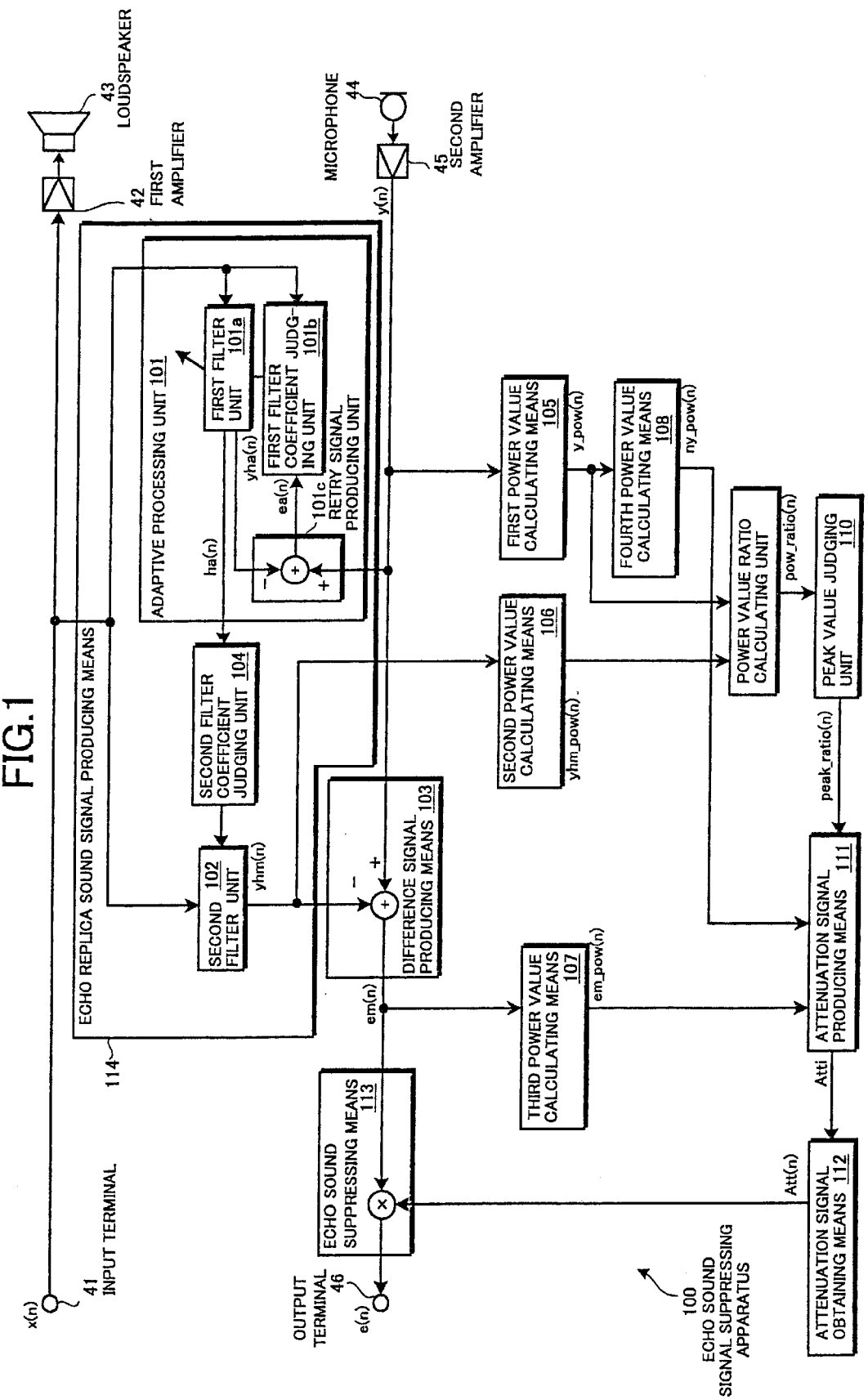
FIG. 1 is a block diagram of the first embodiment of the echo sound signal suppressing apparatus according to the present invention.
Figure 29:
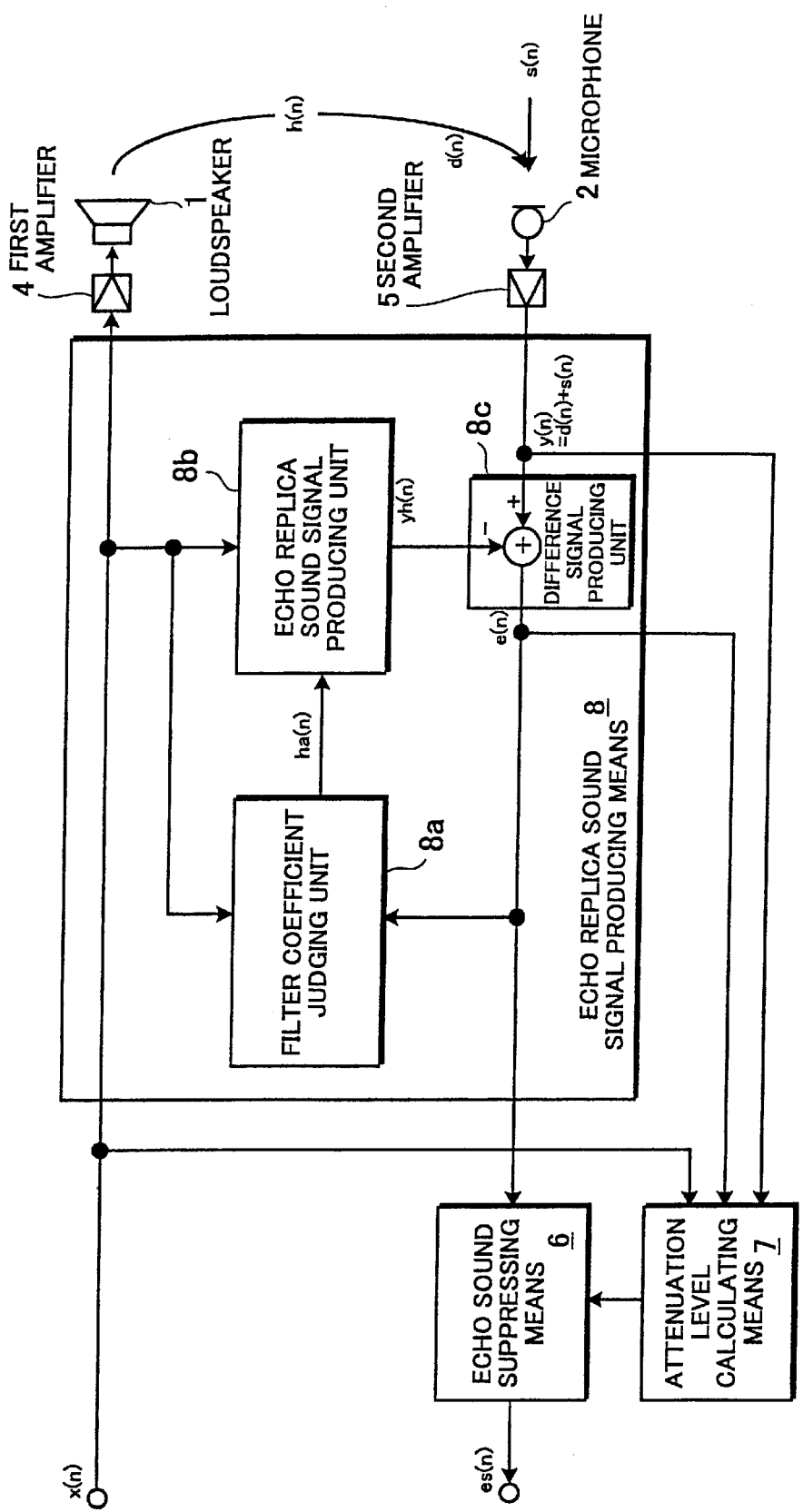
FIG. 29 is a block diagram of the conventional sound signal encoding apparatus.

The first embodiment of the echo sound signal suppressing apparatus 100 according to the present invention is shown in FIG. 1 as partly similar in construction to the conventional echo sound signal suppressing apparatus shown in FIG. 29 and thus comprises a first amplifier 42, a loudspeaker 43, a microphone 44, and a second amplifier 45. The first amplifier 42 is electrically connected through a line to an input terminal 41 to amplify a first sound signal from a far-end speaker. The loudspeaker 43 is operative to output a first sound in its loudened state after converting the first sound signal from the far-end speaker to the first sound, the loudspeaker 43 having an input terminal connected to a communication line to have the first sound signal pass therethrough. The first sound signal comprises a far-end speaker sound signal component indicative of a first sound from the far-end speaker, and a first noise signal component indicative of far-end outside noises generated in the neighborhood of the far-end speaker, the first noise signal component having a power value. The first sound signal is represented by the legend "x(n)". The first noise signal component is represented by the legend "nx(n)".

The microphone 44 is operative to input three different sounds before converting the three different sounds to a second sound signal, the three different sounds comprising a second sound from the near-end speaker, an echo sound indicative of the first sound reflected under the influence of the objects outside the near-end speaker, and near-end outside noises generated in the neighborhood of the near-end speaker. The second sound signal comprises a near-end speaker sound signal component indicative of the second sound from the near-end speaker, an echo sound signal component indicative of the echo sound, and a second noise signal component indicative of the near-end outside noises generated in the neighborhood of the near-end speaker, the second sound signal having a power value, and the second noise signal component having a power value. The second sound signal is represented by the legend "y(n)". The first noise signal component is represented by the legend "ny(n)".

The second amplifier 45 is electrically connected through a line to the microphone 44 to amplify the second sound signal received by the microphone 44. The first embodiment of the echo sound signal suppressing apparatus 100 according to the present invention further comprises echo replica sound signal producing means 114. The echo replica sound signal producing means 114 is operative to produce an echo replica sound signal based on the first sound signal and the second sound signal, the echo replica sound signal having a power value. The echo replica sound signal producing means 114 comprises a first filter unit 101a, a second filter unit 102, a retry signal producing unit 101c, a first filter coefficient judging unit 101b, and a second filter coefficient judging unit 104.

The first filter unit 110a has two input terminals comprising first and second terminals, the above first terminal being electrically connected through a line to the input terminal 41 connected to a communication line to have the first sound signal pass therethrough and the above second terminal being electrically connected through a line to the first filter coefficient judging unit 101b. The first filter unit 101a is adapted to produce a first echo replica sound signal after receiving the first filter coefficient judged by the first filter coefficient judging unit 101b. The first echo replica sound signal component is represented by the legend "yha(n)". The first filter coefficient is represented by the legend "ha(n)".

The second filter unit 102 has two input terminals comprising first and second terminals, the above first terminal being electrically connected through a line to the input terminal 41 connected to a communication line to have the first sound signal pass therethrough and the above second terminal being electrically connected through a line to the second filter coefficient judging unit 104. The second filter unit 102 is adapted to produce an echo replica sound signal after receiving the first filter coefficient judged by the second filter coefficient judging unit 104. The second echo replica sound signal component is represented by the legend "yhm(n)". The first filter coefficient judged by the second filter coefficient judging unit 104 is represented by the legend "hm(n)". The retry signal producing unit 101c has two input terminals comprising first and second terminals, the above first terminal being electrically connected through a line to the first echo replica sound signal producing unit 101a and the above second terminal being electrically connected through a line to the second amplifier 45. The retry signal producing unit 101c is adapted to produce a retry signal on the basis of both the first echo replica sound signal and the second sound signal after receiving both the first echo replica sound signal from the first filter unit 101a and the second sound signal. The retry signal is represented by the legend "ea(n)".

The first filter coefficient judging unit 101b has two input terminals comprising first and second terminals, the above first terminal being electrically connected through a line to the input terminal 41 receiving the first sound signal from the far-end speaker and the above second terminal being electrically connected through a line to the first difference signal producing unit 101c. The first filter coefficient judging unit 101b is adapted to judge whether or not to update a first filter coefficient after calculating the first filter coefficient based on both the first sound signal and the retry signal, the first filter coefficient having the first filter unit 101a produce the first echo replica sound signal together with the first sound signal.

The second filter coefficient judging unit 104 is adapted to judge whether or not to update the first filter coefficient after receiving the first filter coefficient judged by the first filter coefficient judging unit 101b.

The first embodiment of the echo sound signal suppressing apparatus 100 according to the present invention further comprises difference signal producing means 103, first power value calculating means 105, second power value calculating means 106, third power value calculating means 107, and fourth power value calculating means 107. The difference signal producing means 103 is constituted by a difference signal producing unit 103. The difference signal producing unit 103 has two input terminals comprising first and second terminals, the above first terminal being electrically connected through a line to the second filter unit 102 and the above second terminal being electrically connected through a line to the second amplifier 45. The difference signal producing unit 103 is operative to produce a difference signal by subtracting the echo replica sound signal from the second sound signal, the difference signal comprising the near-end speaker sound signal component and a difference signal component indicative of subtracting the echo replica sound signal from the second sound signal, and the difference signal component has a power value. The second difference signal is represented by the legend "em(n)".

The first power value calculating means 105 is constituted by a power value calculating unit 105. The power value calculating unit 105 is electrically connected through a line to the second amplifier 45. The power value calculating unit 105 is operative to divide the second sound signal into a plurality of sequential frames along the time axis to calculate the power value of the second sound signal of the sequential frame. The term "power value" herein described is intended to indicate the square of the voltage between the above mentioned line and the ground line as will be seen for example in U.S. Pat. Nos. 5,721,772, 5,539,731, and 5,463,618. The power value of the second sound signal of the sequential frame is represented by the legend "y_pow(n)".

The calculation of the power value of the second sound signal of the sequential frame is performed by the following equation (2) for calculating the power value of the second sound signal of the sequential frame.

$$y\_pow(n) = \sum_{i=0}^{L-1} y(n-i)^2 \quad (2)$$

wherein the legend "n" is indicative of the serial number of the sampled second sound signal and the legend "L" is indicative of the number of the sampled second sound signal of the sequential frame. The number of the sampled second sound signal of the sequential frame is calculated with, for example, the sampling rate 16[kHz] and the time width of sequential frame 20[msec], as will be seen from the following equation (3).

$$L=16[kHz]*20[msec]=320 \quad (3)$$

From the above detailed description, it will be understood that the power value of the second sound signal is indicative of the summation of the square of the second sound signal sampled at the sampling points 320. The second power value calculating means 106 is constituted by a power value calculating unit 106. The power value calculating unit 106 is electrically connected through a line to the second filter unit 102. The power value calculating unit 106 is designed to divide the echo replica sound signal into a plurality of the sequential frames along the time axis to calculate the power value of the echo replica sound signal of the sequential frame produced by the second filter unit 102. The power value of the second echo replica sound signal of the sequential frame is represented by the legend "yhm_pow".

The calculation of the power value of the echo replica sound signal of the sequential frame is performed by the following equation (4) for calculating the power value of the echo replica sound signal of the sequential frame, $$yhm\_pow(n) = \sum_{i=0}^{L-1} yhm(n-i)^2 \quad (4)$$

wherein the legend "n" is indicative of the serial number of the sampled echo replica sound signal and the legend "L" is indicative of the number of the sampled echo replica sound signal of the sequential frame.

The third power value calculating means 107 is constituted by a power value calculating unit 107. The power value calculating unit 107 is electrically connected through a line to the difference signal producing unit 103 to divide the difference signal into a plurality of the sequential frames along the time axis to calculate the power value of the difference signal of the sequential frame. The power value of the difference signal of the sequential frame is represented by the legend "em_pow".

The calculation of the power value of the difference signal of the sequential frame is performed by the following equation (5) for calculating the power value of the difference signal of the sequential frame, $$em\_pow(n) = \sum_{i=0}^{L-1} em(n-i)^2 \quad (5)$$

wherein the legend "n" is indicative of the serial number of the sampled second difference signal and the legend "L" is indicative of the number of the sampled difference signal of the sequential frame.

The fourth power value calculating means 108 is constituted by a power value calculating unit 108. The power value calculating unit 108 is electrically connected through a line to the power value calculating unit 105 to calculate the power value of the second noise signal of the sequential frame based on the judgment whether or not the power value of the second sound signal of the current frame exceeds the power value of the second noise signal of the preceding frame after receiving the power value of the second sound signal of the sequential frame calculated by the power value calculating unit 105.

The power value of the second noise signal of the sequential frame is calculated by two different ways comprising first and second ways on the basis of the judgment whether or not the power value of the second sound signal of the current frame exceeds the power value of the second noise signal of the preceding frame after receiving the power value of the second sound signal of the sequential frame calculated by the power value calculating unit 105.

The first way means that the power value "y_pow(n)" of the second sound signal of the current frame is substituted for the power value "ny_pow(n)" of the second noise signal of the current frame when the power value calculating unit 108 is operative to judge as the power value "y_pow(n)" of the second sound signal of the current frame does not exceed the power value "ny_pow(n−1)" of the second noise signal of the preceding frame.

The second ways means that the power value "ny_pow(n−1)" of the second sound signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the power value calculating unit 108 is adapted to judge as the power value "y_pow(n)" of the second sound signal of the current frame exceeds the power value "ny_pow(n−1)" of the second noise signal of the preceding frame.

The attenuation signal producing means 111 is operative to produce an attenuation signal after receiving the power value of the second sound signal calculated by the power value calculating unit 105 and the power value of the echo replica sound signal calculated by the power value calculating unit 106. The attenuation signal producing means 111 comprises a power value ratio calculating unit 109, a peak value judging unit 110, and an attenuation signal judging unit 111.

The power value ratio calculating unit 109 has first and second input terminals, the above first input terminal being electrically connected through a line to the power value calculating unit 105, and the above second input terminal being electrically connected through a line to the power value calculating unit 106. The power value ratio calculating unit 109 is adapted to calculate the ratio of the power value of the second sound signal of the sequential frame calculated by the power value calculating unit 105 to the power value of the echo replica sound signal of the sequential frame calculated by the power value calculating unit 106. The ratios of the power value of the second sound signal of the sequential frame to the power value of the echo replica sound signal of the sequential frame have a peak value. The ratios of the power value of the second sound signal of the sequential frame to the power value of the echo replica sound signal of the sequential frame have a ratio of the power value of the second sound signal of the current frame to the power value of the echo replica sound signal of the current frame, and the ratio of the power value of the second sound signal of the preceding frame to the power value of the echo replica sound signal of the preceding frame.

The power value ratio of the power value of the second sound signal of the current frame to the power value of the echo replica sound signal of the current frame is represented by the legend "pow_ratio(n)". The power value ratio of the power value of the second sound signal of the preceding frame to the power value of the echo replica sound signal of the preceding frame is represented by the legend "pow_ratio(n−1)".

The peak value judging unit 110 is electrically connected through a line to the power value ratio calculating unit 109. The peak value judging unit 110 is adapted to judge whether or not the ratio of the power value of the second sound signal of the current frame to the power value of the echo replica sound signal of the current frame exceeds the ratio of the power value of the second sound signal of the preceding frame to the power value of the echo replica sound signal of the preceding frame to calculate a peak value of the ratio of the power value of the second sound signal of the sequential frame to the power value of the echo replica sound signal of the sequential frame.

The peak value of the ratio of the current frame is represented by the legend "peak_ratio(n)". The peak value of the ratio of the preceding frame is represented by the legend "peak_ratio(n−1)".

The peak value "peak_ratio(n)" of ratio of the sequential frame is calculated by two different ways comprising first and second ways on the basis of the judgment whether or not the ratio "pow_ratio(n)" of the power value of the second sound signal of the current frame to the power value of the echo replica sound signal of the current frame exceeds the ratio "pow_ratio(n−1)" of the power value of the second sound signal of the preceding frame to the power value of the echo replica sound signal of the preceding frame after receiving the ratio "pow_ratio(n)" of the power value of the second sound signal of the sequential frame calculated by the power value ratio calculating unit 109.

The first way means that the ratio "pow_ratio(n)" of the power value of the second sound signal of the current frame to the power value of the echo replica sound signal of the current frame is substituted for the peak value "peak_ratio(n)" of the ratio of the current frame when the peak value judging unit 110 is adapted to judge as the ratio "pow_ratio(n)" of the power value of the second sound signal of the current frame to the power value of the echo replica sound signal of the current frame exceeds the ratio "pow_ratio(n−1)" of the power value of the second sound signal of the preceding frame to the power value of the echo replica sound signal of the preceding frame.

The second way means that peak value "peak_ratio(n−1)" of the ratio of the preceding frame multiplied by a predetermined updating constant value "Ldn" (the predetermined updating constant value Ldn<1), Ldn * peak_ratio(n−1) is substituted for the peak value "peak_ratio(n)" of the ratio of the current frame when the peak value judging unit 110 is adapted to judge as the ratio "pow_ratio(n)" of the power value of the second sound signal of the current frame to the power value of the echo replica sound signal of the current frame does not exceed the ratio "pow_ratio(n−1)" of the power value of the second sound signal of the preceding frame to the power value of the echo replica sound signal of the preceding frame.

The attenuation signal judging unit 111 is electrically connected through a line to the power value calculating unit 105, the power value calculating unit 106, and the peak value judging unit 110. The attenuation signal judging unit 111 is adapted to judge whether or not the ratio of the power value of the second sound signal of the sequential frame to the power value of the echo replica sound signal of the sequential frame exceeds a predetermined threshold power value to calculate and produce an attenuation signal after receiving the peak value of the ratio of the power value of the second sound signal of the sequential frame calculated by the power value calculating unit 105 to the power value of the echo replica sound signal of the sequential frame calculated by the power value calculating unit 106, and the power value of the difference signal of the sequential frame calculated by the power value calculating unit 107.

The attenuation signal "Atti" of the sequential frame is calculated by the two different ways comprising first and second ways on the basis of the judgment whether or not the ratio of the power value of the second sound signal of the sequential frame to the power value of the echo replica sound signal of the sequential frame exceeds the predetermined threshold power value.

The first way means that a numeral number "1" is substituted for the attenuation signal "Atti" when the ratio of the power value of the second sound signal of the sequential frame to the power value of the echo replica sound signal of the sequential frame exceeds the predetermined threshold value "α" (the predetermined threshold value α>1).

The second way means that the attenuation signal "Atti" is calculated by the following equation (6) when the ratio of the power value of the second sound signal of the sequential frame to the power value of the echo replica sound signal of the sequential frame does not exceed the predetermined threshold value "α".

$$Atti=(ny\_pow(n)/em\_pow(n))^{1/2} \quad (6)$$

The attenuation signal obtaining means 112 is constituted by an attenuation signal obtaining unit 112. The attenuation signal obtaining unit 112 is electrically connected through a line to the attenuation signal producing unit 111 to receive the attenuation signal produced by the attenuation signal producing unit 111. The attenuation signal obtaining unit 112 is operative to obtain an attenuation signal of the sequential frame through calculating the following equation (7):

$$Att(n)=Att(n-1)+Lts*(Atti-Att(n-1)) \quad (7)$$

where the legend "Lts" is indicative of a predetermined value (0<Lts<1). The legend "Atti" is indicative of the attenuation signal. The legend "Att(n)" is indicative of the square root of the ratio of the power value of the second noise signal component of the current frame to the power value of the difference signal of the current frame. The legend "Att(n−1)" is indicative of the square root of the ratio of the power value of the second noise signal component of the preceding frame to the power value of the difference signal of the preceding frame.

Figure 22:
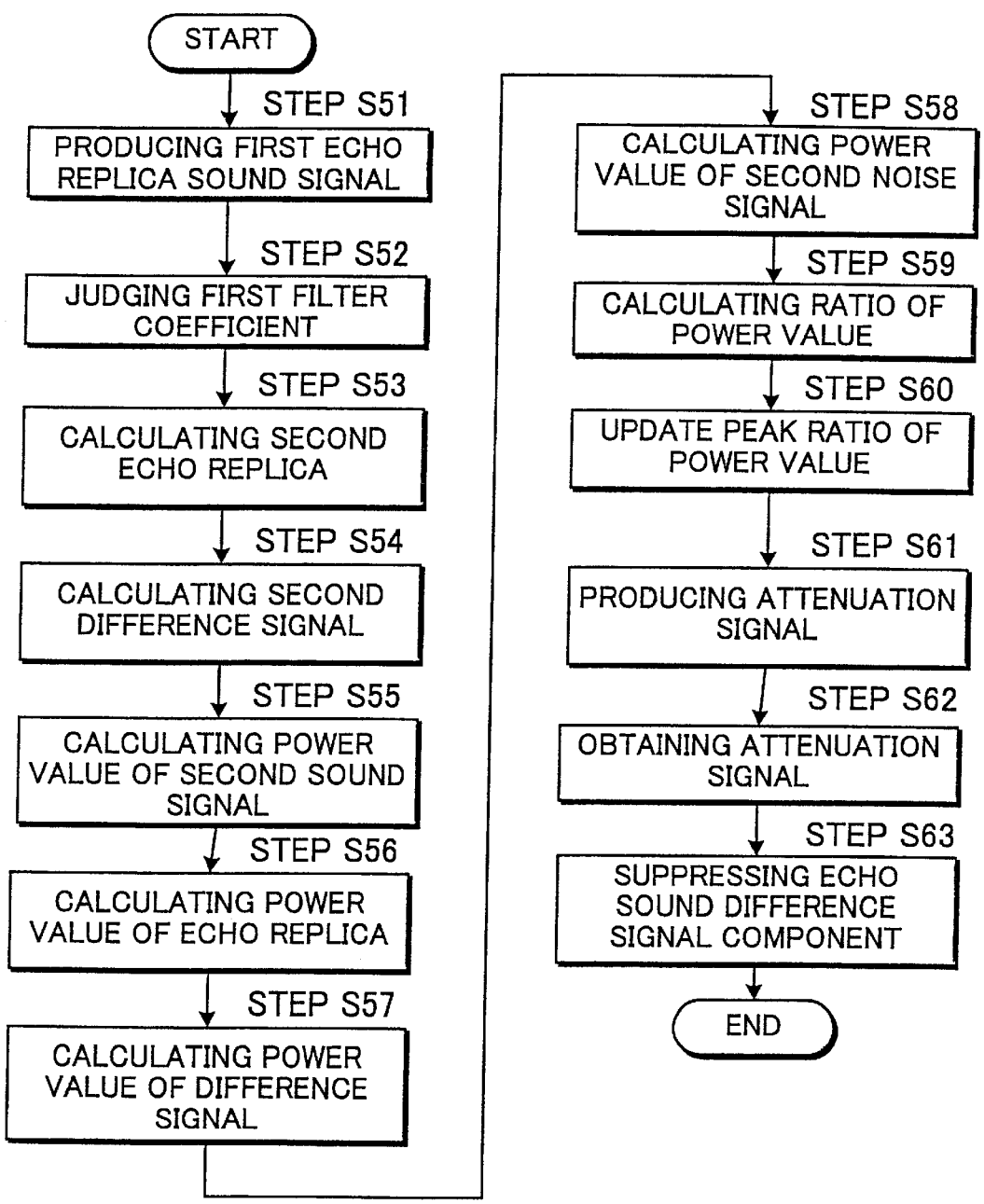
FIG. 22 is a flow chart of the exemplified process of the first embodiment of the echo sound signal suppressing apparatus shown in FIG. 1.

The following description will now be directed to the process of the first embodiment of the echo sound signal suppressing apparatus 100 according to the present invention with reference to FIGS. 1 and 22.

The first echo replica sound signal is initially produced in the step S51 on the basis of the first sound signal and the second sound signal by the adaptive processing unit 101. This step S51 has three different steps comprising first to third steps. The first step is of producing the echo replica sound signal based on a filter coefficient, the first sound signal and the second sound signal by the first filter unit 101a. The second step is of producing the retry signal indicative of the difference between the first echo replica sound signal and the second sound signal by the retry signal producing unit 101c. The third step is of judging whether or not to update the filter coefficient based on the retry signal by the first filter coefficient judging unit 101b. When the answer in third step is in the affirmative "YES", i.e., the filter coefficient is updated, the third step returns to the first step. The first step is of producing the echo replica sound signal based on the updated filter coefficient. When, on the other hand, the answer in third step is in the negative "NO", i.e., the filter coefficient is not updated, the third step proceeds to the step S52.

The judgment is then made on whether or not to update the filter coefficient in the step S52 by the second filter coefficient judging unit 104. The updating of the filter coefficient is executed at predetermined interval. The step S52 proceeds the step S53.

The second echo replica sound signal indicative of the replica of the echo sound signal component is then produced in the step S53 by the second filter unit 102 on the basis of the filter coefficient judged in the step S52.

The difference signal subtracting the second echo replica sound signal from the second sound signal is then produced in the step S54 by the difference signal producing unit 103.

The power value of the second sound signal of the sequential frame is then calculated in the step S55 by the power value calculating unit 105.

The power value of the echo replica sound signal of the sequential frame is then calculated in the step S56 by the power value calculating unit 106.

The power value of the difference signal of the sequential frame is then calculated in the step S57 by the power value calculating unit 107.

The power value of the second noise signal of the sequential frame is then calculated on the basis of the judgment whether or not the power value of the second sound signal of the current frame exceeds the power value of the second noise signal of the preceding sequential in the step S58 by the power value calculating unit 108.

The ratio of the power value of the second sound signal of the sequential frame calculated in the step S55 to the power value of the echo replica sound signal of the sequential frame calculated in the step S56 is then calculated in the step S59 by the power value ratio calculating unit 109.

The peak value of the ratio of the power value of the second sound signal of the sequential frame to the power value of the echo replica sound signal of the sequential frame is then calculated and updated on the basis of the judgment whether or not the ratio of the power value of the second sound signal of the current frame to the power value of the echo replica sound signal of the current frame exceeds the ratio of the power value of the second sound signal of the preceding frame to the power value of the echo replica sound signal of the preceding frame in the step S60 by the peak value judging unit 110.

The attenuation signal is then produced on the basis of the judgment whether or not the ratio of the power value of the second sound signal of the sequential frame to the power value of the echo replica sound signal of the sequential frame exceeds the predetermined threshold power value in the step S61 by the attenuation signal producing unit 111, and four different power values comprising the power value of the second sound signal of the sequential frame calculated in the step S55, the power value of the echo replica sound signal of the sequential frame calculated in the step S56, the power value of the difference signal of the sequential frame calculated in the step S57, and the power value of the second noise signal of the sequential frame calculated in the step S58.

The attenuation signal is then produced and updated on the basis of the attenuation signal of the current frame and the attenuation signal of the preceding frame in the step S62 by the attenuation signal obtaining unit 112.

The difference signal component is suppressed to the minimum level with the attenuation signal under the condition that the near-end speaker sound signal component is allowed to pass therethrough in the step S63 by the echo sound suppressing unit 113.

Figure 19:
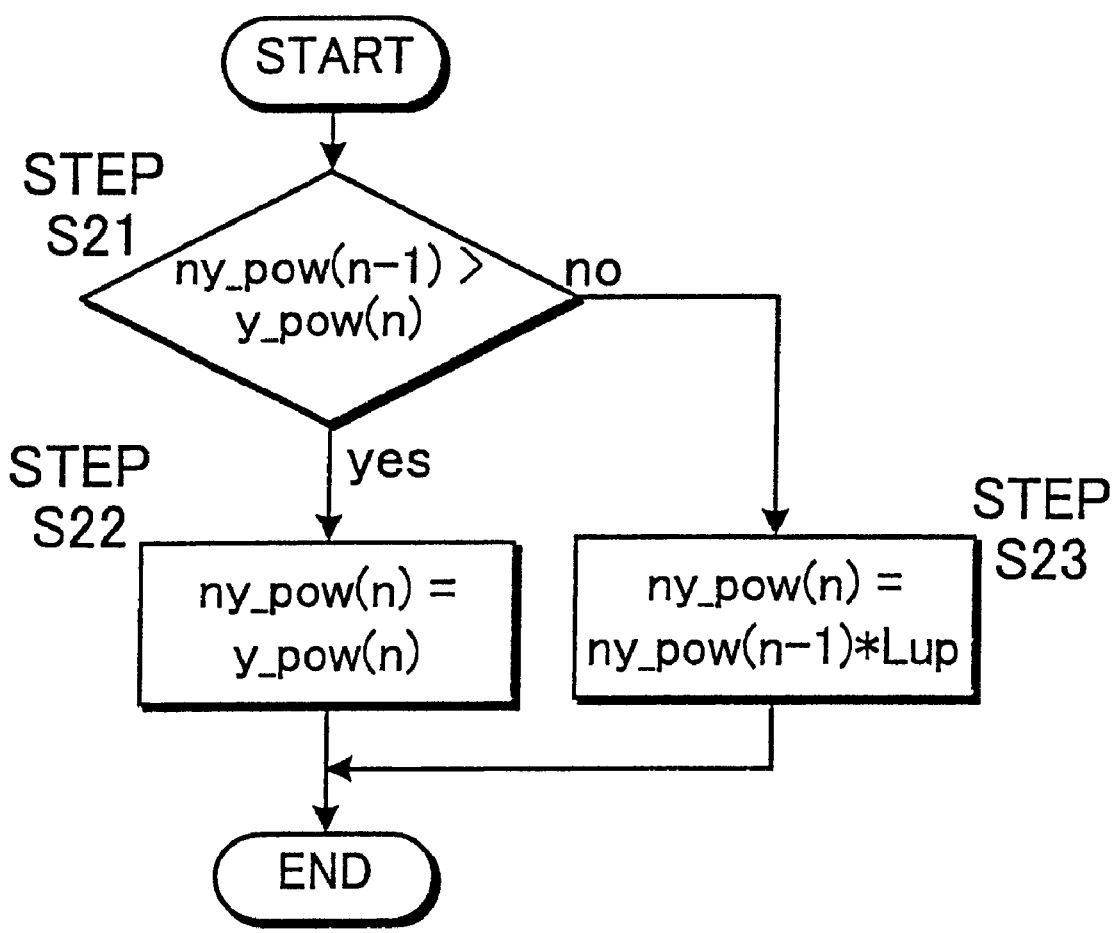
FIG. 19 is a flow chart of the process of the fourth power value calculating means forming part of the first embodiment of the echo sound signal suppressing apparatus according to the present invention shown in FIG. 1.

The step S58 previously mentioned will be described in detail hereinafter with reference to FIG. 19.

The judgment is initially made on whether or not the power value "ny_pow(n−1)" of the second noise signal of the preceding frame exceeds the power value "y_pow(n)" of the second sound signal of the current frame in the step S21 by the power value calculating unit 108. When the answer in the step S21 is in the affirmative "YES", i.e., the power value "ny_pow(n−1)" of the second noise signal of the preceding frame exceeds the power value "y_pow(n)" of the second sound signal of the current frame, the step S21 proceeds to the step S22. When, on the other hand, the answer in the step S21 is in the negative "NO", i.e., the power value "ny_pow(n−1)" of the second noise signal of the preceding frame does not exceed the power value "y_pow(n)" of the second sound signal of the current frame, the step S21 proceeds to the step S23.

The power value "y_pow(n)" of the second sound signal of the current frame is then substituted for the power value "ny_pow(n)" of the second noise signal of the current frame when the power value calculating unit 108 is operative to judge as the power value "y_pow(n)" of the second sound signal of the current frame does not exceed the power value "ny_pow(n−1)" of the second noise signal of the preceding frame in the step S22 by the power value calculating unit 108.

The power value "ny_pow(n−1)" of the second sound signal of the preceding frame multiplied by a predetermined updating constant value "Lup" (the predetermined updating constant value Lup>1), Lup*ny_pow(n−1), on the other hand, is substituted for the power value "ny_pow(n)" of the second noise signal of the current frame when the power value calculating unit 108 is adapted to judge as the power value "y_pow(n)" of the second sound signal of the current frame exceeds the power value "ny_pow(n−1)" of the second noise signal of the preceding frame in the step 23 by the power value calculating unit 108.

Figure 20:
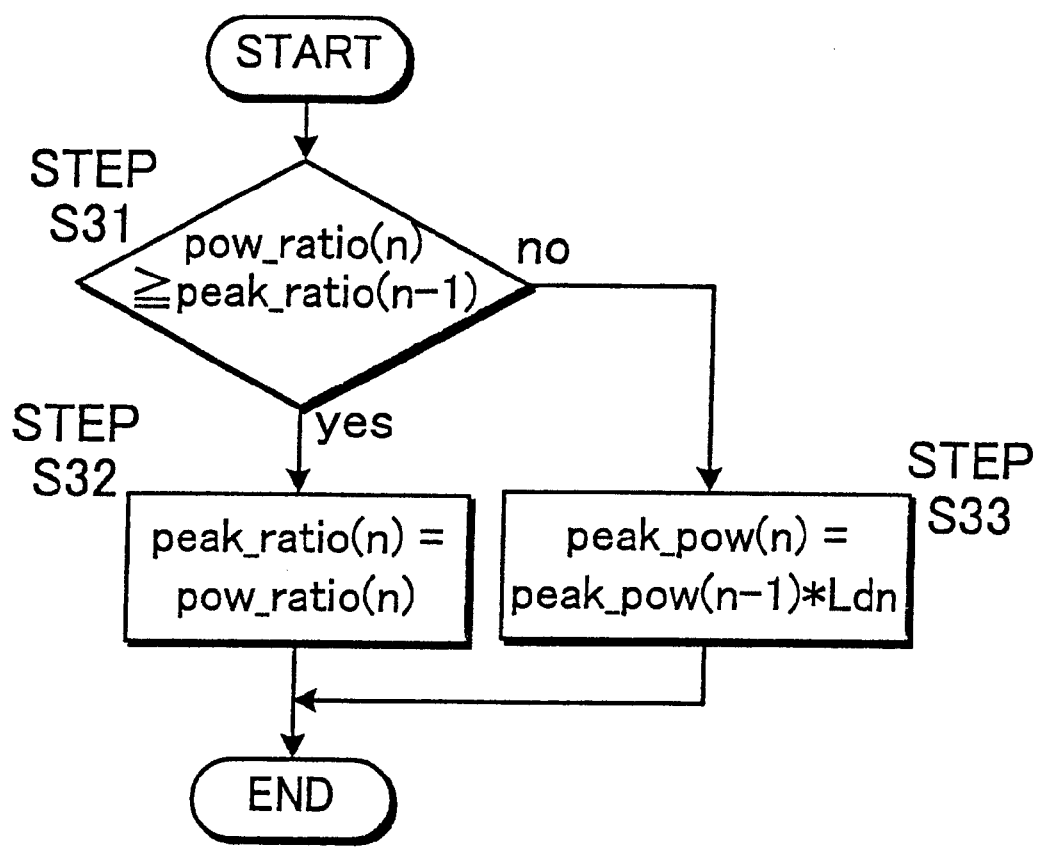
FIG. 20 is a flow chart of the process of the peak value judging unit forming part of the first embodiment of the echo sound signal suppressing apparatus according to the present invention shown in FIG. 1.

The step S60 previously mentioned will be described in detail hereinafter with reference to FIG. 20.

The judgment is initially made on whether or not the ratio "pow_ratio(n)" of the power value of the second sound signal of the current frame to the power value of the echo replica sound signal of the current frame exceeds the ratio "peak_ratio(n−1)" of the power value of the second sound signal of the preceding frame to the power value of the echo replica sound signal of the preceding frame in the step S31 by the peak value judging unit 110. When the answer in the step S31 is in the affirmative "YES", i.e., the ratio "pow_ratio(n)" of the power value of the second sound signal of the current frame to the power value of the echo replica sound signal of the current frame exceeds the ratio "peak_ratio(n−1)" of the power value of the second sound signal of the preceding frame to the power value of the echo replica sound signal of the preceding frame, the step S31 proceeds to the step S32. When, on the other hand, the answer in the step S31 is in the negative "NO", i.e., the ratio "pow_ratio(n)" of the power value of the second sound signal of the current frame to the power value of the echo replica sound signal of the current frame does not exceed the ratio "peak_ratio(n−1)" of the power value of the second sound signal of the preceding frame to the power value of the echo replica sound signal of the preceding frame, the step S31 proceeds to the step S33.

The ratio "pow_ratio(n)" of the power value of the second sound signal of the current frame to the power value of the echo replica sound signal of the current frame is then substituted for the peak value "peak_ratio(n)" of the ratio of the current frame when the peak value judging unit 110 is adapted to judge as the ratio "pow_ratio(n)" of the power value of the second sound signal of the current frame to the power value of the echo replica sound signal of the current frame exceeds the ratio "peak_ratio(n−1)" of the power value of the second sound signal of the preceding frame to the power value of the echo replica sound signal of the preceding frame in the step S32 by the peak value judging unit 110.

The peak value "peak_ratio(n)" of the ratio of the preceding frame multiplied by a predetermined updating constant value "Ldn" (the predetermined updating constant value Ldn<1), Ldn * peak_ratio(n−1), on the other hand, is substituted for the peak value "peak_ratio(n)" of the ratio of the current frame when the peak value judging unit 110 is adapted to judge as the ratio "pow_ratio(n)" of the power value of the second sound signal of the current frame to the power value of the echo replica sound signal of the current frame does not exceed the ratio "pow_ratio(n−1)" of the power value of the second sound signal of the preceding frame to the power value of the echo replica sound signal of the preceding frame in the step S33 by the peak value judging unit 110.

Figure 21:
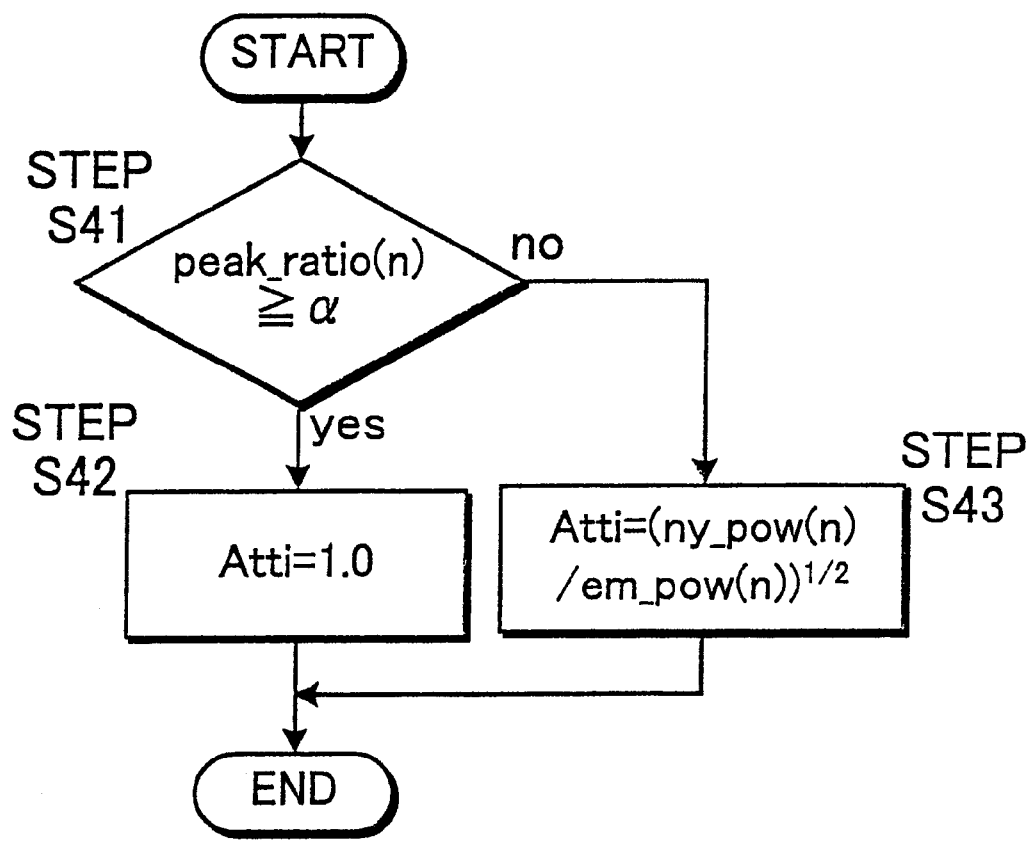
FIG. 21 is a flow chart of the process of the attenuation signal judging unit forming part of the first embodiment of the echo sound signal suppressing apparatus according to the present invention shown in FIG. 1.

The step S61 previously mentioned will be described in detail hereinafter with reference to FIG. 21.

The judgment is initially made on whether or not the ratio "peak_ratio(n)" of the power value of the second sound signal of the sequential frame to the power value of the echo replica sound signal of the sequential frame exceeds the predetermined threshold value "α" (the predetermined threshold value α>1) in the step S41 by the attenuation signal judging unit 111. When the answer in the step S41 is in the affirmative "YES", i.e., the ratio "peak_ratio(n)" of the power value of the second sound signal of the sequential frame to the power value of the echo replica sound signal of the sequential frame exceeds the predetermined threshold value "α", the step S41 proceeds to the step S42. When, on the other hand, the answer in the step S41 is in the negative "NO", i.e., the ratio "peak_ratio(n)" of the power value of the second sound signal of the sequential frame to the power value of the echo replica sound signal of the sequential frame does not exceed the predetermined threshold value "α", the step S41 proceeds to the step S43.

A numeral number "1" is then substituted for the attenuation signal "Atti" when the ratio "peak_ratio(n)" of the power value of the second sound signal of the sequential frame to the power value of the echo replica sound signal of the sequential frame exceeds the predetermined threshold value "α" in the step S42 by the attenuation signal judging unit 111.

The attenuation signal "Atti" is then calculated by the previously mentioned equation (6) when the ratio "peak_ratio(n)" of the power value of the second sound signal of the sequential frame to the power value of the echo replica sound signal of the sequential frame does not exceed the predetermined threshold value "α" in the step S43 by the attenuation signal judging unit 111.

From the above detailed description, it will be understood that the first embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

Although there has been described in the above about the first embodiment of the echo sound signal suppressing apparatus according to the present invention, this embodiment may be replaced by the second to eighteenth embodiments of the echo sound signal suppressing apparatus according to the present invention in order to attain the objects of the present invention. The second to eighteenth embodiments of the echo sound signal suppressing apparatus will then be described hereinafter.

Referring then to FIGS. 2 to 18 of the drawings, there are shown block diagrams of the second to eighteenth preferred embodiments of the echo sound signal suppressing apparatus according to the present invention. The constitutional elements and the steps of the second to eighteenth embodiments of the echo sound signal suppressing apparatus according to the present invention as shown in FIGS. 2 to 18 are entirely the same as those of the first embodiment of the echo sound signal suppressing apparatus according to the present invention as shown in FIG. 1 except for the constitutional elements and the steps appearing in the following description. Therefore, only the constitutional elements and the steps of the second to eighteenth embodiments of the echo sound signal suppressing apparatus different from those of the first embodiment of the echo sound signal suppressing apparatus will be described in detail hereinafter. The constitutional elements and the steps of the second to eighteenth embodiments of the echo sound signal suppressing apparatus entirely the same as those of the first embodiment of the echo sound signal suppressing apparatus will not be described but bear the same reference numerals and legends as those of the first embodiment of the echo sound signal suppressing apparatus in FIG. 1 to avoid tedious repetition.

The following description will be directed to the constitutional elements and the steps of the second embodiment of the echo sound signal suppressing apparatus different from those of the first embodiment of the echo sound signal suppressing apparatus.

Figure 2:
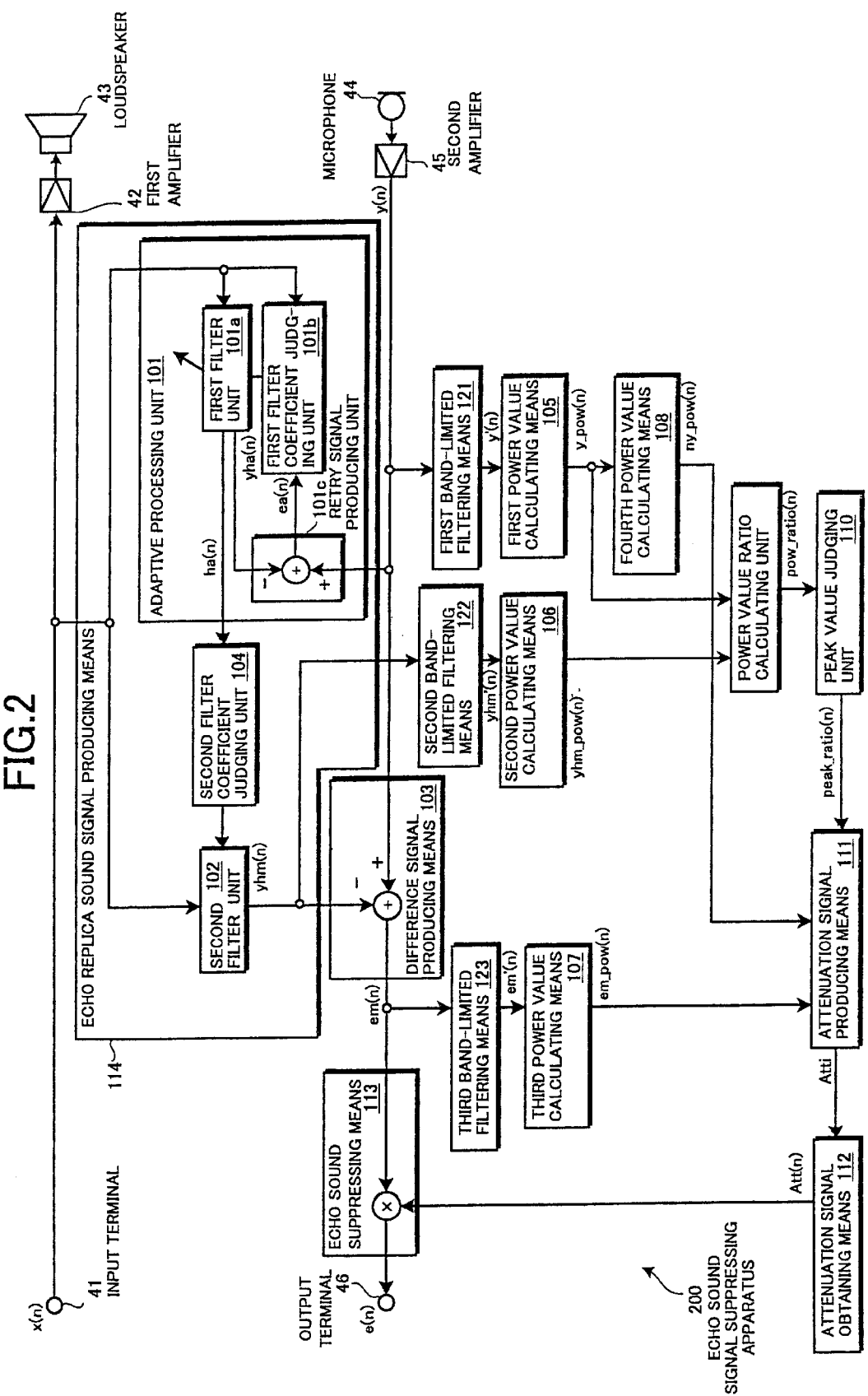
FIG. 2 is a block diagram of the second embodiment of the echo sound signal suppressing apparatus according to the present invention.

The second embodiment of the echo sound signal suppressing apparatus 200 according to the present invention is shown in FIG. 2 as comprising the first amplifier 42, the loudspeaker 43, the microphone 44, the second amplifier 45, the echo replica sound signal producing means 114, the second difference signal producing means 103, the first power value calculating means 105, the second power value calculating means 106, the third power value calculating means 107, the attenuation level calculating means 115, and the echo sound suppressing means 113, all of which are the same in construction as the first embodiment of the echo sound signal suppressing apparatus 100 shown in FIG. 1 and thus its construction will not be described hereinafter. The second embodiment of the echo sound signal suppressing apparatus 200 shown in FIG. 2 further comprises first filtering means 121, second filtering means 122, and third filtering means 123.

The first filtering means 121 is operative to filter the second sound signal to be discharged to the first power value calculating means 105 as a band-limited second sound signal indicative of the second sound having a frequency bandwidth limited to a predetermined frequency range. The first filtering means 121 is constituted by a band-limited filter unit 121. The band-limited filter unit 121 is electrically connected through a line to the second amplifier 45 to filter the second sound signal to be discharged to the power value calculating unit 105 as a band-limited second sound signal. The band-limited second sound signal filtered by the band-limited filter unit 121 is represented by the legend "y'(n)".

The second filtering means 122 is operative to filter the echo replica signal to be discharged to the second power value calculating means 106 as a band-limited second echo replica sound signal indicative of the replicated echo sound having a frequency bandwidth limited to a predetermined frequency range. The second filtering means 122 is constituted by a band-limited filter unit 122. The band-limited filter unit 122 is electrically connected through a line to the filter unit 102 to filter the echo replica sound signal to be discharged to the power value calculating unit 106 as a band-limited echo replica sound signal. The band-limited echo replica sound signal filtered by the band-limited filter unit 122 is represented by the legend "yhm'(n)".

The third filtering means 123 is operative to filter the difference signal to be discharged to the third power value calculating means 107 as a band-limited difference signal indicative of the difference signal having a frequency bandwidth limited to a predetermined frequency range. The third filtering means 123 is constituted by a band-limited filter unit 123. The filter unit 123 is electrically connected through a line to the difference signal producing unit 103 to filter the difference signal to be discharged to the power value calculating unit 107 as a band-limited difference signal. The band-limited difference signal filtered by the band-limited filter unit 123 is represented by the legend "em'(n)".

The first power value calculating means 105 is operative to divide the band-limited second sound signal into a plurality of the sequential frames along the time axis to calculate the power value of the band-limited second sound signal of the sequential frame after receiving the band-limited second sound signal from the first filtering means 121. The first power value calculating means 105 is constituted by a power value calculating unit 105. The power value calculating unit 105 is electrically connected through a line to the band-limited filter unit 121 to divide the band-limited second sound signal into a plurality of the sequential frames along a time axis to calculate the power value of the band-limited second sound signal of the sequential frame after receiving the band-limited second sound signal from the band-limited filter unit 121. The power value of the band-limited second sound signal calculated by the power value calculating unit 105 is represented by the legend "y_pow(n)".

The calculation of the power value calculating unit 105 is performed by the following equation (8) for calculating the power value of the band-limited second sound signal of the sequential frame.

$$y\_pow(n) = \sum_{i=0}^{L-1} y'(n-i)^2 \qquad (8)$$

wherein the legend "n" is indicative of the serial number of the sampled second sound signal and the legend "L" is indicative of the number of the sampled second sound signal for each of the sequential frame.

The second power value calculating means 106 is operative to divide the band-limited echo replica sound signal into a plurality of the sequential frames along the time axis to calculate the power value of the band-limited echo replica sound signal of the sequential frame after receiving the band-limited echo replica sound signal from the filtering unit 122. The second power value calculating means 106 is constituted by a power value calculating unit 106. The power value calculating unit 106 is electrically connected through a line to the band-limited filter unit 122 to divide the band-limited echo replica sound signal into a plurality of the sequential frames along the time axis to calculate the power value of the band-limited echo replica sound signal of the sequential frame after receiving the band-limited second sound signal from the band-limited filter unit 122. The power value of the band-limited echo replica sound signal calculated by the power value calculating unit 106 is represented by the legend "yhm_pow(n)".

The calculation of the power value calculating unit 106 is performed by the following equation (9) for calculating the power value of the band-limited echo replica sound signal of the sequential frame.

$$yhm\_pow(n) = \sum_{i=0}^{L-1} yhm'(n-i)^2 \qquad (9)$$

wherein the legend "n" is indicative of the serial number of the sampled second sound signal and the legend "L" is indicative of the number of the sampled second sound signal for each of the sequential frame.

The third power value calculating means 107 is operative to divide the band-limited difference signal into a plurality of the sequential frames along the time axis to calculate the power value of the band-limited difference signal of the sequential frame after receiving the band-limited difference signal from the second filtering means 123. The third power value calculating means 107 is constituted by a power value calculating unit 107. The power value calculating unit 107 is electrically connected through a line to the band-limited filter unit 123 to divide the band-limited difference signal into a plurality of the frames along the time axis to calculate the power value of the band-limited difference signal of the sequential frame after receiving the band-limited difference signal from the band-limited filter unit 123. The power value of the band-limited difference signal of the sequential frame calculated by the third power value calculating unit 107a is represented by the legend "em_pow'(n)".

The calculation of the third power value calculating unit 107a is performed by the following equation (10) for calculating the power value of the band-limited difference signal of the sequential frame.

$$em\_pow(n) = \sum_{i=0}^{L-1} em'(n-i)^2 \qquad (10)$$

wherein the legend "n" is indicative of the serial number of the sampled second sound signal and the legend "L" is indicative of the number of the sampled second sound signal for each of the sequential frame.

The fourth power value calculating means 108 is constituted by a power value calculating unit 108. The power value calculating unit 108 is electrically connected through a line to the power value calculating unit 105 to calculate the power value of the band-limited second noise signal of the sequential frame based on the judgment whether or not the power value of the band-limited second sound signal of the current frame exceeds the power value of the band-limited second noise signal of the preceding frame after receiving the power value of the band-limited second sound signal of the sequential frame calculated by the power value calculating unit 105.

The power value of the second noise signal of the sequential frame is calculated by two different ways comprising first and second ways on the basis of the judgment whether or not the power value of the band-limited second sound signal of the current frame exceeds the power value of the band-limited second noise signal of the preceding frame after receiving the power value of the band-limited second sound signal of the sequential frame calculated by the power value calculating unit 105.

The first way means that the power value "y_pow(n)" of the band-limited second sound signal of the current frame is substituted for the power value "ny_pow(n)" of the band-limited second noise signal of the current frame when the power value calculating unit 108 is operative to judge as the power value "y_pow(n)" of the band-limited second sound signal of the current frame does not exceed the power value "ny_pow(n−1)" of the band-limited second noise signal of the preceding frame.

The second ways means that the power value "ny_pow(n−1)" of the band-limited second sound signal of the preceding frame multiplied by a predetermined updating constant value "Lup" (the predetermined updating constant value Lup>1), Lup*ny_pow(n−1) is substituted for the power value "ny_pow(n)" of the band-limited second noise signal of the current frame when the power value calculating unit 108 is adapted to judge as the power value "y_pow(n)" of the band-limited second sound signal of the current frame exceeds the power value "ny_pow(n−1)" of the band-limited second noise signal of the preceding frame.

The attenuation signal producing means 111 is operative to produce an attenuation signal after receiving the power value of the band-limited second sound signal calculated by the first power value calculating means 105 and the power value of the band-limited echo replica sound signal calculated by the second power value calculating means 106. The attenuation signal producing means 111 comprises power value ratio calculating unit 109, a peak value judging unit 110, and an attenuation signal judging unit 111.

The power value ratio calculating unit 109 has first and second input terminals, the above first input terminal being electrically connected through a line to the power value calculating unit 105, the above second input terminal being electrically connected through a line to the power value calculating unit 106. The power value ratio calculating unit 109 is adapted to calculate the ratio of the power value of the band-limited second sound signal of the sequential frame calculated by the power value calculating unit 105 to the power value of the band-limited echo replica sound signal of the sequential frame calculated by the power value calculating unit 106. The ratio of the power value of the band-limited second sound signal of the sequential frame to the power value of the band-limited echo replica sound signal of the sequential frame has a peak value. The ratio of the power value of the band-limited second sound signal of the sequential frame to the power value of the band-limited echo replica sound signal of the sequential frame have a ratio of the power value of the band-limited second sound signal of the current frame to the power value of the band-limited echo replica sound signal of the current frame, a ratio of the power value of the band-limited second sound signal of the preceding frame to the power value of the band-limited echo replica sound signal of the preceding frame.

The ratio of the power value of the band-limited second sound signal of the current frame to the power value of the band-limited echo replica sound signal of the current frame is represented by the legend "pow_ratio'(n)". The ratio of the power value of the band-limited second sound signal of the preceding frame to the power value of the band-limited echo replica sound signal of the preceding frame is represented by the legend "pow_ratio'(n−1)".

The peak value judging unit 110 is electrically connected through a line to the power value ratio calculating unit 109. The peak value judging unit 110 is adapted to judge whether or not the ratio of the power value of the band-limited second sound signal of the current frame to the power value of the band-limited echo replica sound signal of the current frame exceeds the ratio of the power value of the band-limited second sound signal of the preceding frame to the power value of the band-limited echo replica sound signal of the preceding frame to calculate a peak value of the ratio of the power value of the band-limited second sound signal of the sequential frame to the power value of the band-limited echo replica sound signal of the sequential frame. The peak value of the ratio of the current frame is represented by the legend "peak_ratio'(n)". The peak value of the ratio of the preceding frame is represented by the legend "peak_ratio'(n−1)".

The attenuation signal judging unit 111 is electrically connected through a line to the power value calculating unit 105, the power value calculating unit 106, and the peak value judging unit 110. The attenuation signal judging unit 111 is adapted to judge whether or not the ratio of the power value of the band-limited second sound signal of the sequential frame to the power value of the band-limited echo replica sound signal of the sequential frame exceeds a predetermined threshold power value to calculate and produce an attenuation signal after receiving the peak value of the ratio of the power value of the band-limited second sound signal of the sequential frame calculated by the power value calculating unit 105 to the power value of the band-limited echo replica sound signal of the sequential frame calculated by the power value calculating unit 106, and the power value of the band-limited difference signal of the sequential frame calculated by the power value calculating unit 107.

The attenuation signal "Atti" of the sequential frame is calculated by the two different ways comprising first and second ways on the basis of the judgment whether or not the ratio of the power value of the band-limited second sound signal of the sequential frame to the power value of the band-limited echo replica sound signal of the sequential frame exceeds the predetermined threshold power value.

The first way means that a numeral number "1" is substituted for the attenuation signal "Atti" when the ratio of the power value of the band-limited second sound signal of the sequential frame to the power value of the band-limited echo replica sound signal of the sequential frame exceeds the predetermined threshold value "α" (the predetermined threshold value α>1).

The second way means that the attenuation signal "Atti" is calculated by the following equation (11) when the ratio of the power value of the band-limited second sound signal of the sequential frame to the power value of the band-limited echo replica sound signal of the sequential frame does not exceed the predetermined threshold value "α".

$$Atti=(ny\_pow(n)/em\_pow(n))^{1/2} \quad (1)$$

The attenuation signal obtaining means 112 is constituted by an attenuation signal obtaining unit 112. The attenuation signal obtaining unit 112 is electrically connected through a line to the attenuation signal producing unit 111 to receive the attenuation signal produced by the attenuation signal producing unit 111. The attenuation signal obtaining unit 112 is operative to obtain an attenuation signal of the sequential frame through calculating the following equation (12), $$Att(n)=Att(n-1)+Lts*(Atti-Att(n-1)) \quad (12)$$

wherein the legend "Lts" is indicative of a predetermined value (0<Lts<1). The legend "Atti" is indicative of the attenuation signal. The legend "Att(n)" is indicative of the square root of the ratio of the power value of the second noise signal component of the current frame to the power value of the band-limited difference signal of the current frame. The legend "Att(n−1)" is indicative of the square root of the ratio of the power value of the band-limited second noise signal component of the preceding frame to the power value of the band-limited difference signal of the preceding frame.

The attenuation signal obtaining means 112 is constituted by an attenuation signal obtaining unit 112. The attenuation signal obtaining unit 112 is electrically connected through a line to the attenuation signal judging unit 111 to produce the attenuation signal.

In the attached drawings is no flow chart showing the process of the second embodiment of the echo sound signal suppressing apparatus, but the process of the second embodiment differing from that of the first embodiment of the echo sound signal suppressing apparatus will simply be described hereinafter.

The band-limited second sound signal of the sequential frame is then produced by the band-limited filter unit 121.

The power value of the band-limited second sound signal of the sequential frame is then calculated by the power value calculating unit 105.

The band-limited echo replica sound signal of the sequential frame is then produced by the band-limited filter 122.

The power value of the band-limited echo replica sound signal of the sequential frame is then calculated by the power value calculating unit 106.

The band-limited difference signal of the sequential frame is then produced by the band-limited filter unit 123.

The power value of the band-limited difference signal of the sequential frame is then calculated by the power value calculating unit 107.

The power value of the band-limited second noise signal of the sequential frame is then calculated on the basis of the judgment whether or not the power value of the band-limited second sound signal of the current frame exceeds the power value of the band-limited second noise signal of the preceding sequential by the power value calculating unit 108.

The ratio of the power value of the band-limited second sound signal of the sequential frame to the power value of the band-limited echo replica sound signal of the sequential frame is then calculated by the power value ratio calculating unit 109.

The peak value of the ratio of the power value of the band-limited second sound signal of the sequential frame to the power value of the band-limited echo replica sound signal of the sequential frame is then calculated and updated on the basis of the judgment whether or not the ratio of the power value of the band-limited second sound signal of the current frame to the power value of the band-limited echo replica sound signal of the current frame exceeds the ratio of the power value of the band-limited second sound signal of the preceding frame to the power value of the band-limited echo replica sound signal of the preceding frame by the peak value judging unit 110.

The attenuation signal is then produced on the basis of the judgment whether or not the ratio of the power value of the band-limited second sound signal of the sequential frame to the power value of the band-limited echo replica sound signal of the sequential frame exceeds the predetermined threshold power value by the attenuation signal producing unit 111, and four different power values comprising the power value of the band-limited second sound signal of the sequential frame, the power value of the band-limited echo replica sound signal of the sequential frame, the power value of the band-limited difference signal of the sequential frame, and the power value of the band-limited second noise signal of the sequential frame.

The attenuation signal is then produced and updated on the basis of the attenuation signal of the current frame and the attenuation signal of the preceding frame by the attenuation signal obtaining unit 112.

The difference signal component is suppressed to the minimum level with the attenuation signal under the condition that the near-end speaker sound signal component is allowed to pass therethrough by the echo sound suppressing unit 113.

The calculation of the power value of the band-limited second noise signal of the sequential frame previously mentioned will be described in detail hereinafter.

The power value "y_pow(n)" of the band-limited second sound signal of the current frame is initially compared with the power value "ny_pow(n−1)" of the band-limited second noise signal of the preceding frame by the power value calculating unit 108.

The power value "y_pow(n)" of the band-limited second sound signal of the current frame is then substituted for the power value "ny_pow(n)" of the band-limited second noise signal of the current frame when the power value calculating unit 108 is operative to judge as the power value "y_pow(n)" of the band-limited second sound signal of the current frame does not exceed the power value "ny_pow(n−1)" of the band-limited second noise signal of the preceding frame by the power value calculating unit 108.

The power value "ny_pow(n−1)" of the band-limited second sound signal of the preceding frame multiplied by a predetermined updating constant value "Lup" (the predetermined updating constant value Lup>1), Lup*ny_pow(n−1), on the other hand, is substituted for the power value "ny_pow(n)" of the band-limited second noise signal of the current frame when the power value calculating unit 108 is adapted to judge as the power value "y_pow(n)" of the band-limited second sound signal of the current frame exceeds the power value "ny_pow(n−1)" of the band-limited second noise signal of the preceding frame by the power value calculating unit 108.

The calculation of the peak value of the ratio of the power value of the band-limited second sound signal of the sequential frame to the power value of the band-limited echo replica sound signal of the sequential frame previously mentioned will be described in detail hereinafter.

The ratio "pow_ratio(n)" of the power value of the band-limited second sound signal of the current frame to the power value of the band-limited echo replica sound signal of the current frame is initially compared with the ratio "pow_ratio(n−1)" of the power value of the band-limited second sound signal of the preceding frame to the power value of the band-limited echo replica sound signal of the preceding frame by the peak value judging unit 110.

The ratio "pow_ratio(n)" of the power value of the band-limited second sound signal of the current frame to the power value of the band-limited echo replica sound signal of the current frame is then substituted for the peak value "peak_ratio(n)" of the ratio of the current frame when the peak value judging unit 110 is adapted to judge as the ratio "pow_ratio(n)" of the power value of the band-limited second sound signal of the current frame to the power value of the band-limited echo replica sound signal of the current frame exceeds the ratio "peak_ratio(n−1)" of the power value of the band-limited second sound signal of the preceding frame to the power value of the band-limited echo replica sound signal of the preceding frame by the peak value judging unit 110.

The peak value "peak_ratio(n)" of the ratio of the preceding frame multiplied by a predetermined updating constant value "Ldn" (the predetermined updating constant value Ldn<1), Ldn * peak_ratio(n−1), on the other hand, is substituted for the peak value "peak_ratio(n)" of the ratio of the current frame when the peak value judging unit 110 is adapted to judge as the ratio "pow_ratio(n)" of the power value of the band-limited second sound signal of the current frame to the power value of the band-limited echo replica sound signal of the current frame does not exceed the ratio "pow_ratio(n−1)" of the power value of the band-limited second sound signal of the preceding frame to the power value of the band-limited echo replica sound signal of the preceding frame by the peak value judging unit 110.

The production of the attenuation signal previously mentioned will be described in detail hereinafter.

The ratio "peak_ratio(n)" of the power value of the band-limited second sound signal of the sequential frame to the power value of the band-limited echo replica sound signal of the sequential frame is initially compared with the predetermined threshold value "$\alpha$" (the predetermined threshold value $\alpha$>1) by the attenuation signal judging unit 111.

A numeral number "1" is then substituted for the attenuation signal "Atti" when the ratio "peak_ratio(n)" of the power value of the band-limited second sound signal of the sequential frame to the power value of the band-limited echo replica sound signal of the sequential frame exceeds the predetermined threshold value "$\alpha$" by the attenuation signal judging unit 111.

The attenuation signal "Atti" is then calculated by the previously mentioned equation (11) when the ratio "peak_ratio(n)" of the power value of the band-limited second sound signal of the sequential frame to the power value of the band-limited echo replica sound signal of the sequential frame does not exceed the predetermined threshold value "$\alpha$" by the attenuation signal judging unit 111.

From the above detailed description, it will be understood that the second embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will now be directed to the constitutional elements and the steps of the third embodiment of the echo sound signal suppressing apparatus different from those of the first and second embodiments of the echo sound signal suppressing apparatus.

Figure 3:
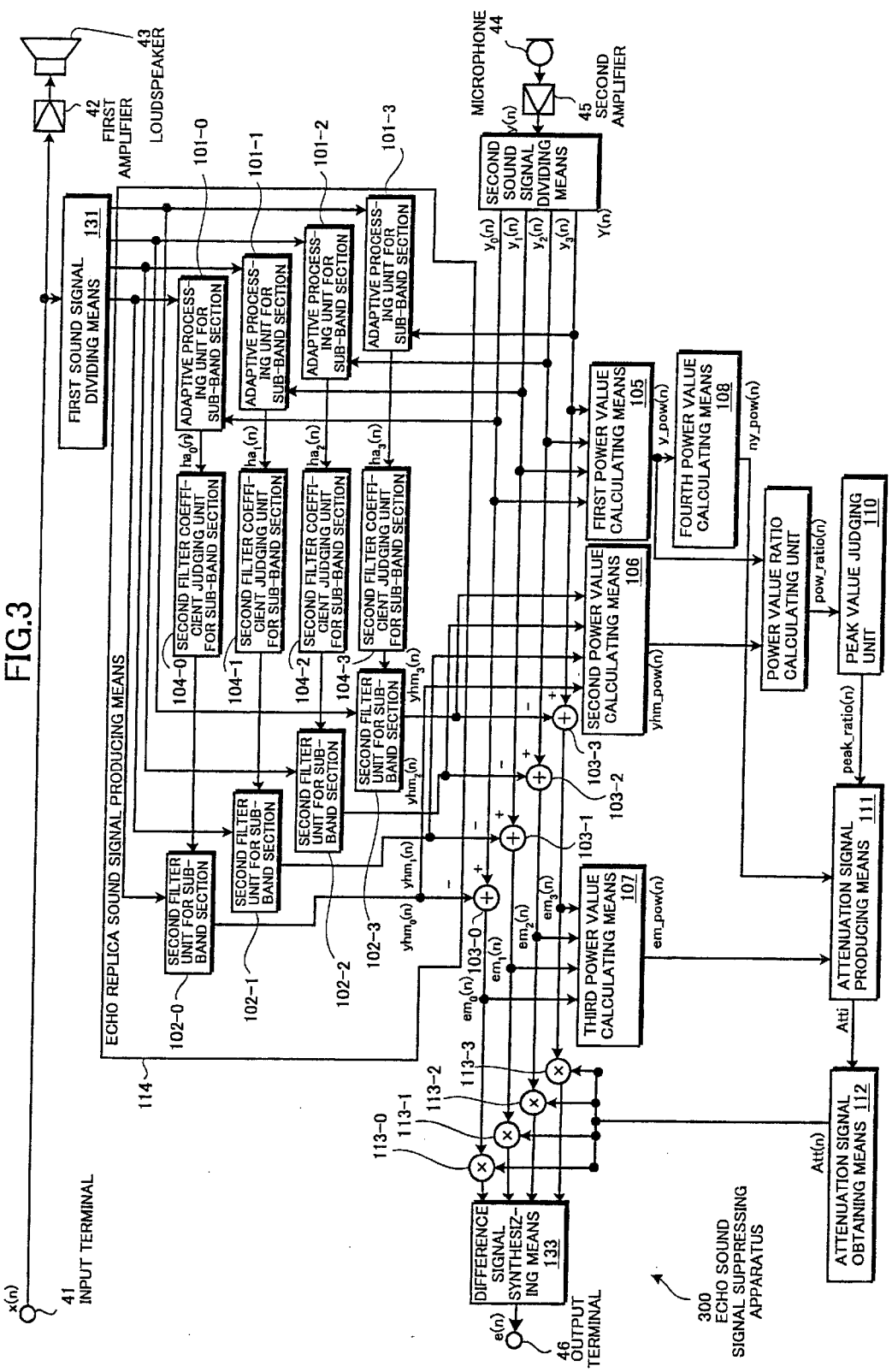
FIG. 3 is a block diagram of the third embodiment of the echo sound signal suppressing apparatus according to the present invention.

The third embodiment of the echo sound signal suppressing apparatus 300 according to the present invention is shown in FIG. 3 as comprising the first amplifier 42, the loudspeaker 43, the microphone 44, the second amplifier 45, all of which are the same in construction as the first embodiment of the echo sound signal suppressing apparatus 100 shown in FIG. 1 and thus its construction will not be described hereinafter. The third embodiment of the echo sound signal suppressing apparatus 300 shown in FIG. 3 further comprises first sound signal dividing means 131, second sound signal dividing means 132, difference signal synthesizing means 133, and echo replica sound signal producing means 114.

The first sound signal dividing means 131 is constituted by a sound signal dividing unit 131. The sound signal dividing unit 131 is electrically connected through a line to the input terminal 41 to divide the first sound signal into four sub-band sections along a frequency axis, the first sound signal of the sub-band section comprising a far-end speaker sound signal component of the sub-band section and a first noise signal component of the sub-band section. The four sub-band sections comprising a first sub-band section, a second sub-band section, a third sub-band section, and a fourth sub-band section.

The second sound signal dividing means 132 is constituted by a sound signal dividing unit 132. The sound signal dividing unit 132 is electrically connected through a line to the second amplifier 45 to divide the second sound signal into four sub-band sections along the frequency axis. The second sound signal of the sub-band section comprises a near-end speaker sound signal component of the sub-band section, an echo sound signal component of the sub-band section, and a second noise signal component of the sub-band section. The second noise signal component of the sub-band section has a power value of the sub-band section.

The echo replica sound signal producing means 114 is constituted by a first echo replica sound signal producing unit 114-0, a second echo replica sound signal producing unit 114-1, a third echo replica sound signal producing unit 114-2, and a fourth echo replica sound signal producing unit 114-3 to produce an echo replica sound signal based on the first sound signal and the second sound signal, the echo replica sound signal having a power value.

The first echo replica sound signal producing unit 114-0 is electrically connected through a line to the sound signal dividing unit 131 to produce an echo replica sound signal of the first sub-band section based on the first sound signal of the first sub-band section and the second sound signal of the first sub-band section, the echo replica sound signal of the first sub-band section having a power value of the first sub-band section.

The second echo replica sound signal producing unit 114-1 is electrically connected through a line to the sound signal dividing unit 131 to produce an echo replica sound signal of the first sub-band section based on the first sound signal of the first sub-band section and the second sound signal of the first sub-band section, the echo replica sound signal of the first sub-band section having a power value of the first sub-band section.

The third echo replica sound signal producing unit 114-2 is electrically connected through a line to the sound signal dividing unit 131 to produce an echo replica sound signal of the first sub-band section based on the first sound signal of the first sub-band section and the second sound signal of the first sub-band section, the echo replica sound signal of the first sub-band section having a power value of the first sub-band section.

The fourth echo replica sound signal producing unit 114-3 is electrically connected through a line to the sound signal dividing unit 131 to produce an echo replica sound signal of the first sub-band section based on the first sound signal of the first sub-band section and the second sound signal of the first sub-band section, the echo replica sound signal of the first sub-band section having a power value of the first sub-band section.

The echo replica sound signal producing means 114-0 comprises a first filter unit 101a-0, a second filter unit 102-0, a retry signal producing unit 101c-0, a first filter coefficient judging unit 101b-0, and a second filter coefficient judging unit 104-0.

The first filter unit 101a-0 has two input terminals comprising first and second terminals, the above first terminal being electrically connected through a line to the first sound signal dividing unit 131, the above second terminal being electrically connected through a line to the first filter coefficient judging unit 101b-0. The first filter unit 101a-0 is adapted to produce a first echo replica sound signal of the first sub-band section after receiving the first filter coefficient of the first sub-band section judged by the first filter coefficient judging unit 101b-0.

The second filter unit 102-0 has two input terminals comprising first and second terminals, the above first terminal being electrically connected through a line to the first sound signal dividing unit 131, the above second terminal being electrically connected through a line to the second filter coefficient judging unit 104-0. The second filter unit 102-0 is adapted to produce an echo replica sound signal of the first sub-band section after receiving the first filter coefficient of the first sub-band section judged by the second filter coefficient judging unit 104-0.

The retry signal producing unit 101c-0 has two input terminals comprising first and second terminals, the above first terminal being electrically connected through a line to the first echo replica sound signal producing unit 101a-0 and the above second terminal being electrically connected through a line to the second sound signal dividing unit 132. The retry signal producing unit 101c-0 is adapted to produce a retry signal of the first sub-band section on the basis of both the first echo replica sound signal of the first sub-band section and the second sound signal of the first sub-band section after receiving both the first echo replica sound signal of the first sub-band section from the first filter unit 101a and the second sound signal of the first sub-band section.

The first filter coefficient judging unit 101b-0 has two input terminals comprising first and second terminals, the above first terminal being electrically connected through a line to the input terminal 41 receiving the first sound signal of the first sub-band section from the far-end speaker and the above second terminal being electrically connected through a line to the first difference signal producing unit 101c. The first filter coefficient judging unit 101b is adapted to judge whether or not to update a first filter coefficient after calculating the first filter coefficient based on both the first sound signal of the first sub-band section and the retry signal of the first sub-band section, the first filter coefficient having the first filter unit 101a produce the first echo replica sound signal of the first sub-band section together with the first sound signal of the first sub-band section.

The second filter coefficient judging unit 104-0 is adapted to judge whether or not to update the first filter coefficient of the first sub-band section after receiving the first filter coefficient of the first sub-band section judged by the first filter coefficient judging unit 101b-0.

The third embodiment of the echo sound signal suppressing apparatus 300 according to the present invention further comprises difference signal producing means 103, first power value calculating means 105, second power value calculating means 106, third power value calculating means 107, and fourth power value calculating means 107.

The difference signal producing means 103 is constituted by a first difference signal producing unit 103-0, a second difference signal producing unit 103-1, a third difference signal producing unit 103-2, and a fourth difference signal producing unit 103-3 to produce a difference signal by subtracting the echo replica sound signal from the second sound signal. The difference signal comprises the near-end speaker sound signal component, the second noise signal component, and a difference signal component indicative of subtracting the echo replica sound signal from the second sound signal, and the difference signal has a power value.

The first difference signal producing unit 103-0 has two input terminals comprising first and second terminals, the above first terminal being electrically connected through a line to the first echo replica sound signal producing unit 114-0 and the above second terminal being electrically connected through a line to the second sound signal dividing unit 132. The first difference signal producing unit 103-0 is operative to produce a difference signal of the first sub-band section by subtracting the echo replica sound signal of the first sub-band section from the second sound signal of the first sub-band section. The difference signal of the first sub-band section comprises the near-end speaker sound signal component of the first sub-band section and a difference signal component of the first sub-band section indicative of subtracting the echo replica sound signal of the first sub-band section from the second sound signal of the first sub-band section, and the difference signal has a power value of the first sub-band section.

The second difference signal producing unit 103-1 has two input terminals comprising first and second terminals, the above first terminal being electrically connected through a line to the second echo replica sound signal producing unit 114-1 and the above second terminal being electrically connected through a line to the second sound signal dividing unit 132. The second difference signal producing unit 103-1 is operative to produce a difference signal of the first sub-band section by subtracting the echo replica sound signal of the first sub-band section from the second sound signal of the first sub-band section. The difference signal of the second sub-band section comprises the near-end speaker sound signal component of the second sub-band section and a difference signal component of the second sub-band section indicative of subtracting the echo replica sound signal of the second sub-band section from the second sound signal of the second sub-band section, and the difference signal has a power value of the second sub-band section.

The third difference signal producing unit 103-2 has two input terminals comprising first and second terminals, the above first terminal being electrically connected through a line to the third echo replica sound signal producing unit 114-2 and the above second terminal being electrically connected through a line to the second sound signal dividing unit 132. The third difference signal producing unit 103-2 is operative to produce a difference signal of the first sub-band section by subtracting the echo replica sound signal of the first sub-band section from the second sound signal of the first sub-band section. The difference signal of the third sub-band section comprises the near-end speaker sound signal component of the third sub-band section and a difference signal component of the third sub-band section indicative of subtracting the echo replica sound signal of the third sub-band section from the second sound signal of the third sub-band section, and the difference signal has a power value of the third sub-band section.

The fourth difference signal producing unit 103-3 has two input terminals comprising first and second terminals, the above first terminal being electrically connected through a line to the fourth echo replica sound signal producing unit 114-3 and the above second terminal being electrically connected through a line to the second sound signal dividing unit 132. The fourth difference signal producing unit 103-3 is operative to produce a difference signal of the first sub-band section by subtracting the echo replica sound signal of the first sub-band section from the second sound signal of the first sub-band section. The difference signal of the fourth sub-band section comprises the near-end speaker sound signal component of the fourth sub-band section and a difference signal component of the fourth sub-band section indicative of subtracting the echo replica sound signal of the fourth sub-band section from the second sound signal of the fourth sub-band section, and the difference signal has a power value of the fourth sub-band section.

The difference signal synthesizing means 133 is constituted by the difference signal synthesizing unit 133 to synthesize the difference signal after receiving the difference signals of the sub-band sections. The difference signal synthesizing unit 133 is electrically connected through a line to the difference signal producing means 103 to synthesize the difference signal after receiving the difference signal of the first to fourth sub-band sections.

The first power value calculating means 105 is constituted by a first power value calculating unit 105-0, a second power value calculating unit 105-1, a third power value calculating unit 105-2, and a fourth power value calculating unit 105-3 to divide the second sound signal into a plurality of sequential frames along the time axis to calculate the power value of the second sound signal of the sequential frame.

The first power value calculating unit 105-0 is electrically connected through a line to the second sound signal dividing unit 132 to divide the second sound signal of the first sub-band section into a plurality of sequential frames along the time axis to calculate the power value of the second sound signal of the first sub-band section of the sequential frame.

The second power value calculating unit 105-1 is electrically connected through a line to the second sound signal dividing unit 132 to divide the second sound signal of the second sub-band section into a plurality of sequential frames along the time axis to calculate the power value of the second sound signal of the second sub-band section of the sequential frame.

The third power value calculating unit 105-2 is electrically connected through a line to the second sound signal dividing unit 132 to divide the second sound signal of the third sub-band section into a plurality of sequential frames along the time axis to calculate the power value of the second sound signal of the third sub-band section of the sequential frame.

The fourth power value calculating unit 105-3 is electrically connected through a line to the second sound signal dividing unit 132 to divide the second sound signal of the fourth sub-band section into a plurality of sequential frames along the time axis to calculate the power value of the second sound signal of the fourth sub-band section of the sequential frame.

The calculation of the power value of the second sound signal of the sequential frame is performed by following equation (13) for calculating the power value of the second sound signal of the sequential frame, $$\text{y\_pow}(n) = \sum_{k=K0}^{K1} \sum_{i=0}^{Lk-1} y_k(n-i)^2 \tag{13}$$

wherein the legend "n" is indicative of the serial number of the sampled second sound signal, the legends "K0" and "K1" are indicative of the sub-band numbers, and the legend "$L_k$" is indicative of the number of the sampled second sound signal of the sub-band section of the sequential frame.

The second power value calculating means 106 is constituted by a first power value calculating unit 106-0, a second power value calculating unit 106-1, a third power value calculating unit 106-2, and a fourth power value calculating unit 106-3 to divide the echo replica sound signal into a plurality of the sequential frames along a time axis to calculate the power value of the echo replica sound signal of the sequential frame produced by the echo replica sound signal producing means 114.

The calculation of the power value of the echo replica sound signal of the sequential frame is performed by following equation (14) for calculating the power value of the echo replica sound signal of the sequential frame, $$\text{yhm\_pow}(n) = \sum_{k=K0}^{K1} \sum_{i=0}^{Lk-1} yhm_k(n-i)^2 \tag{14}$$

wherein the legend "n" is indicative of the serial number of the sampled second sound signal, the legends "K0" and "K1" are indicative of the sub-band numbers, and the legend "$L_k$" is indicative of the number of the sampled second sound signal of the sub-band section of the sequential frame.

The third power value calculating means 107 is constituted by a power value calculating unit 107. The power value calculating unit 107 is electrically connected through a line to the difference signal producing unit 103 to divide the difference signal into a plurality of the sequential frames along the time axis to calculate the power value of the difference signal of the sequential frame.

The calculation of the power value of the difference signal of the sequential frame is performed by following equation (15) for calculating the power value of the difference signal of the sequential frame, $$\text{em\_pow}(n) = \sum_{k=K0}^{K1} \sum_{i=0}^{Lk-1} em_k(n-i)^2 \tag{15}$$

wherein the legend "n" is indicative of the serial number of the sampled second sound signal, the legends "K0" and "K1" are indicative of the sub-band numbers, and the legend "$L_k$" is indicative of the number of the sampled second sound signal of the sub-band section of the sequential frame.

The fourth power value calculating means 108 is constituted by a power value calculating unit 108. The power value calculating unit 108 is electrically connected through a line to the power value calculating unit 105 to calculate the power value of the second noise signal of the sequential frame based on the judgment whether or not the power value of the second sound signal of the sub-band section of the current frame exceeds the power value of the second noise signal of the sub-band section the preceding frame after receiving the power value of the second sound signal of the sequential frame calculated by the power value calculating unit 105.

The power value of the second noise signal of the sub-band section of the sequential frame is calculated by two different ways comprising first and second ways on the basis of the judgment whether or not the power value of the second sound signal of the sub-band section of the current frame exceeds the power value of the second noise signal of the sub-band section of the preceding frame after receiving the power value of the second sound signal of the sub-band section of the sequential frame calculated by the power value calculating unit 105.

The first way means that the power value "y_pow(n)" of the second sound signal of the sub-band section of the current frame is substituted for the power value "ny_pow(n)" of the second noise signal of the sub-band section of the current frame when the power value calculating unit 108 is operative to judge as the power value "y_pow(n)" of the second sound signal of the sub-band section of the current frame does not exceed the power value "ny_pow(n−1)" of the second noise signal of the sub-band section of the preceding frame.

The second way means that the power value "ny_pow(n−1)" of the second sound signal of the sub-band section of the preceding frame multiplied by a predetermined updating constant value "Lup" (the predetermined updating constant value Lup>1), Lup*ny_pow(n−1) is substituted for the power value "ny_pow(n)" of the second noise signal of the sub-band section of the current frame when the power value calculating unit 108 is adapted to judge as the power value "y_pow(n)" of the second sound signal of the sub-band section of the current frame exceeds the power value "ny_pow(n−1)" of the second noise signal of the sub-band section of the preceding frame.

The attenuation signal producing means 111 is operative to produce an attenuation signal after receiving the power value of the second sound signal calculated by the power value calculating unit 105 and the power value of the echo replica sound signal calculated by the power value calculating unit 106. The attenuation signal producing means 111 comprises a power value ratio calculating unit 109, a peak value judging unit 110, an attenuation signal judging unit 111.

The power value ratio calculating unit 109 has first and second input terminals, the above first input terminal being electrically connected through a line to the power value calculating unit 105, the above second input terminal being electrically connected through a line to the power value calculating unit 106. The power value ratio calculating unit 109 is adapted to calculate the ratio of the power value of the second sound signal of the sub-band section of the sequential frame calculated by the power value calculating unit 105 to the power value of the echo replica sound signal of the sub-band section of the sequential frame calculated by the power value calculating unit 106. The ratios of the power value of the second sound signal of the sub-band section of the sequential frame to, the power value of the echo replica sound signal of the sub-band section of the sequential frame calculated have a peak value. The ratios of the power value of the second sound signal of the sub-band section of the sequential frame to the power value of the echo replica sound signal of the sub-band section of the sequential frame have a ratio of the power value of the second sound signal of the sub-band section of the current frame to the power value of the echo replica sound signal of the sub-band section of the current frame, and a ratio of the power value of the second sound signal of the sub-band section of the preceding frame to the power value of the echo replica sound signal of the sub-band section of the preceding frame.

The peak value judging unit 110 is electrically connected through a line to the power value ratio calculating unit 109. The peak value judging unit 110 is adapted to judge whether or not the ratio of the power value of the second sound signal of the sub-band section of the current frame to the power value of the echo replica sound signal of the sub-band section of the current frame exceeds the ratio of the power value of the second sound signal of the sub-band section of the preceding frame to the power value of the echo replica sound signal of the sub-band section of the preceding frame to calculate a peak value of the ratio of the power value of the second sound signal of the sub-band section of the sequential frame to the power value of the echo replica sound signal of the sub-band section of the sequential frame.

The peak value of the ratio of the current frame is represented by the legend "peak_ratio(n)". The peak value of the ratio of the preceding frame is represented by the legend "peak_ratio(n−1)".

The peak value "peak_ratio(n)" of ratio of the sequential frame is calculated by two different ways comprising first and second ways on the basis of the judgment whether or not the ratio "pow_ratio(n)" of the power value of the second sound signal of the sub-band section of the current frame to the power value of the echo replica sound signal of the sub-band section of the current frame exceeds the ratio "pow_ratio(n−1)" of the power value of the second sound signal of the sub-band section of the preceding frame to the power value of the echo replica sound signal of the sub-band section of the preceding frame after receiving the ratio "pow_ratio(n)" of the power value of the second sound signal of the sub-band section of the sequential frame calculated by the power value ratio calculating unit 109.

The first way means that the ratio "pow_ratio(n)" of the power value of the second sound signal of the sub-band section of the current frame to the power value of the echo replica sound signal of the sub-band section of the current frame is substituted for the peak value "peak_ratio(n)" of the ratio of the current frame when the peak value judging unit 110 is adapted to judge as the ratio "pow_ratio(n)" of the power value of the second sound signal of the sub-band section of the current frame to the power value of the echo replica sound signal of the sub-band section of the current frame exceeds the ratio "pow_ratio(n−1)" of the power value of the second sound signal of the sub-band section of the preceding frame to the power value of the echo replica sound signal of the sub-band section of the preceding frame.

The second way means that peak value "peak_ratio(n−1)" of the ratio of the preceding frame multiplied by a predetermined updating constant value "Ldn" (the predetermined updating constant value Ldn<1), Ldn * peak_ratio (n−1) is substituted for the peak value "peak_ratio(n)" of the ratio of the current frame when the peak value judging unit 110 is adapted to judge as the ratio "pow_ratio(n)" of the power value of the second sound signal of the sub-band section of the current frame to the power value of the echo replica sound signal of the sub-band section of the current frame does not exceed the ratio "pow_ratio(n−1)" of the power value of the second sound signal of the sub-band section of the preceding frame to the power value of the echo replica sound signal of the sub-band section of the preceding frame.

The attenuation signal judging unit 111 is electrically connected through a line to the power value calculating unit 105, the power value calculating unit 106, and the power value ratio calculating unit 109. The attenuation signal judging unit 111 is adapted to judge whether or not the ratio of the power value of the second sound signal of the sub-band section of the sequential frame to the power value of the echo replica sound signal of the sub-band section of the sequential frame exceeds a predetermined threshold power value to calculate and produce an attenuation signal after receiving the peak value of the ratio of the power value of the second sound signal of the sub-band section of the sequential frame calculated by the power value calculating unit 105 to the power value of the echo replica sound signal of the sub-band section of the sequential frame calculated by the power value calculating unit 106, and the power value of the difference signal of the sub-band section of the sequential frame calculated by the power value calculating unit 107.

The attenuation signal "Atti" of the sequential frame is calculated by the two different ways comprising first and second ways on the basis of the judgment whether or not the ratio of the power value of the second sound signal of the sequential frame to the power value of the echo replica sound signal of the sub-band section of the sequential frame exceeds the predetermined threshold power value.

The first way means that a numeral number "1" is substituted for the attenuation signal "Atti" when the ratio of the power value of the second sound signal of the sub-band section of the sequential frame to the power value of the echo replica sound signal of the sub-band section of the sequential frame exceeds the predetermined threshold value "α" (the predetermined threshold value α>1).

The second way means that the attenuation signal "Atti" is calculated by the following equation (16) when the ratio of the power value of the second sound signal of the sub-band section of the sequential frame to the power value of the echo replica sound signal of the sub-band section of the sequential frame does not exceed the predetermined threshold value "α".

$$Atti=(ny\_pow(n)/em\_pow(n))^{1/2} \quad (16)$$

The attenuation signal obtaining means 112 is constituted by an attenuation signal obtaining unit 112. The attenuation signal obtaining unit 112 is electrically connected through a line to the attenuation signal producing unit 111 to receive the attenuation signal produced by the attenuation signal producing unit 111. The attenuation signal obtaining unit 112 obtains an attenuation signal of the sequential frame through calculating the following equation (17):

$$Att(n)=Att(n-1)+Lts*(Atti-Att(n-1)) \quad (17)$$

wherein the legend "Lts" is indicative of a predetermined value (0<Lts<1). The legend "Atti" is indicative of the attenuation signal. The legend "Atti(n)" is indicative of the square root of the ratio of the power value of the second noise signal component of the sub-band section of the current frame to the power value of the difference signal of the sub-band section of the current frame. The legend "Atti(n−1)" is indicative of the square root of the ratio of the power value of the second noise signal component of the sub-band section of the preceding frame to the power value of the difference signal of the sub-band section of the preceding frame.

In the attached drawings is no flow chart showing the process of the third embodiment of the echo sound signal suppressing apparatus, but the process of the third embodiment differing from that of the first embodiment of the echo sound signal suppressing apparatus will simply be described hereinafter.

The first sound signal are initially divided into four sub-band sections along a frequency axis by the sound signal dividing unit 131.

The first echo replica sound signal of the sub-band section is then produced on the basis of the first sound signal and the second sound signal by the adaptive processing unit 101-0 to 101-3.

The judgment is then made on whether or not to update the filter coefficient by the second filter coefficient judging unit 104-0 to 104-3. The updating of the filter coefficient is executed a predetermined time interval.

The second echo replica sound signal of the sub-band section indicative of the replica of the echo sound signal component of the sub-band section is then produced by the second filter unit 102-0 to 102-3 on the basis of the filter coefficient.

The difference signal subtracting the second echo replica sound signal of the sub-band section from the second sound signal of the sub-band section is then produced by the difference signal producing unit 103-0 to 103-3.

The power value of the second sound signal of the sub-band section of the sequential frame is then calculated by the power value calculating unit 105.

The power value of the band-limited echo replica sound signal of the sub-band section of the sequential frame is then calculated by the power value calculating unit 106.

The power value of the difference signal of the sub-band section of the sequential frame is then calculated by the power value calculating unit 107.

The power value of the second noise signal of the sub-band section of the sequential frame is then calculated on the basis of the judgment whether or not the power value of the second sound signal of the sub-band section of the current frame exceeds the power value of the second noise signal of the sub-band section of the preceding sequential by the power value calculating unit 108.

The ratio of the power value of the second sound signal of the sub-band section of the sequential frame to the power value of the echo replica sound signal of the sub-band section of the sequential frame is then calculated by the power value ratio calculating unit 109.

The peak value of the ratio of the power value of the second sound signal of the sub-band section of the sequential frame to the power value of the echo replica sound signal of the sub-band section of the sequential frame is then calculated and updated on the basis of the judgment whether or not the ratio of the power value of the second sound signal of the sub-band section of the current frame to the power value of the echo replica sound signal of the sub-band section of the current frame exceeds the ratio of the power value of the second sound signal of the sub-band section of the preceding frame to the power value of the echo replica sound signal of the sub-band section of the preceding frame by the peak value judging unit 110.

The attenuation signal is then produced on the basis of the judgment whether or not the ratio of the power value of the second sound signal of the sub-band section of the sequential frame to the power value of the echo replica sound signal of the sub-band section of the sequential frame exceeds the predetermined threshold power value by the attenuation signal producing unit 111, and four different power values comprising the power value of the second sound signal of the sub-band section of the sequential frame, the power value of the echo replica sound signal of the sub-band section of the sequential frame, the power value of the difference signal of the sub-band section of the sequential frame, and the power value of the second noise signal of the sub-band section of the sequential frame.

The attenuation signal is then produced and updated on the basis of the attenuation signal of the current frame and the attenuation signal of the preceding frame by the attenuation signal obtaining unit 112.

The difference signal component is suppressed to the minimum level with the attenuation signal under the condition that the near-end speaker sound signal component is allowed to pass therethrough by the echo sound suppressing unit 113.

The calculation of the power value of the band-limited second noise signal of the sequential frame previously mentioned will be described in detail hereinafter.

The power value "y_pow(n)" of the second sound signal of the sub-band section of the current frame is initially compared with the power value "ny_pow(n−1)" of the second noise signal of the sub-band section of the preceding frame by the power value calculating unit 108.

The power value "y_pow(n)" of the second sound signal of the current frame is then substituted for the power value "ny_pow(n)" of the second noise signal of the sub-band section of the current frame when the power value calculating unit 108 is operative to judge as the power value "y_pow(n)" of the second sound signal of the sub-band section of the current frame does not exceed the power value "ny_pow(n−1)" of the second noise signal of the sub-band section of the preceding frame by the power value calculating unit 108.

The power value "ny_pow(n−1)" of the second sound signal of the sub-band section of the preceding frame multiplied by a predetermined updating constant value "Lup" (the predetermined updating constant value Lup>1), Lup*ny_pow(n−1), on the other hand, is substituted for the power value "ny_pow(n)" of the band-limited second noise signal of the sub-band section of the current frame when the power value calculating unit 108 is adapted to judge as the power value "y_pow(n)" of the second sound signal of the sub-band section of the current frame exceeds the power value "ny_pow(n−1)" of the second noise signal of the sub-band section of the preceding frame by the power value calculating unit 108.

The calculation of the peak value of the ratio of the power value of the second sound signal of the sub-band section of the sequential frame to the power value of the echo replica sound signal of the sub-band section of the sequential frame previously mentioned will be described in detail hereinafter.

The ratio "pow_ratio(n)" of the power value of the second sound signal of the sub-band section of the current frame to the power value of the echo replica sound signal of the sub-band section of the current frame is initially compared with the ratio "pow_ratio(n−1)" of the power value of the second sound signal of the sub-band section of the preceding frame to the power value of the echo replica sound signal of the sub-band section of the preceding frame by the peak value judging unit 110.

The ratio "pow_ratio(n)" of the power value of the second sound signal of the sub-band section of the current frame to the power value of the echo replica sound signal of the sub-band section of the current frame is then substituted for the peak value "peak_ratio(n)" of the ratio of the current frame when the peak value judging unit 110 is adapted to judge as the ratio "pow_ratio(n)" of the power value of the second sound signal of the sub-band section of the current frame to the power value of the echo replica sound signal of the sub-band section of the current frame does not exceed the ratio "peak_ratio(n−1)" of the power value of the second sound signal of the sub-band section of the preceding frame to the power value of the echo replica sound signal of the sub-band section of the preceding frame by the peak value judging unit 110.

The peak value "peak_ratio(n)" of the ratio of the preceding frame multiplied by a predetermined updating constant value "Ldn" (the predetermined updating constant value Ldn<1), Ldn * peak_ratio(n−1), on the other hand, is substituted for the peak value "peak_ratio(n)" of the ratio of the current frame when the peak value judging unit 110 is adapted to judge as the ratio "pow_ratio(n)" of the power value of the second sound signal of the sub-band section of the current frame to the power value of the echo replica sound signal of the sub-band section of the current frame exceeds the ratio "pow_ratio(n−1)" of the power value of the second sound signal of the sub-band section of the preceding frame to the power value of the echo replica sound signal of the sub-band section of the preceding frame by the peak value judging unit 110.

The production of the attenuation signal previously mentioned will be described in detail hereinafter.

The ratio "peak_ratio(n)" of the power value of the second sound signal of the sub-band section of the sequential frame to the power value of the echo replica sound signal of the sub-band section of the sequential frame is initially compared with the predetermined threshold value "α" (the predetermined threshold value α>1) by the attenuation signal judging unit 111.

A numeral number "1" is then substituted for the attenuation signal "Atti" when the ratio "peak_ratio(n)" of the power value of the second sound signal of the sub-band section of the sequential frame to the power value of the echo replica sound signal of the sub-band section of the sequential frame exceeds the predetermined threshold value "α" by the attenuation signal judging unit 111.

The attenuation signal "Atti" is then calculated by the previously mentioned equation (16) when the ratio "peak_ratio(n)" of the power value of the second sound signal of the sub-band section of the sequential frame to the power value of the echo replica sound signal of the sub-band section of the sequential frame does not exceed the predetermined threshold value "α" by the attenuation signal judging unit 111.

From the above detailed description, it will be understood that the third embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the fours embodiment of the echo sound signal suppressing apparatus different from those of the first to third embodiments of the echo sound signal suppressing apparatus.

Figure 4:
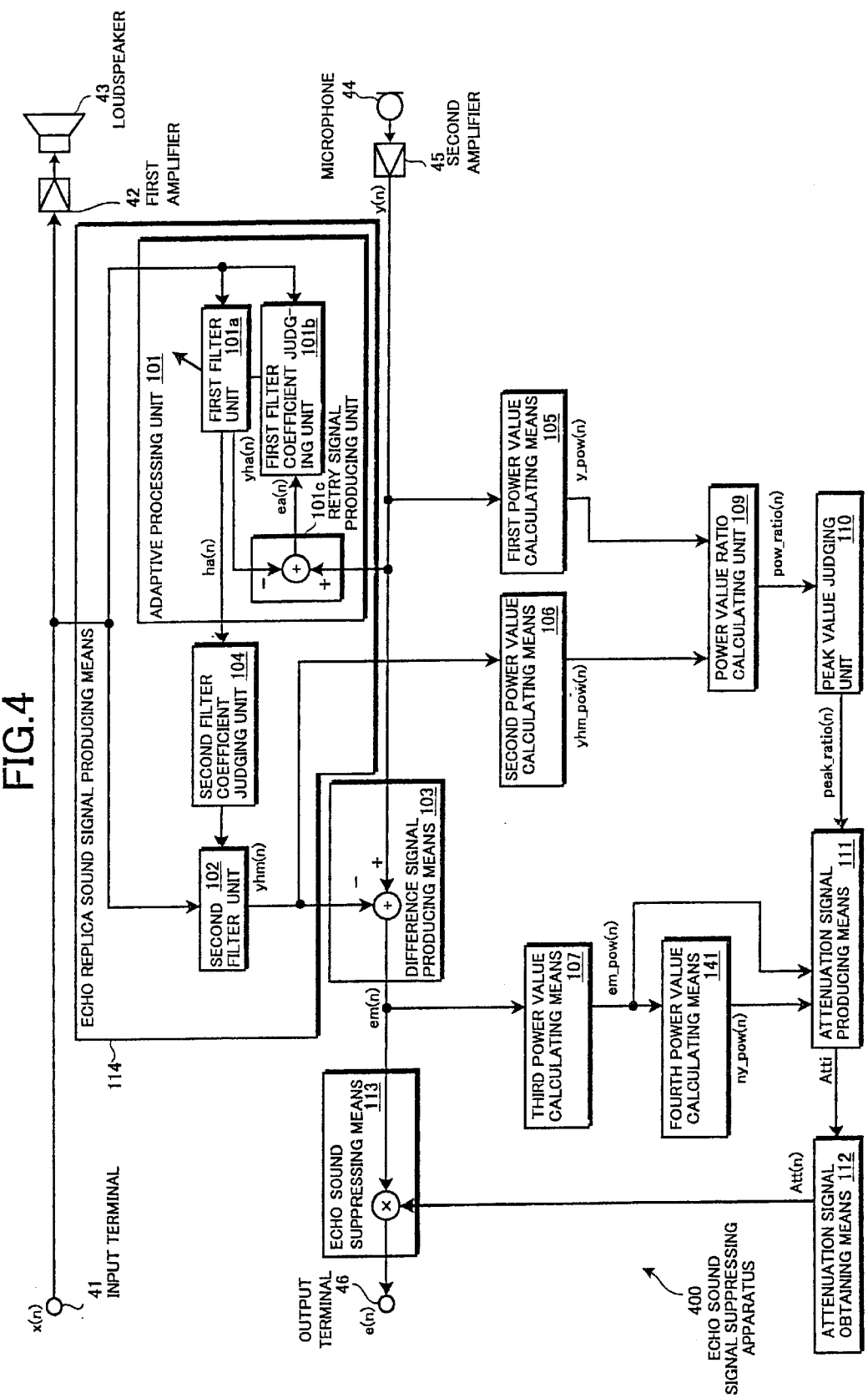
FIG. 4 is a block diagram of the fourth embodiment of the echo sound signal suppressing apparatus according to the present invention.

The fourth embodiment of the echo sound signal suppressing apparatus 400 according to the present invention is shown in FIG. 4 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, and the power value ratio calculating unit 109, the peak value judging means 110, and the attenuation signal obtaining means 112, all of which are the same in construction as the first embodiment of the echo sound signal suppressing apparatus 100 shown in FIG. 1 and thus its construction will not be described hereinafter. The fourth embodiment of the echo sound signal suppressing apparatus 400 shown in FIG. 4 further comprises a fourth power value calculating means 141, and an attenuation signal producing means 111.

The fourth power value calculating means 141 is constituted by a power value calculating unit 141. The power value calculating unit 141 is electrically connected through a line to the power value calculating unit 107 to calculate the power value of the second noise signal component after receiving the power value of the difference signal calculated by the power value calculating unit 107. Similarly to the calculation of the power value of the second noise signal component performed by the fourth power value calculating means 108 as has been described with reference to the first embodiment according to the present invention, the power value of the second noise signal component of the sequential frame is calculated by the two different ways comprising first and second ways on the basis of the judgment whether or not the power value of the second sound signal of the current frame exceeds the power value of the second noise signal of the preceding frame after receiving the power value of the difference signal of the sequential frame calculated by the power value calculating unit 107. The first way means that the power value "em_pow(n)" of the difference signal of the current frame is substituted for the power value "ny_pow(n)" of the second noise signal of the current frame when the power value calculating unit 141 is operative to judge as the power value "em_pow(n)" of the difference signal of the current frame does not exceed the power value "ny_pow(n−1)" of the second noise signal of the preceding frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the second sound signal of the current frame exceeds the power value "ny_pow(n−1)" of the second noise signal of the preceding frame.

The attenuation value calculating means 111 is constituted by an attenuation signal calculating unit 111. The attenuation signal judging unit 111 has three input terminal comprising first to third input terminal, the first input terminal being electrically connected through a line to the power value calculating unit 107, the second input terminal being electrically connected through a line to the power value calculating unit 141, and the third input terminal being electrically connected through a line to the peak value judging unit 110. The attenuation signal judging unit 111 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 105 and the power value of the difference signal calculated by the power value calculating unit 107. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

In the attached drawings is no flow chart showing the process of the fourth embodiment of the echo sound signal suppressing apparatus, but the process of the fourth embodiment differing from that of the first embodiment of the echo sound signal suppressing apparatus will simply be described hereinafter.

The power value of the second noise signal of the sequential frame is then calculated on the basis of the judgment whether or not the power value of the second sound signal of the current frame exceeds the power value of the second noise signal of the preceding sequential by the power value calculating unit 141. The ratio of the power value of the second sound signal of the sequential frame to the power value of the echo replica sound signal of the sequential frame is then calculated by the power value ratio calculating unit 109. The peak value of the ratio of the power value of the second sound signal of the sequential frame to the power value of the echo replica sound signal of the sequential frame is then calculated and updated by the peak value judging unit 110 on the basis of the judgment whether or not the ratio of the power value of the second sound signal of the current frame to the power value of the echo replica sound signal of the current frame exceeds the ratio of the power value of the second sound signal of the preceding frame to the power value of the echo replica sound signal of the preceding frame. The attenuation signal is then produced by the attenuation signal producing unit 111 on the basis of the judgment whether or not the ratio of the power value of the second sound signal of the sequential frame to the power value of the echo replica sound signal of the sequential frame exceeds the predetermined threshold power value, and three different power values comprising the power value of the second sound signal of the sequential frame, the power value of the echo replica sound signal of the sequential frame, the power value of the difference signal of the sequential frame, and the power value of the second noise signal of the sequential frame.

From the above detailed description, it will be understood that the fourth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the fifth embodiment of the echo sound signal suppressing apparatus different from those of the first to fourth embodiments of the echo sound signal suppressing apparatus.

Figure 5:
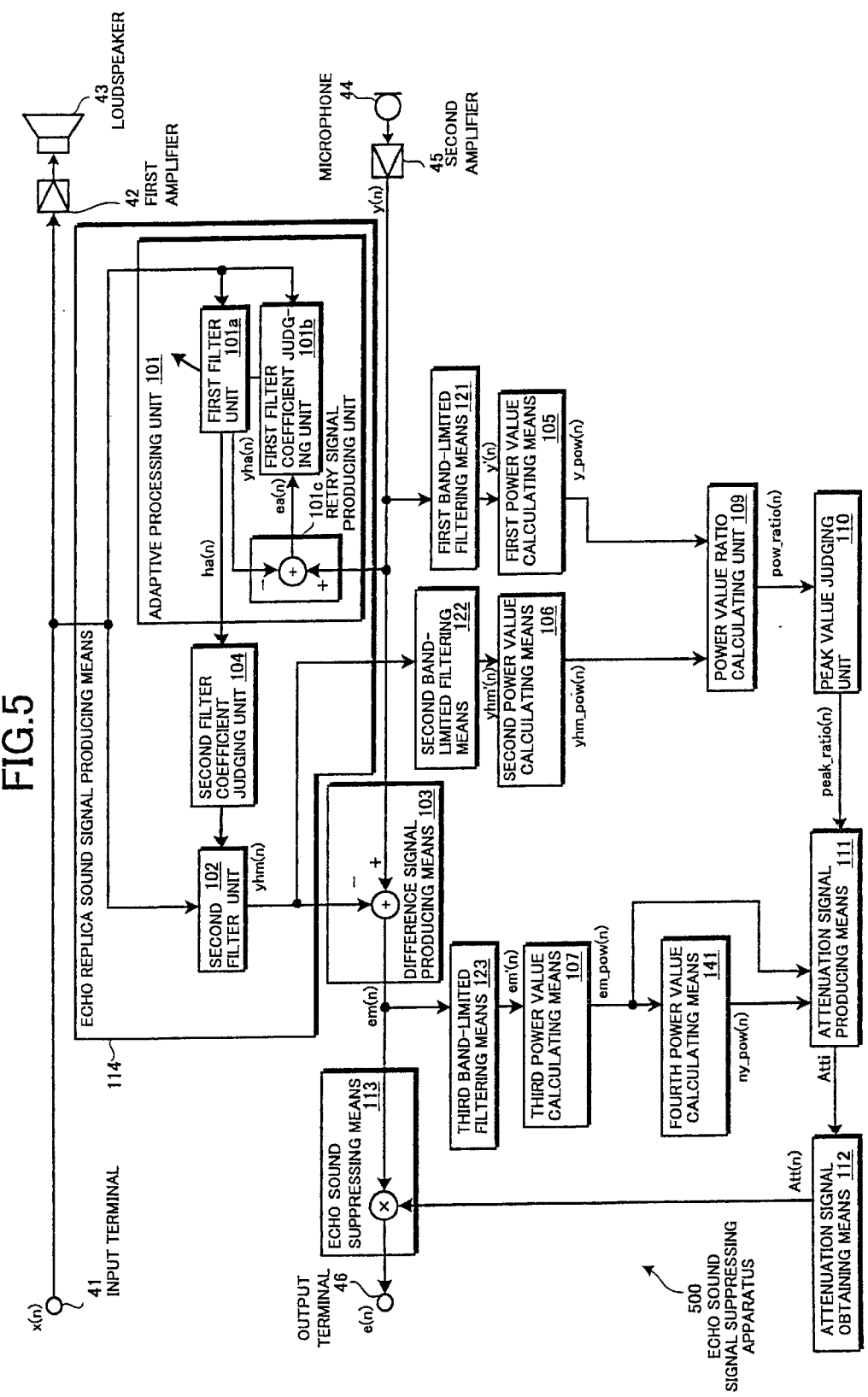
FIG. 5 is a block diagram of the fifth embodiment of the echo sound signal suppressing apparatus according to the present invention.

The fifth embodiment of the echo sound signal suppressing apparatus 500 according to the present invention is shown in FIG. 5 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the first filtering means 121, the second filtering means 122, the third filtering means 123, the power value ratio calculating unit 109, the peak value judging means 110, the attenuation signal updating means 112, and the echo sound suppressing means 113, all of which are the same in construction as the second embodiment of the echo sound signal suppressing apparatus 200 shown in FIG. 2 and thus its construction will not be described hereinafter. The fifth embodiment of the echo sound signal suppressing apparatus 500 shown in FIG. 5 further comprises a fourth power value calculating means 141, and an attenuation signal producing means 111.

The fourth power value calculating means 141 is constituted by a power value calculating unit 141. The power value calculating unit 141 is electrically connected through a line to the power value calculating unit 107 to calculate the power value of the second noise signal component after receiving the power value of the band-limited difference signal calculated by the power value calculating unit 107. Similarly to the calculation of the power value of the second noise signal component performed by the fourth power value calculating means 108 as has been described with reference to the second embodiment according to the present invention, the power value of the second noise signal component of the sequential frame is calculated by the two different ways comprising first and second ways on the basis of the judgment whether or not the power value of the second sound signal of the current frame exceeds the power value of the second noise signal of the preceding frame after receiving the power value of the band-limited difference signal of the sequential frame calculated by the power value calculating unit 107. The first way means that the power value "em_pow(n)" of the band-limited difference signal of the current frame is substituted for the power value "ny_pow(n)" of the second noise signal of the current frame when the power value calculating unit 141 is operative to judge as the power value "em_pow(n)" of the band-limited difference signal of the current frame does not exceed the power value "ny_pow(n−1)" of the second noise signal of the preceding frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the second sound signal of the current frame exceeds the power value "ny_pow(n−1)" of the second noise signal of the preceding frame.

The attenuation value calculating means 111 is constituted by an attenuation signal calculating unit 111. The attenuation signal judging unit 111 has three input terminal comprising first to third input terminal, the first input terminal being electrically connected through a line to the power value calculating unit 107, the second input terminal being electrically connected through a line to the power value calculating unit 141, and the third input terminal being electrically connected through a line to the peak value judging unit 110. The attenuation signal judging unit 111 is adapted to calculate the attenuation value of the current frame on the basis of the judgment whether or not the peak value of the ratio of the power value of the band-limited second sound signal of the sequential frame to the power value of the band-limited echo replica sound signal of the sequential frame exceeds a predetermined threshold value "α" after receiving the peak value of the ratio of the power value of the band-limited second sound signal of the current frame to the power value of the band-limited echo replica sound signal of the current frame judged by the peak value judging unit 110, the power value of the second noise signal of the current frame calculated by the power value calculating unit 105 and the power value of the band-limited difference signal calculated by the power value calculating unit 107. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame exceeds a predetermined threshold value "α". The second way means that the square root of the ratio of the power value "ny_pow(n)" of the second noise signal of the current frame to the power value "em_pow(n)" of the band-limited difference signal of the current frame is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame does not exceed a predetermined threshold value "α".

From the above detailed description, it will be understood that the fifth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the sixth embodiment of the echo sound signal suppressing apparatus different from those of the first to fifth embodiments of the echo sound signal suppressing apparatus.

Figure 6:
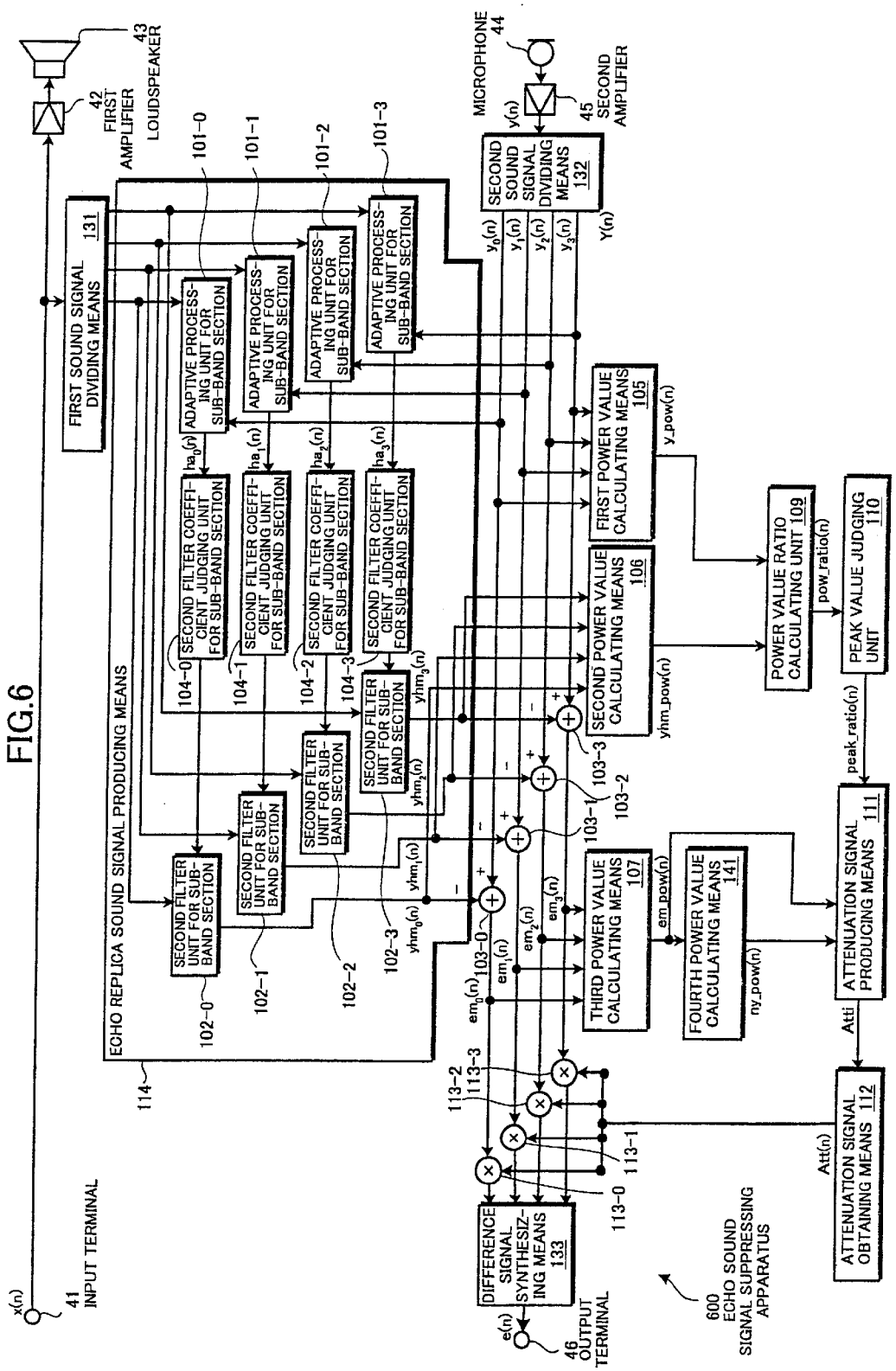
FIG. 6 is a block diagram of the sixth embodiment of the echo sound signal suppressing apparatus according to the present invention.

The sixth embodiment of the echo sound signal suppressing apparatus 600 according to the present invention is shown in FIG. 6 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, the peak value judging means 110, and the attenuation signal obtaining means 112, all of which are the same in construction as the first embodiment of the echo sound signal suppressing apparatus 100 shown in FIG. 1 and thus its construction will not be described hereinafter. The sixth embodiment of the echo sound signal suppressing apparatus 600 shown in FIG. 6 further comprises a fourth power value calculating means 141, and an attenuation signal producing means 111.

The fourth power value calculating means 141 is constituted by a power value calculating unit 141. The power value calculating unit 141 is electrically connected through a line to the power value calculating unit 107 to calculate the power value of the second noise signal component after receiving the power value of the difference signal calculated by the power value calculating unit 107. Similarly to the calculation of the power value of the second noise signal component performed by the fourth power value calculating means 108 as has been described with reference to the first embodiment according to the present invention, the power value of the second noise signal component of the sub-band section of the sequential frame is calculated by the two different ways comprising first and second ways on the basis of the judgment whether or not the power value of the second sound signal of the sub-band section of the current frame exceeds the power value of the second noise signal of the sub-band section of the preceding frame after receiving the power value of the difference signal of the sub-band section of the sequential frame calculated by the power value calculating unit 107. The first way means that the power value "em_pow(n)" of the difference signal of the sub-band section of the current frame is substituted for the power value "ny_pow(n)" of the second noise signal of the sub-band section of the current frame when the power value calculating unit 141 is operative to judge as the power value "em_pow(n)" of the difference signal of the sub-band section of the current frame does not exceed the power value "ny_pow(n−1)" of the second noise signal of the sub-band section of the preceding frame. The second way means that the power value "ny_pow(n−1)" of the second noise signal of the sub-band section of the preceding frame multiplied by a predetermined updating constant value "Lup" (the predetermined updating constant value Lup>1), Lup*ny_pow(n−1) is substituted for the power value "ny_pow(n)" of the second noise signal of the sub-band section of the current frame when the first power value calculating unit 108 is adapted to judge as the power value "y_pow(n)" of the second sound signal of the sub-band section of the current frame exceeds the power value "ny_pow(n−1)" of the second noise signal of the sub-band section of the preceding frame.

The attenuation value calculating means 111 is constituted by an attenuation signal calculating unit 111. The attenuation signal judging unit 111 has three input terminal comprising first to third input terminal, the first input terminal being electrically connected through a line to the power value calculating unit 107, the second input terminal being electrically connected through a line to the power value calculating unit 141, and the third input terminal being electrically connected through a line to the peak value judging unit 110. The attenuation signal judging unit 111 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 105 and the power value of the difference signal calculated by the power value calculating unit 107. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

From the above detailed description, it will be understood that the sixth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the seventh embodiment of the echo sound signal suppressing apparatus different from those of the first to sixth embodiment of the echo sound signal suppressing apparatus.

Figure 7:
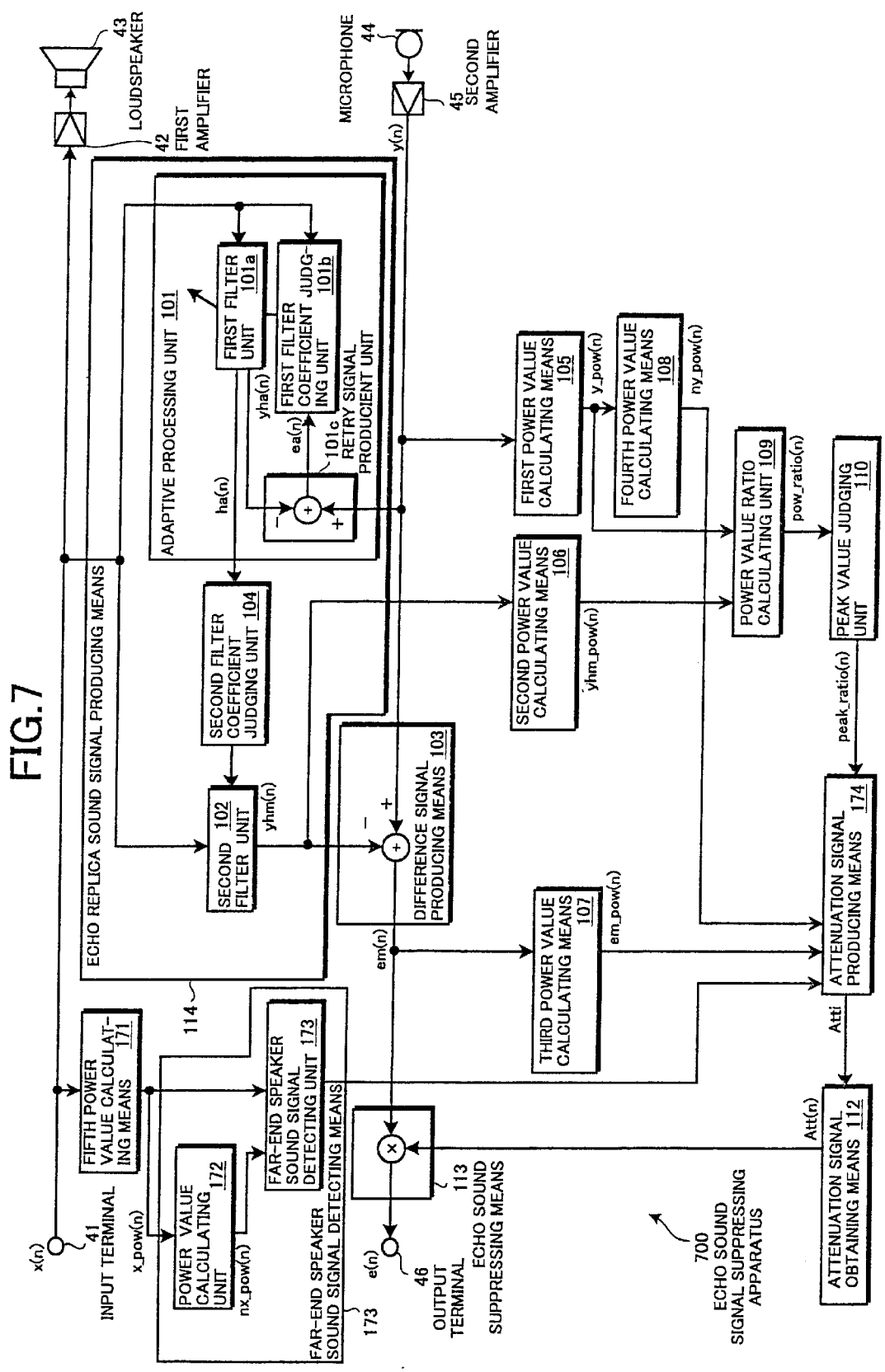
FIG. 7 is a block diagram of the seventh embodiment of the echo sound signal suppressing apparatus according to the present invention.

The seventh embodiment of the echo sound signal suppressing apparatus 700 according to the present invention is shown in FIG. 7 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, and an attenuation signal updating means 112, all of which are the same in construction as the first embodiment of the echo sound signal suppressing apparatus 100 shown in FIG. 1 and thus its construction will not be described hereinafter. The seventh embodiment of the echo sound signal suppressing apparatus 700 shown in FIG. 7 further comprises a fourth power value calculating means 108, a fifth power value calculating means 171, a far-end speaker sound signal detecting means 173, and an attenuation signal producing means 111.

The fourth power value calculating means 108 is constituted by a power value calculating unit 105. The power value calculating unit 108 is electrically connected through a line to the power value calculating unit 105 to calculate the power value of the second noise signal after receiving the power value of the second sound signal calculated by the first power value calculating means 105. Similarly to the calculation of the power value of the second noise signal component performed by the fourth power value calculating means 108 as has been described with reference to the first embodiment according to the present invention, the power value of the second noise signal component of the sequential frame is calculated by the two different ways comprising first and second ways on the basis of the judgment whether or not the power value of the second sound signal of the current frame exceeds the power value of the second noise signal of the preceding frame after receiving the power value of the second sound signal of the sequential frame calculated by the third power value calculating means 105. The first way means that the power value "y_pow(n)" of the second sound signal of the current frame is substituted for the power value "ny_pow(n)" of the second noise signal of the current frame when the fourth power value calculating means 108 is operative to judge as the power value "y_pow(n)" of the second sound signal of the current frame does not exceed the power value "ny_pow(n−1)" of the second noise signal of the current frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the second sound signal of the current frame exceeds the power value "ny_pow(n−1)" of the second noise signal of the preceding frame.

The fifth power value calculating means 171 is constituted by a power value calculating unit 171. The power value calculating unit 171 is electrically connected through a line to the input terminal 41 to divide the first sound signal into a plurality of sequential frame along the time axis to calculate the power value of the first sound signal component of the sequential frame. The power value of the first sound signal is represented by the reference legend "x_pow". The calculation of the power value calculating unit 171 is preformed by the following equation (18) for calculating the power value of the first sound signal of the sequential fame.

$$x\_pow(n) = \sum_{i=0}^{L-1} x(n-i)^2 \tag{18}$$

wherein the legend "L" is indicative of the number of the sampled first sound signal of the sequential frame, and the legend "n" is indicative of the serial number of the sampled first sound signal.

The far-end speaker sound signal detecting means 173 is constituted by a power value calculating unit 172 and a far-end speaker sound signal detecting unit 173. The power value calculating unit 172 is electrically connected through a line to the power value calculating unit 171 to calculate the power value of the first noise signal component of the sequential frame on the basis of the power value of the first sound signal of the sequential frame calculated by the first power value calculating unit 171. The power value of the first noise signal component of the sequential frame is calculated by the two different ways comprising first and second ways on the basis of the judgment whether or not the power value of the first sound signal of the current frame exceeds the power value of the first noise signal of the preceding frame after receiving the power value of the first sound signal of the sequential frame calculated by the power value calculating unit 171. The first way means that the power value "x_pow(n)" of the first sound signal of the current frame is substituted for the power value "nx_pow(n)" of the first noise signal of the current frame when the first power value calculating unit 171 is adapted to judge as the power value "x_pow(n)" of the first sound signal of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the first power value calculating unit 171 is adapted to judge as the power value "x_pow(n)" of the first sound signal of the current frame exceeds the power value "ny_pow(n−1)" of the first noise signal of the preceding frame.

The far-end speaker sound signal detecting unit 173 has two input terminals comprising first and second input terminals, the first terminal being electrically connected through a line to the power value calculating unit 171, the second input terminal being electrically connected through a line to the power value calculating unit 172. The far-end speaker sound signal detecting unit 173 is operative to detect the far-end speaker sound signal component on the basis of the judgment whether or not the power value of the first sound signal of the sequential frame calculated by the power value calculating means 171 exceeds the power value of the first noise signal component of the sequential frame calculated by the power value calculating means 172.

The attenuation value calculating means 174 is constituted by an attenuation signal calculating unit 174. The attenuation signal judging unit 174 has three input terminal comprising first to third input terminal, the first input terminal being electrically connected through a line to the power value calculating unit 107, the second input terminal being electrically connected through a line to the power value calculating unit 141, the third input terminal being electrically connected through a line to the peak value judging unit 110, and fourth input terminal being electrically connected through a line to the far-end speaker sound signal detecting unit 173. The attenuation signal judging unit 111 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 105, the power value of the difference signal calculated by the power value calculating unit 107, and the judgment whether or not the far-end speaker sound signal is detected by the far-end speaker sound signal detecting unit 173. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

Figure 26:
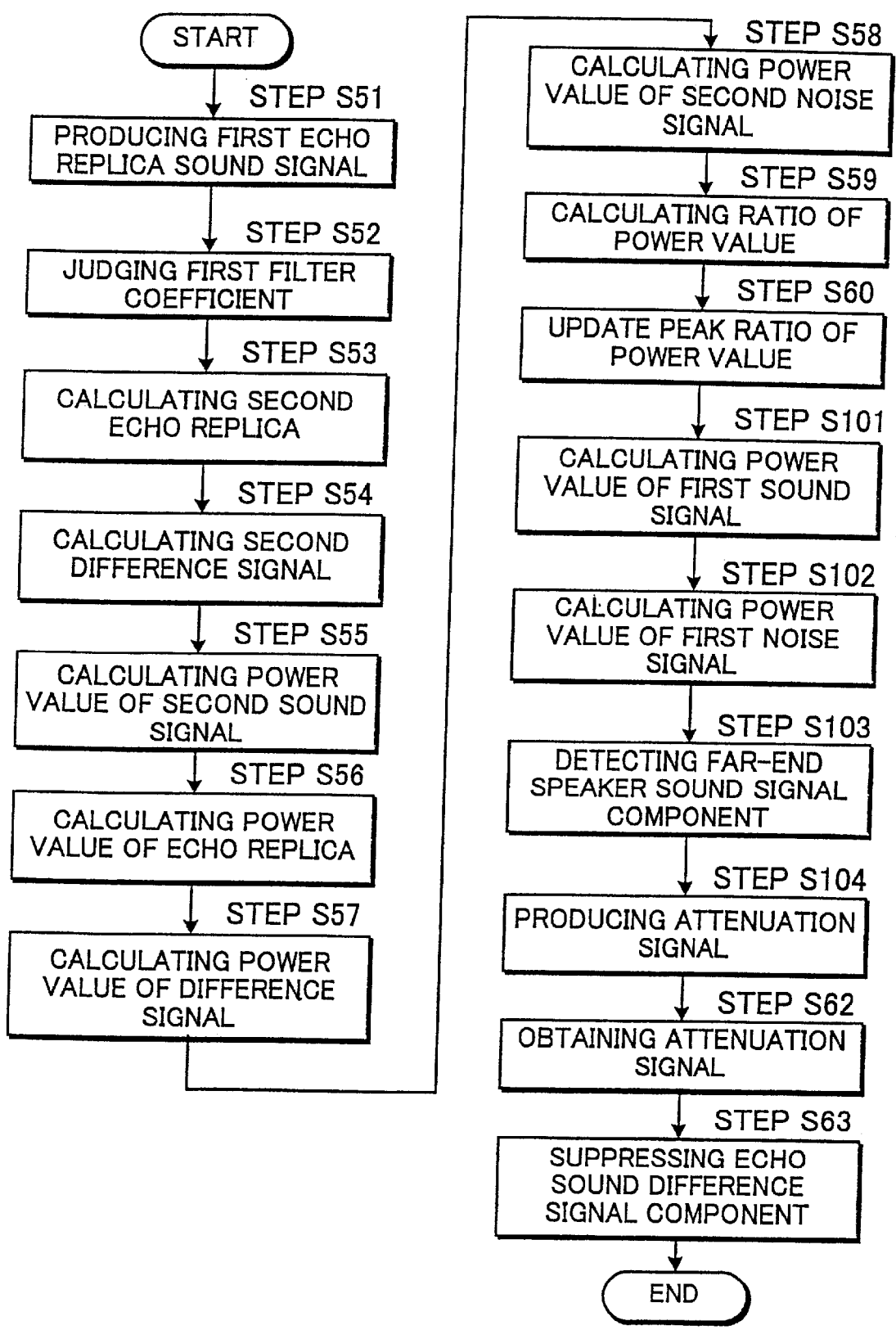
FIG. 26 is a flow chart of the exemplified process of the seventh embodiment of the echo sound signal suppressing apparatus shown in FIG. 7.

The following description will now be directed to the process of the seventh embodiment of the echo sound signal suppressing apparatus 700 according to the present invention with reference to FIGS. 7 and 26.

The first echo replica sound signal is initially produced in the step S51 on the basis of the first sound signal and the second sound signal by the adaptive processing unit 101. This step S51 has three different steps comprising first to third steps. The first step is of producing the echo replica sound signal based on a filter coefficient, the first sound signal and the second sound signal by the first filter unit 101a. The second step is of producing the retry signal indicative of the difference between the first echo replica sound signal and the second sound signal by the retry signal producing unit 101c. The third step is of judging whether or not to update the filter coefficient based on the retry signal by the first filter coefficient judging unit 101b. When the answer in third step is in the affirmative "YES", i.e., the filter coefficient is updated, the third step returns to the first step. The first step is of producing the echo replica sound signal based on the updated filter coefficient. When, on the other hand, the answer in third step is in the negative "NO", i.e., the filter coefficient is not updated, the third step proceeds to the step S52. The judgment is then made on whether or not to update the filter coefficient in the step S52 by the second filter coefficient judging unit 104a. The updating of the filter coefficient is executed at predetermined time interval. The step S52 proceeds the step S53. The second echo replica sound signal indicative of the replica of the echo sound signal component is then produced in the step S53 by the second filter unit 102 on the basis of the filter coefficient judged in the step S52. The difference signal subtracting the second echo replica sound signal from the second sound signal is then produced in the step S54 by the difference signal producing unit 103.

The power value of the second sound signal of the sequential frame is then calculated in the step S55 by the power value calculating unit 105. The power value of the echo replica sound signal of the sequential frame is then calculated in the step S56 by the power value calculating unit 106. The power value of the difference signal of the sequential frame is then calculated in the step S57 by the power value calculating unit 107. The power value of the second noise signal of the sequential frame is then calculated on the basis of the judgment whether or not the power value of the second sound signal of the current frame exceeds the power value of the second noise signal of the preceding sequential in the step S58 by the power value calculating unit 108. The ratio of the power value of the second sound signal of the sequential frame calculated in the step S55 to the power value of the echo replica sound signal of the sequential frame calculated in the step S56 is then calculated in the step S59 by the power value ratio calculating unit 109. The peak value of the ratio of the power value of the second sound signal of the sequential frame to the power value of the echo replica sound signal of the sequential frame is then calculated and updated on the basis of the judgment whether or not the ratio of the power value of the second sound signal of the current frame to the power value of the echo replica sound signal of the current frame exceeds the ratio of the power value of the second sound signal of the preceding frame to the power value of the echo replica sound signal of the preceding frame in the step S60 by the peak value judging unit 110.

The power value of the first sound signal of the sequential frame is then calculated in the step S101 by the power value calculating unit 171. The power value of the first noise signal of the sequential frame is then calculated in the step S102 by the power value calculating unit 172. The far-end speaker sound signal of the sequential frame is then detected in the step S103 by the power value calculating unit 173 on the basis of the judgment whether or not the power value of the first sound signal of the sequential frame calculated in the step S101 exceeds the power value of the first noise signal of the sequential frame calculated in the step S102.

This step S101 has two different steps comprising first and second steps. The first step is of judging whether or not the near-end speaker sound signal is detected on the basis of the two different judgment comprising first and second judgments, the above first judgment whether or not the ratio of the power value of the second sound signal of the sequential frame to the power value of the echo replica sound signal of the sequential frame exceeds the predetermined threshold power value by the attenuation signal producing unit 174, the above second judgment whether or not the far-end speaker sound signal is detected in the step 103 by the power value calculating unit 173. The second step is of producing the attenuation signal with two different power values comprising the power value of the second noise signal of the sequential frame calculated in the step S58, the power value of the difference signal of the sequential frame calculated in the step S57 on the basis of the judgment whether or not the near-end speaker sound signal is detected in the above first step.

The attenuation signal is then produced and updated on the basis of the attenuation signal of the current frame and the attenuation signal of the preceding frame in the step S62 by the attenuation signal obtaining unit 112. The difference signal component is suppressed to the minimum level with the attenuation signal under the condition that the near-end speaker sound signal component is allowed to pass therethrough in the step S63 by the echo sound suppressing unit 113.

Figure 23:
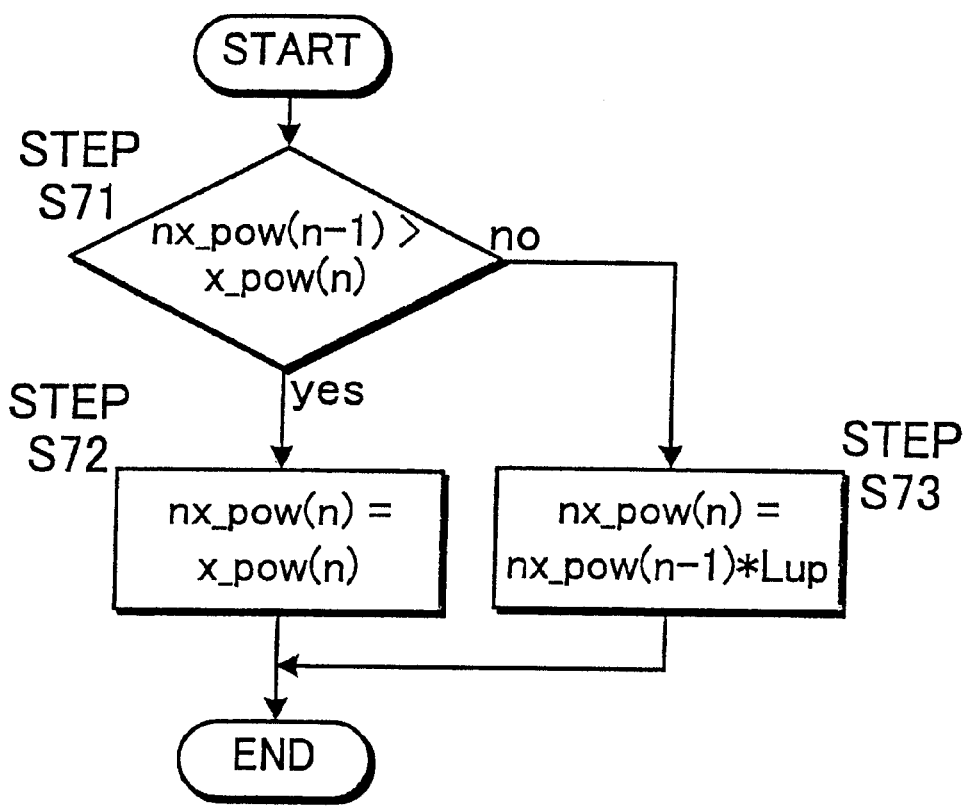
FIG. 23 is a flow chart of the process of the power value calculating means forming part of the seventh embodiment of the echo sound signal suppressing apparatus according to the present invention shown in FIG. 7.

The step S102 previously mentioned will be described in detail hereinafter with reference to FIG. 23.

The judgment is initially made on whether or not the power value "nx_pow(n−1)" of the first noise signal of the preceding frame exceeds the power value "x_pow(n)" of the first sound signal of the current frame in the step S71 by the power value calculating unit 172. When the answer in the step S71 is in the affirmative "YES", i.e., the power value "nx_pow(n−1)" of the first noise signal of the preceding frame exceeds the power value "x_pow(n)" of the first sound signal of the current frame, the step S71 proceeds to the step S72. When, on the other hand, the answer in the step S71 is in the negative "NO", i.e., the power value "nx_pow (n−1)" of the first noise signal of the preceding frame does not exceed the power value "x_pow(n)" of the first sound signal of the current frame, the step S71 proceeds to the step S73.

The power value "x_pow(n)" of the first sound signal of the current frame is then substituted for the power value "nx_pow(n)" of the first noise signal of the current frame when the power value "nx_pow(n−1)" of the first noise signal of the preceding frame exceeds the power value "x_pow(n)" of the first sound signal of the current frame in the step S72 by the power value calculating unit 172.

The power value "nx_pow(n−1)" of the first sound signal of the preceding frame multiplied by a predetermined updating constant value "Lup" (the predetermined updating constant value Lup>1), Lup*nx_pow(n−1), on the other hand, is substituted for the power value "nx_pow(n)" of the first noise signal of the current frame when the power value "nx_pow(n−1)" of the first noise signal of the preceding frame does not exceed the power value "x_pow(n)" of the first sound signal of the current frame in the step 73 by the power value calculating unit 172.

Figure 24:
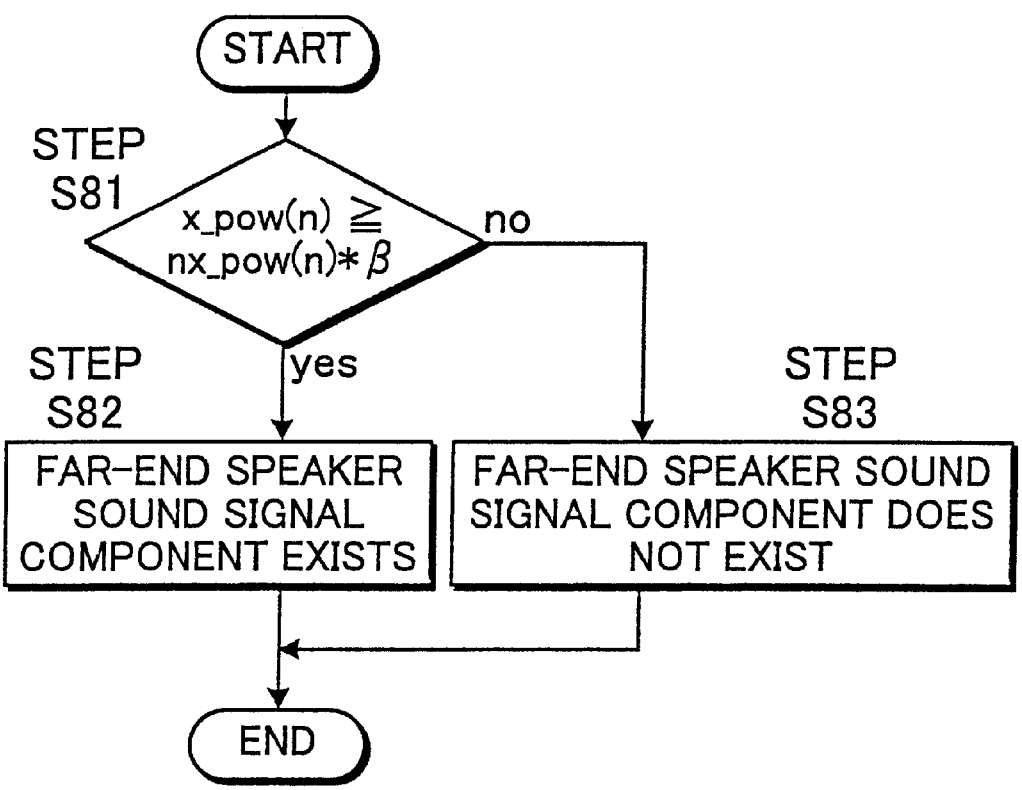
FIG. 24 is a flow chart of the process of the far-end speaker sound signal detecting means forming part of the seventh embodiment of the echo sound signal suppressing apparatus according to the present invention shown in FIG. 7.

The step S103 previously mentioned will be described in detail hereinafter with reference to FIG. 24.

The judgment is initially made on whether or not the power value "x_pow(n)" of the first sound signal of the current frame exceeds the power value "nx_pow(n)" of the first noise signal of the current frame multiplied by a predetermined value "β" (the predetermined value β>1), nx_pow(n) * β in the step S81 by the power value calculating unit 173. When the answer in the step S81 is in the affirmative "YES", i.e., the power value "x_pow(n)" of the first sound signal of the current frame exceeds nx_pow(n) * β, the power value "nx_pow(n)" of the first noise signal of the current frame multiplied by a predetermined value "β", the step S81 proceeds to the step S82. When, on the other hand, the answer in the step S81 is in the negative "NO", i.e., the power value "x_pow(n)" of the first sound signal of the current frame exceeds nx_pow(n) * β, the power value "nx_pow(n)" of the first noise signal of the current frame multiplied by a predetermined value "β", the step S81 proceeds to the step S83.

The far-end speaker sound signal detecting unit 173 is operative to detect that the far-end speaker sound signal component exists when the power value "x_pow(n)" of the first sound signal of the current frame exceeds nx_pow(n) * β in the step S82.

The far-end speaker sound signal detecting unit 173 is operative to detect that the far-end speaker sound signal component does not exist when the power value "x_pow(n)" of the first sound signal of the current frame does not exceed nx_pow(n) * β in the step S83.

Figure 25:
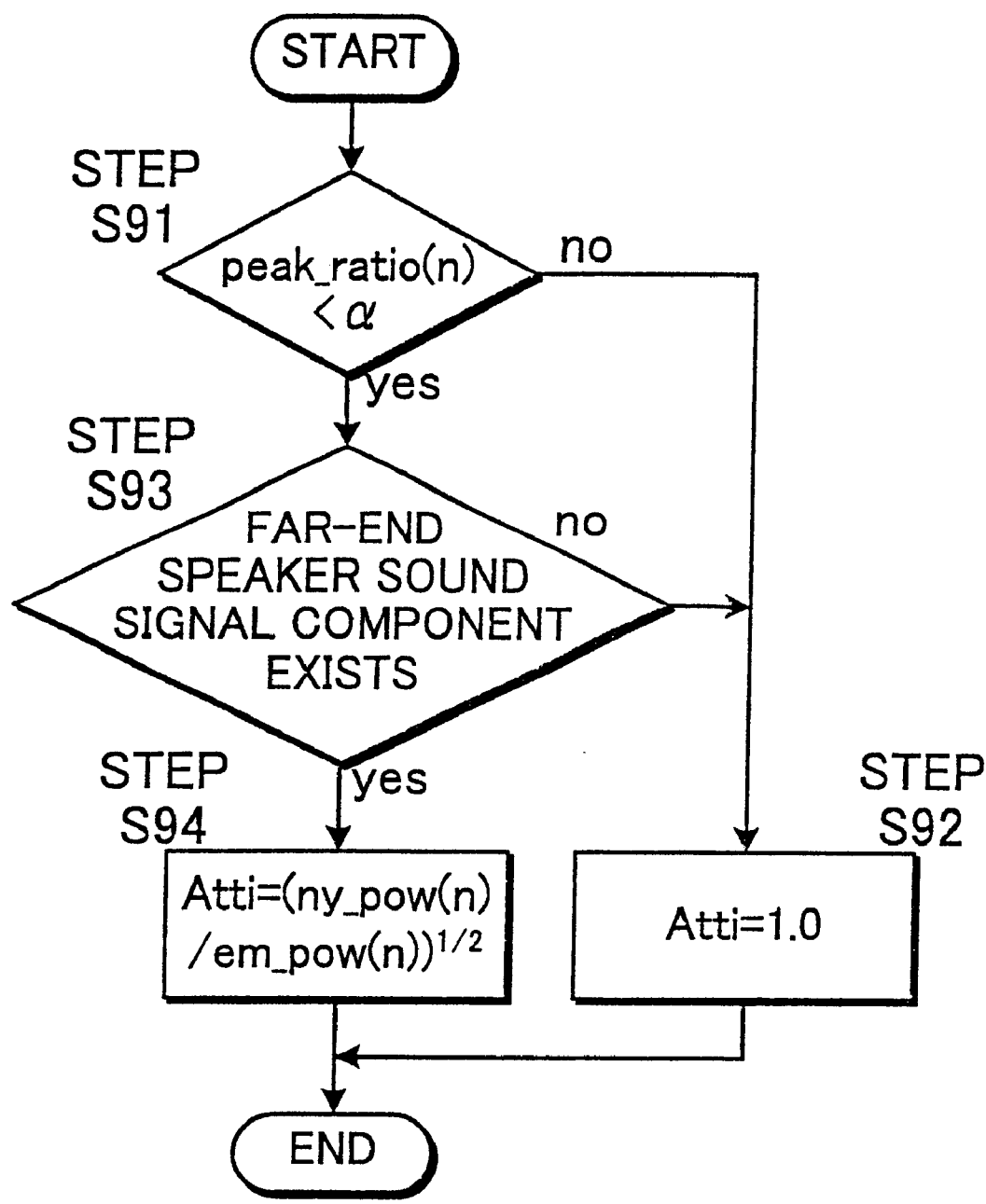
FIG. 25 is a flow chart of the process of the attenuation signal producing means forming part of the seventh embodiment of the echo sound signal suppressing apparatus according to the present invention shown in FIG. 7.

The step S104 previously mentioned will be described in detail hereinafter with reference to FIG. 25.

The judgment is initially made on whether or not the ratio "peak_ratio(n)" of the power value of the second sound signal of the sequential frame to the power value of the echo replica sound signal of the sequential frame exceeds the predetermined threshold value "α" (the predetermined threshold value α>1) in the step S91 by the attenuation signal judging unit 174. When the answer in the step S91 is in the affirmative "YES", i.e., the ratio "peak_ratio(n)" of the power value of the second sound signal of the sequential frame to the power value of the echo replica sound signal of the sequential frame does not exceed the predetermined threshold value "α", the step S91 proceeds to the step S93. When, on the other hand, the answer in the step S91 is in the negative "NO", i.e., the ratio "peak_ratio(n)" of the power value of the second sound signal of the sequential frame to the power value of the echo replica sound signal of the sequential frame exceeds the predetermined threshold value "α", the step S91 proceeds to the step S92.

The judgment is then made on whether or not the far-end speaker sound signal component exists in the step S93 by the attenuation signal judging unit 174. When the answer in the step S93 is in the affirmative "YES", i.e., the far-end speaker sound signal component exists, the step S93 proceeds to the step S94. When, on the other hand, the answer in the step S91 is in the negative "NO", i.e., the far-end speaker sound signal component does not exist, the step S93 proceeds to the step S92.

The attenuation signal "Atti" is then calculated by the previously mentioned equation (6) when the attenuation signal judging unit 174 is operative to detect the far-end speaker sound signal component in the step S93.

A numeral number "1" is then substituted for the attenuation signal "Atti" when the attenuation signal judging unit 174 is operative not to detect the far-end speaker sound signal component in the step S92.

From the above detailed description, it will be understood that the seventh embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal calculated by the first power value calculating means 105, the power value of the echo replica sound signal calculated by the second power value calculating means 106, the power value of the difference signal calculated by the third power value calculating means 107, and the power value of the first sound signal calculated by the fifth power value calculating means 171. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal calculated by the first power value calculating means 105, the power value of the echo replica sound signal calculated by the second power value calculating means 106, the power value of the difference signal calculated by the third power value calculating means 107, and the power value of the first sound signal calculated by the fifth power value calculating means 171. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the eighth embodiment of the echo sound signal suppressing apparatus different from those of the first to seventh embodiment of the echo sound signal suppressing apparatus.

Figure 8:
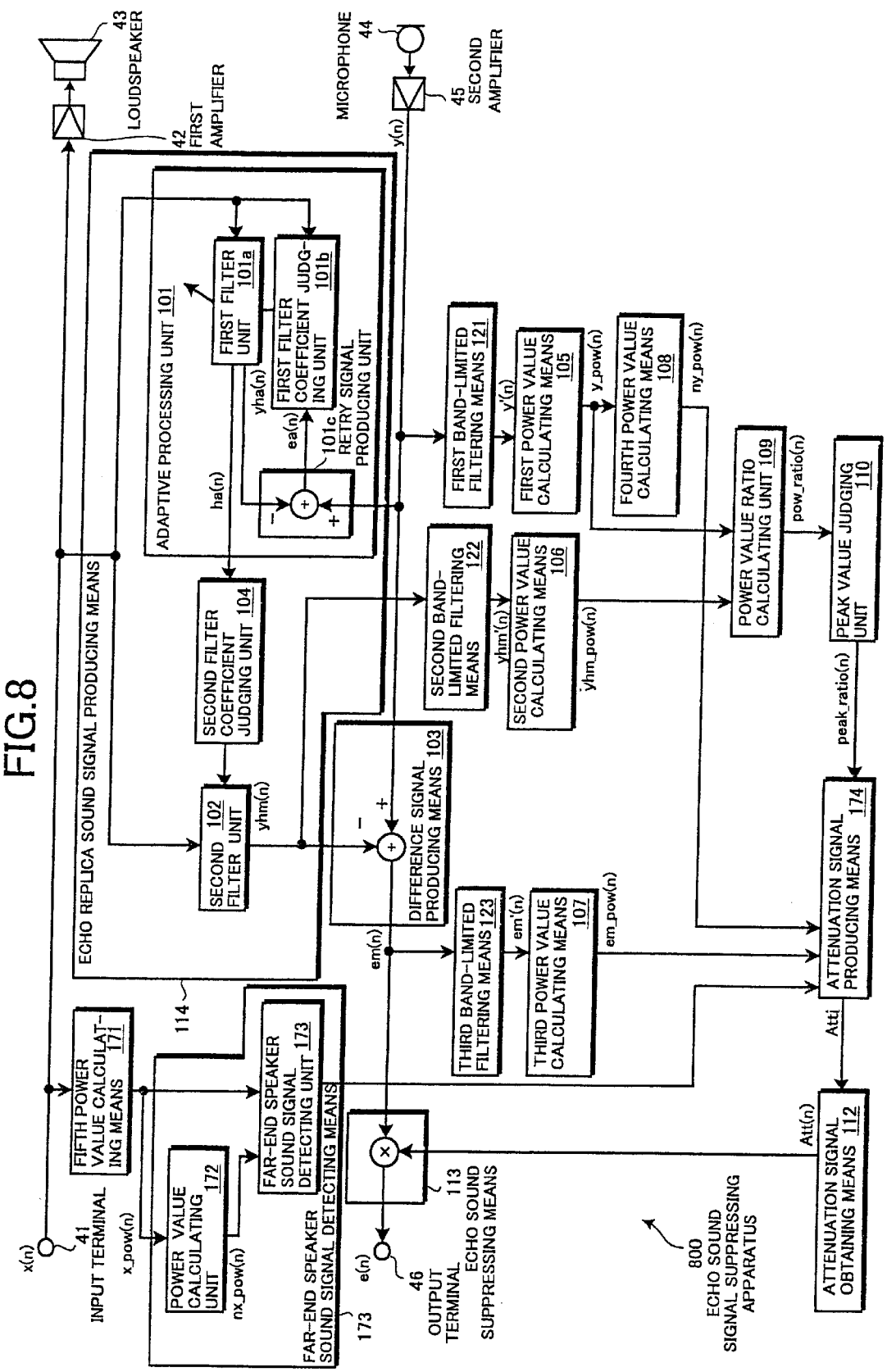
FIG. 8 is a block diagram of the eighth embodiment of the echo sound signal suppressing apparatus according to the present invention.

The eighth embodiment of the echo sound signal suppressing apparatus 800 according to the present invention is shown in FIG. 8 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the first filtering means 121, the second filtering means 122, the third filtering means 123, the power value ratio calculating unit 109, the peak value judging means 110, and the attenuation signal updating means 112 all of which are the same in construction as the second embodiment of the echo sound signal suppressing apparatus 200 shown in FIG. 2 and thus its construction will not be described hereinafter. The eighth embodiment of the echo sound signal suppressing apparatus 800 shown in FIG. 8 further comprises a fourth power value calculating means 108, a fifth power value calculating means 171, a far-end speaker sound signal detecting means 173, an attenuation signal producing means 111.

The fourth power value calculating means 108 is constituted by a power value calculating unit 105. The power value calculating unit 108 is electrically connected through a line to the power value calculating unit 105 to calculate the power value of the second noise signal after receiving the power value of the band-limited second sound signal calculated by the first power value calculating means 105. Similarly to the calculation of the power value of the second noise signal component performed by the fourth power value calculating means 108 as has been described with reference to the first embodiment according to the present invention, the power value of the second noise signal component of the sequential frame is calculated by the two different ways comprising first and second ways on the basis of the judgment whether or not the power value of the band-limited second sound signal of the current frame exceeds the power value of the second noise signal of the preceding frame after receiving the power value of the band-limited second sound signal of the sequential frame calculated by the third power value calculating means 105. The first way means that the power value "y_pow(n)" of the band-limited second sound signal of the current frame is substituted for the power value "ny_pow(n)" of the second noise signal of the current frame when the fourth power value calculating means 108 is operative to judge as the power value "y_pow(n)" of the band-limited second sound signal of the current frame does not exceed the power value "ny_pow(n−1)" of the second noise signal of the current frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the band-limited second sound signal of the current frame exceeds the power value "ny_pow(n−1)" of the second noise signal of the preceding frame.

The fifth power value calculating means 171 is constituted by a power value calculating unit 171. The power value calculating unit 171 is electrically connected through a line to the input terminal 41 to divide the first sound signal into a plurality of sequential frame along the time axis to calculate the power value of the first sound signal of the sequential frame. The power value of the first sound signal is represented by the legend "x_pow". The calculation of the power value calculating unit 171 is preformed by the following equation (19) for calculating the power value of the first sound signal of the sequential fame.

$$x\_pow(n) = \sum_{i=0}^{L-1} x(n-i)^2 \qquad (19)$$

wherein the legend "L" is indicative of the number of the sampled first sound signal of the sequential frame, and the legend "n" is indicative of the serial number of the sampled first sound signal.

The far-end speaker sound signal detecting means 173 is constituted by a power value calculating unit 172 and a far-end speaker sound signal detecting unit 173. The power value calculating unit 172 is electrically connected through a line to the power value calculating unit 171 to calculate the power value of the first noise signal component of the sequential frame on the basis of the power value of the first sound signal of the sequential frame calculated by the first power value calculating unit 171. The power value of the first noise signal component of the sequential frame is calculated by the two different ways comprising first and second ways on the basis of the judgment whether or not the power value of the first sound signal of the current frame exceeds the power value of the first noise signal of the preceding frame after receiving the power value of the first sound signal of the sequential frame calculated by the power value calculating unit 171. The first way means that the power value "x_pow(n)" of the first sound signal of the current frame is substituted for the power value "nx_pow(n)" of the first noise signal of the current frame when the first power value calculating unit 171 is adapted to judge as the power value "x_pow(n)" of the first sound signal of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the first power value calculating unit 171 is adapted to judge as the power value "x_pow(n)" of the first sound signal of the current frame exceeds the power value "ny_pow(n−1)" of the first noise signal of the preceding frame.

The far-end speaker sound signal detecting unit 173 has two input terminals comprising first and second input terminals, the first terminal being electrically connected through a line to the power value calculating unit 171, the second input terminal being electrically connected through a line to the power value calculating unit 172. The far-end speaker sound signal detecting unit 173 is operative to detect the far-end speaker sound signal component on the basis of the judgment whether or not the power value of the first sound signal of the sequential frame calculated by the power value calculating means 171 exceeds the power value of the first noise signal component of the sequential frame calculated by the power value calculating means 172.

The attenuation value calculating means 174 is constituted by an attenuation signal calculating unit 174. The attenuation signal judging unit 174 has four input terminals comprising first to fourth input terminals, the first input terminal being electrically connected through a line to the power value calculating unit 107, the second input terminal being electrically connected through a line to the power value calculating unit 108, the third input terminal being electrically connected through a line to the peak value judging unit 110, and fourth input terminal being electrically connected through a line to the far-end speaker sound signal detecting unit 173. The attenuation signal judging unit 174 is adapted to calculate the attenuation value of the current frame on the basis of the judgment whether or not the peak value of the ratio of the power value of the band-limited second sound signal of the sequential frame to the power value of the band-limited echo replica sound signal of the sequential frame exceeds a predetermined threshold value "α" after receiving the peak value of the ratio of the power value of the band-limited second sound signal of the current frame to the power value of the band-limited echo replica sound signal of the current frame judged by the peak value judging unit 110, the power value of the second noise signal of the current frame calculated by the power value calculating unit 108, the power value of the band-limited difference signal calculated by the power value calculating unit 107, and the judgment whether or not the far-end speaker sound signal is detected by the far-end speaker sound signal detecting unit 173. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame does not exceed a predetermined threshold value "α".

From the above detailed description, it will be understood that the eighth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the band-limited second sound signal calculated by the first power value calculating means 105, the power value of the band-limited echo replica sound signal calculated by the second power value calculating means 106, the power value of the band-limited difference signal calculated by the third power value calculating means 107, and the power value of the first sound signal calculated by the fifth power value calculating means 171. In the second state, the difference signal can be suppressed by the echo sound suppressing means 113 when the judging means 110 is operative to judge as the power value of the difference signal increases without the fluctuation of the near-end speaker sound signal component on the basis of the power value of the band-limited second sound signal calculated by the first power value calculating means 105, the power value of the band-limited echo replica sound signal calculated by the second power value calculating means 106, the power value of the band-limited difference signal calculated by the third power value calculating means 107, and the power value of the first sound signal calculated by the fifth power value calculating means 171. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the ninth embodiment of the echo sound signal suppressing apparatus different from those of the first to eighth embodiment of the echo sound signal suppressing apparatus.

Figure 9:
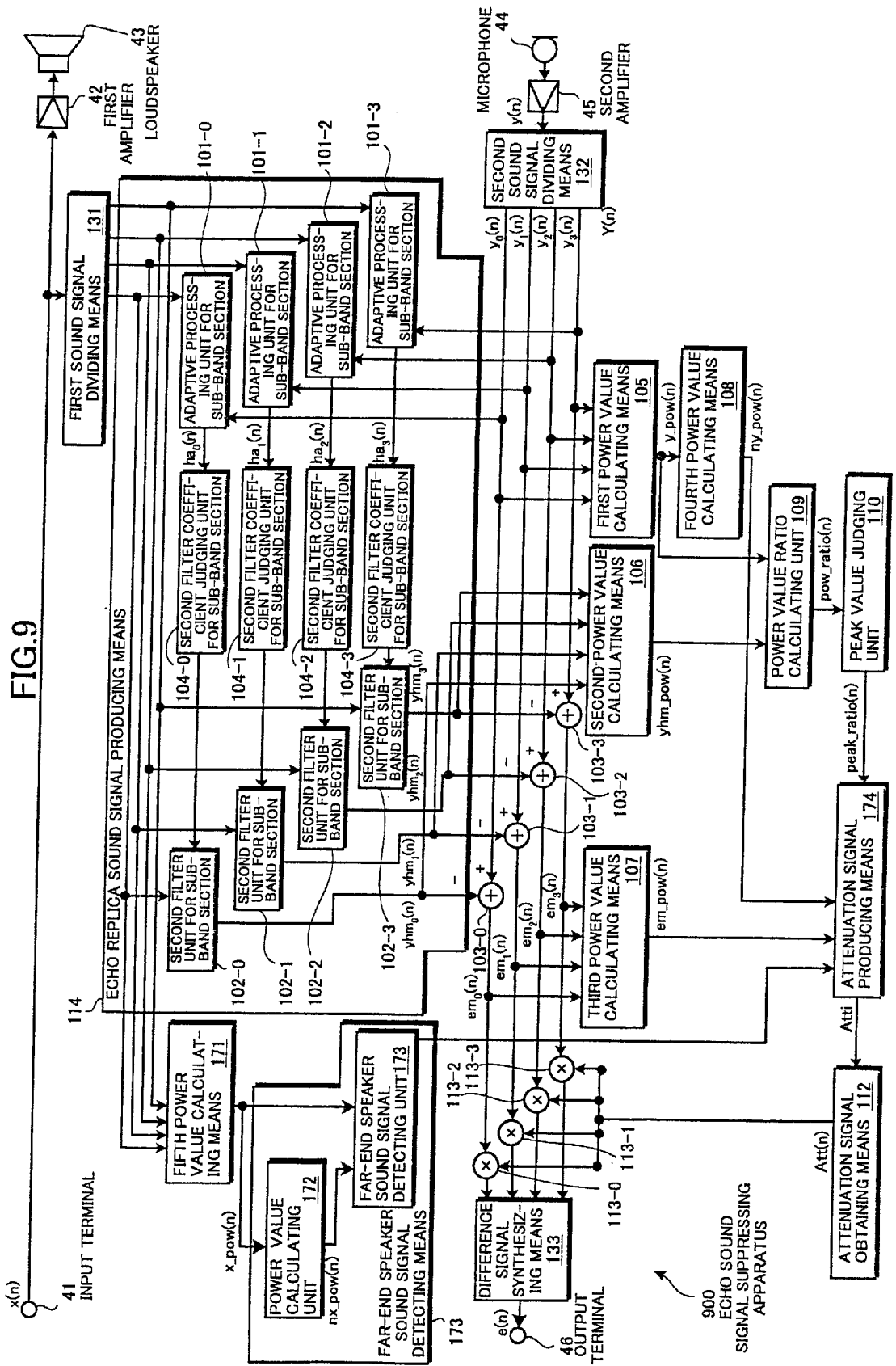
FIG. 9 is a block diagram of the ninth embodiment of the echo sound signal suppressing apparatus according to the present invention.

The ninth embodiment of the echo sound signal suppressing apparatus 900 according to the present invention is shown in FIG. 9 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, the peak value judging means 110, and the attenuation signal updating means 112, all of which are the same in construction as the third embodiment of the echo sound signal suppressing apparatus 300 shown in FIG. 3 and thus its construction will not be described hereinafter. The ninth embodiment of the echo sound signal suppressing apparatus 900 shown in FIG. 9 further comprises a fourth power value calculating means 108, a fifth power value calculating means 171, a far-end speaker sound signal detecting means 173, an attenuation signal producing means 111.

The fourth power value calculating means 108 is constituted by a power value calculating unit 108. The power value calculating unit 108 is electrically connected through a line to the power value calculating unit 105 to calculate the power value of the second noise signal after receiving the power value of the second sound signal calculated by the first power value calculating means 105. Similarly to the calculation of the power value of the second noise signal component performed by the fourth power value calculating means 108 as has been described with reference to the first embodiment according to the present invention, the power value of the second noise signal component of the sub-band section of the sequential frame is calculated by the two different ways comprising first and second ways on the basis of the judgment whether or not the power value of the second sound signal of the sub-band section of the current frame exceeds the power value of the second noise signal of the sub-band section of the preceding frame after receiving the power value of the second sound signal of the sub-band section of the sequential frame calculated by the third power value calculating means 105. The first way means that the power value "y_pow(n)" of the second sound signal of the sub-band section of the current frame is substituted for the power value "ny_pow(n)" of the second noise signal of the sub-band section of the current frame when the fourth power value calculating means 108 is operative to judge as the power value "y_pow(n)" of the second sound signal of the sub-band section of the current frame does not exceed the power value "ny_pow(n–1)" of the second noise signal of the sub-band section of the current frame. The second way means that the power value "ny_pow(n–1)" of the second noise signal of the sub-band section of the preceding frame multiplied by a predetermined updating constant value "Lup" (the predetermined updating constant value Lup>1), Lup*ny_pow(n–1) is substituted for the power value "ny_pow(n)" of the second noise signal of the sub-band section of the current frame when the first power value calculating unit 108 is adapted to judge as the power value "y_pow(n)" of the second sound signal of the sub-band section of the current frame exceeds the power value "ny_pow(n–1)" of the second noise signal of the sub-band section of the preceding frame.

The fifth power value calculating means 171 is constituted by a power value calculating unit 171. The power value calculating unit 171 is electrically connected through a line to the input terminal 41 to divide the first sound signal of the sub-band section into a plurality of sequential frame along the time axis to calculate the power value of the first sound signal of the sub-band section of the sequential frame. The power value of the first sound signal is represented by the reference legend "x_pow". The calculation of the power value calculating unit 171 is preformed by the following equation (20) for calculating the power value of the first sound signal of the sub-band section of the sequential fame.

$$\text{x\_pow}(n) = \sum_{i=0}^{L-1} x(n-i)^2 \qquad (20)$$

The far-end speaker sound signal detecting means 173 is constituted by a power value calculating unit 172 and a far-end speaker sound signal detecting unit 173. The power value calculating unit 172 is electrically connected through a line to the power value calculating unit 171 to calculate the power value of the first noise signal component of the sequential frame on the basis of the power value of the first sound signal of the sub-band section of the sequential frame calculated by the first power value calculating unit 171. The power value of the first noise signal component of the sequential frame is calculated by the two different ways comprising first and second ways on the basis of the judgment whether or not the power value of the first sound signal of the sub-band section of the current frame exceeds the power value of the first noise signal of the preceding frame after receiving the power value of the first sound signal of the sub-band section of the sequential frame calculated by the power value calculating unit 171. The first way means that the power value "x_pow(n)" of the first sound signal of the sub-band section of the current frame is substituted for the power value "nx_pow(n)" of the first noise signal of the current frame when the first power value calculating unit 171 is adapted to judge as the power value "x_pow(n)" of the first sound signal of the sub-band section of the current frame does not exceed the power value "nx_pow(n–1)" of the first noise signal of the preceding frame. The second way means that the power value "nx_pow(n–1)" of the first noise signal of the preceding frame multiplied by a predetermined updating constant value "Lup" (the predetermined updating constant value Lup>1), Lup*nx_pow(n–1) is substituted for the power value "ny_pow(n)" of the first noise signal of the current frame when the first power value calculating unit 171 is adapted to judge as the power value "x_pow(n)" of the first sound signal of the sub-band section of the current frame exceeds the power value "ny_pow(n–1)" of the first noise signal of the preceding frame.

The far-end speaker sound signal detecting unit 173 has two input terminals comprising first and second input terminals, the first terminal being electrically connected through a line to the power value calculating unit 171, the second input terminal being electrically connected through a line to the power value calculating unit 172. The far-end speaker sound signal detecting unit 173 is operative to detect the far-end speaker sound signal component on the basis of the judgment whether or not the power value of the first sound signal of the sequential frame calculated by the power value calculating means 171 exceeds the power value of the first noise signal component of the sequential frame calculated by the power value calculating means 172.

$$x\_pow(n) = \sum_{i=0}^{L-1} x(n-i)^2 \quad (21)$$

wherein the legend "L" is indicative of the number of the sampled first sound signal of the sub-band section of the sequential frame, and the legend "n" is indicative of the serial number of the sampled first sound signal of the sub-band section.

The attenuation value calculating means 174 is constituted by an attenuation signal calculating unit 174. The attenuation signal judging unit 174 has four input terminals comprising first to fourth input terminals, the first input terminal being electrically connected through a line to the power value calculating unit 107, the second input terminal being electrically connected through a line to the power value calculating unit 108, the third input terminal being electrically connected through a line to the peak value judging unit 110, and fourth input terminal being electrically connected through a line to the far-end speaker sound signal detecting unit 173. The attenuation signal judging unit 174 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 108, the power value of the difference signal calculated by the power value calculating unit 107, and the judgment whether or not the far-end speaker sound signal is detected by the far-end speaker sound signal detecting unit 173. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

From the above detailed description, it will be understood that the ninth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, the power value of the difference signal of the sub-band section calculated by the third power value calculating means 107, and the power value of the first sound signal of the sub-band section calculated by the fifth power value calculating means 171. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, the power value of the difference signal of the sub-band section calculated by the third power value calculating means 107, and the power value of the first sound signal of the sub-band section calculated by the fifth power value calculating means 171. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the tenth embodiment of the echo sound signal suppressing apparatus different from those of the first to ninth embodiments of the echo sound signal suppressing apparatus.

Figure 10:
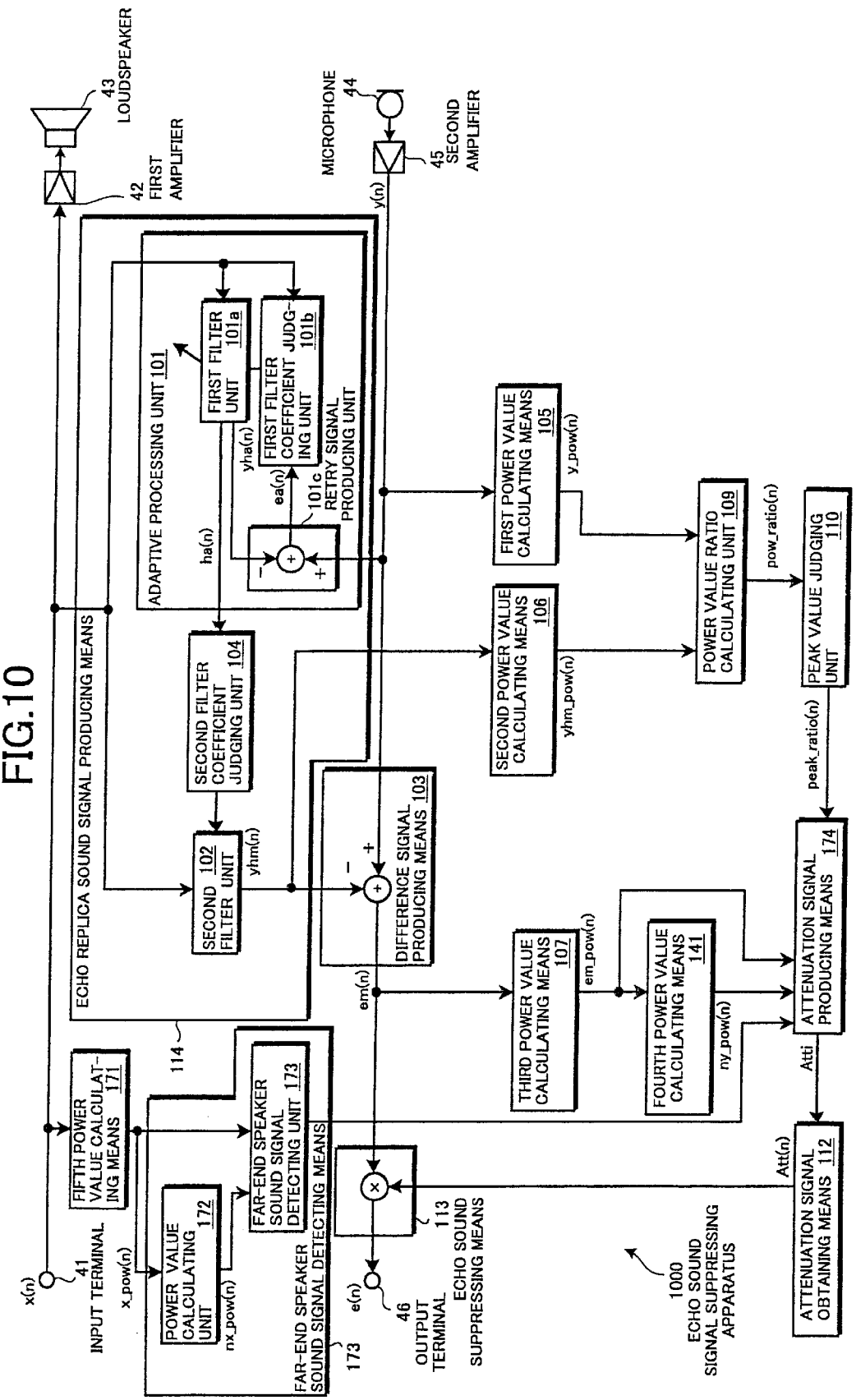
FIG. 10 is a block diagram of the tenth embodiment of the echo sound signal suppressing apparatus according to the present invention.

The tenth embodiment of the echo sound signal suppressing apparatus 1000 according to the present invention is shown in FIG. 10 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, the peak value judging means 110, and the attenuation signal updating means 112, all of which are the same in construction as the first embodiment of the echo sound signal suppressing apparatus 100 shown in FIG. 1 and thus its construction will not be described hereinafter. The tenth embodiment of the echo sound signal suppressing apparatus 1000 shown in FIG. 10 further comprises a fourth power value calculating means 141, a fifth power value calculating means 171, a far-end speaker sound signal detecting means 173, and an attenuation signal producing means 111.

The fourth power value calculating means 141 is constituted by a power value calculating unit 141. The power value calculating unit 141 is electrically connected through a line to the power value calculating unit 107 to calculate the power value of the second noise signal component after receiving the power value of the difference signal calculated by the third power value calculating means 107. The fifth power value calculating means 141 is constituted by a power value calculating unit 141. The power value calculating unit 141 is electrically connected to the power value calculating unit 107 to calculate the power value of the second noise signal component of the sequential frame. Similarly to the calculation of the power value of the second noise signal component performed by the fourth power value calculating means 108 as has been described with reference to the first embodiment according to the present invention, the power value of the second noise signal component of the sequential frame is calculated by the two different ways comprising first and second ways on the basis of the judgment whether or not the power value of the second sound signal of the current frame exceeds the power value of the second noise signal of the preceding frame after receiving the power value of the difference signal of the sequential frame calculated by the power value calculating unit 107. The first way means that the power value "em_pow(n)" of the difference signal of the current frame is substituted for the power value "ny_pow(n)" of the second noise signal of the current frame when the power value calculating unit 141 is operative to judge as the power value "em_pow(n)" of the difference signal of the current frame does not exceed the power value "ny_pow(n−1)" of the second noise signal of the current frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the second sound signal of the current frame exceeds the power value "ny_pow(n−1)" of the second noise signal of the preceding frame.

The fifth power value calculating means 171 is constituted by a power value calculating unit 171. The power value calculating unit 171 is electrically connected through a line to the input terminal 41 to divide the first sound signal into a plurality of sequential frame along the time axis to calculate the power value of the first sound signal component of the sequential frame. The power value of the first sound signal is represented by the reference legend "x_pow". The calculation of the power value calculating unit 171 is preformed by the following equation (22) for calculating the power value of the first sound signal of the sequential fame.

$$x\_pow(n) = \sum_{i=0}^{L-1} x(n-i)^2 \qquad (22)$$

wherein the legend "L" is indicative of the number of the sampled first sound signal of the sequential frame, and the legend "n" is indicative of the serial number of the sampled first sound signal.

The far-end speaker sound signal detecting means 173 is constituted by a power value calculating unit 172 and a far-end speaker sound signal detecting unit 173. The power value calculating unit 172 is electrically connected through a line to the power value calculating unit 171 to calculate the power value of the first noise signal component of the sequential frame on the basis of the power value of the first sound signal of the sequential frame calculated by the first power value calculating unit 171. The power value of the first noise signal component of the sequential frame is calculated by the two different ways comprising first and second ways on the basis of the judgment whether or not the power value of the first sound signal of the current frame exceeds the power value of the first noise signal of the preceding frame after receiving the power value of the first sound signal of the sequential frame calculated by the power value calculating unit 171. The first way means that the power value "x_pow(n)" of the first sound signal of the current frame is substituted for the power value "nx_pow(n)" of the first noise signal of the current frame when the first power value calculating unit 171 is adapted to judge as the power value "x_pow(n)" of the first sound signal of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the first power value calculating unit 171 is adapted to judge as the power value "x_pow(n)" of the first sound signal of the current frame exceeds the power value "ny_pow(n−1)" of the first noise signal of the preceding frame.

The far-end speaker sound signal detecting unit 173 has two input terminals comprising first and second input terminals, the first terminal being electrically connected through a line to the power value calculating unit 171, the second input terminal being electrically connected through a line to the power value calculating unit 172. The far-end speaker sound signal detecting unit 173 is operative to detect the far-end speaker sound signal component on the basis of the judgment whether or not the power value of the first sound signal of the sequential frame calculated by the power value calculating means 171 exceeds the power value of the first noise signal component of the sequential frame calculated by the power value calculating means 172.

The attenuation value calculating means 174 is constituted by an attenuation signal calculating unit 174. The attenuation signal judging unit 174 has four input terminals comprising first to fourth input terminals, the first input terminal being electrically connected through a line to the power value calculating unit 107, the second input terminal being electrically connected through a line to the power value calculating unit 108, the third input terminal being electrically connected through a line to the peak value judging unit 110, and fourth input terminal being electrically connected through a line to the far-end speaker sound signal detecting unit 173. The attenuation signal judging unit 174 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 108, the power value of the difference signal calculated by the power value calculating unit 107, and the judgment whether or not the far-end speaker sound signal is detected by the far-end speaker sound signal detecting unit 173. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

In the attached drawings is no flow chart showing the process of the tenth embodiment of the echo sound signal suppressing apparatus, but the process of the tenth embodiment differing from that of the first embodiment of the echo sound signal suppressing apparatus will simply be described hereinafter.

The power value of the second noise signal of the sequential frame is then calculated on the basis of the judgment whether or not the power value of the second sound signal of the current frame exceeds the power value of the second noise signal of the preceding sequential by the power value calculating unit 108. The ratio of the power value of the second sound signal of the sequential frame to the power value of the echo replica sound signal of the sequential frame is then calculated by the power value ratio calculating unit 109. The power value of the first sound signal of the sequential frame is then calculated by the power value ratio calculating unit 171. The far-end speaker sound signal is then detected by the power value ratio calculating unit 173. The peak value of the ratio of the power value of the second sound signal of the sequential frame to the power value of the echo replica sound signal of the sequential frame is then calculated and updated by the peak value judging unit 110 on the basis of the judgment whether or not the ratio of the power value of the second sound signal of the current frame to the power value of the echo replica sound signal of the current frame exceeds the ratio of the power value of the second sound signal of the preceding frame to the power value of the echo replica sound signal of the preceding frame. The attenuation signal is then produced by the attenuation signal producing unit 174 on the basis of the judgment whether or not the ratio of the power value of the second sound signal of the sequential frame to the power value of the echo replica sound signal of the sequential frame exceeds the predetermined threshold power value, the judgment whether or not the far-end speaker sound signal is detected by the far-end speaker sound signal detecting unit 173, three different power values comprising the power value of the second sound signal of the sequential frame, the power value of the echo replica sound signal of the sequential frame, the power value of the difference signal of the sequential frame, and the power value of the second noise signal of the sequential frame.

From the above detailed description, it will be understood that the tenth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the eleventh embodiment of the echo sound signal suppressing apparatus different from those of the first to tenth embodiments of the echo sound signal suppressing apparatus.

Figure 11:
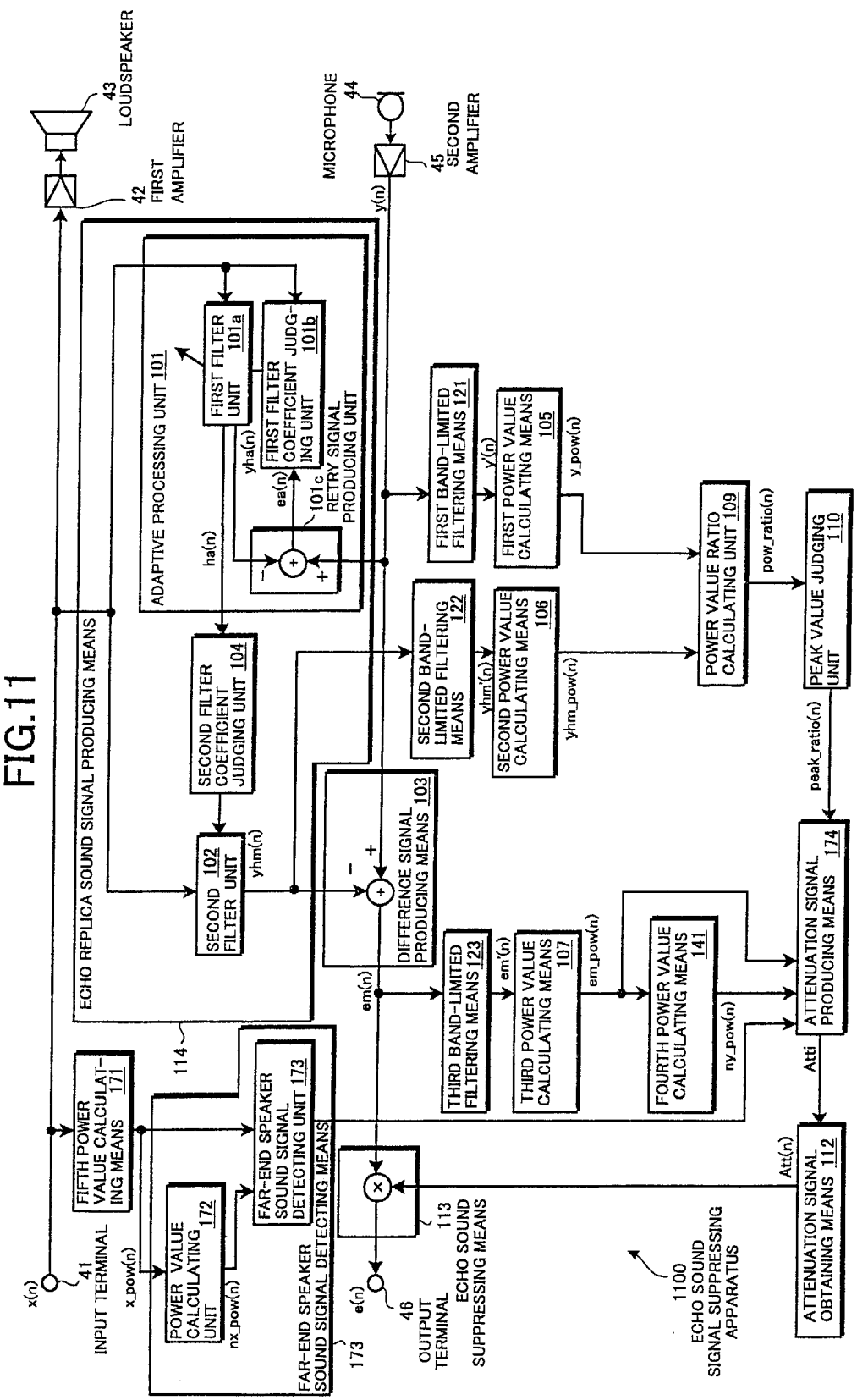
FIG. 11 is a block diagram of the eleventh embodiment of the echo sound signal suppressing apparatus according to the present invention.

The eleventh embodiment of the echo sound signal suppressing apparatus 1100 according to the present invention is shown in FIG. 11 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the first filtering means 121, the second filtering means 122, the third filtering means 123, the power value ratio calculating unit 109, the peak value judging means 110, and the attenuation signal updating means 112, all of which are, the same in construction as the second embodiment of the echo sound signal suppressing apparatus 200 shown in FIG. 2 and thus its construction will not be described hereinafter. The eleventh embodiment of the echo sound signal suppressing apparatus 1100 shown in FIG. 11 further comprises a fourth power value calculating means 141, a fifth power value calculating means 171, a far-end speaker sound signal detecting means 173, and an attenuation signal producing means 111.

The fourth power value calculating means 141 is constituted by a power value calculating unit 141. The power value calculating unit 141 is electrically connected through a line to the power value calculating unit 107 to calculate the power value of the second noise signal component after receiving the power value of the band-limited difference signal calculated by the power value calculating unit 107. Similarly to the calculation of the power value of the second noise signal component performed by the fourth power value calculating means 108 as has been described with reference to the second embodiment according to the present invention, the power value of the second noise signal component of the sequential frame is calculated by the two different ways comprising first and second ways on the basis of the judgment whether or not the power value of the second sound signal of the current frame exceeds the power value of the second noise signal of the preceding frame after receiving the power value of the band-limited difference signal of the sequential frame calculated by the power value calculating unit 107. The first way means that the power value "em_pow(n)" of the band-limited difference signal of the current frame is substituted for the power value "ny_pow(n)" of the second noise signal of the current frame when the power value calculating unit 141 is operative to judge as the power value "em_pow(n)" of the band-limited difference signal of the current frame does not exceed the power value "ny_pow(n−1)" of the second noise signal of the preceding frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the second sound signal of the current frame exceeds the power value "ny_pow(n−1)" of the second noise signal of the preceding frame.

The fifth power value calculating means 171 is constituted by a power value calculating unit 171. The power value calculating unit 171 is electrically connected through a line to the input terminal 41 to divide the first sound signal into a plurality of sequential frame along the time axis to calculate the power value of the first sound signal component of the sequential frame. The power value of the first sound signal is represented by the reference legend "x_pow". The calculation of the power value calculating unit 171 is preformed by the following equation (23) for calculating the power value of the first sound signal of the sequential fame.

$$x\_pow(n) = \sum_{i=0}^{L-1} x(n-i)^2 \quad (23)$$

wherein the legend "L" is indicative of the number of the sampled first sound signal of the sequential frame, and the legend "n" is indicative of the serial number of the sampled first sound signal.

The far-end speaker sound signal detecting means 173 is constituted by a power value calculating unit 172 and a far-end speaker sound signal detecting unit 173. The power value calculating unit 172 is electrically connected through a line to the power value calculating unit 171 to calculate the power value of the first noise signal component of the sequential frame on the basis of the power value of the first sound signal of the sequential frame calculated by the power value calculating unit 171. The power value of the first noise signal component of the sequential frame is calculated by the two different ways comprising first and second ways on the basis of the judgment whether or not the power value of the first sound signal of the current frame exceeds the power value of the first noise signal of the preceding frame after receiving the power value of the first sound signal of the sequential frame calculated by the power value calculating unit 171. The first way means that the power value "x_pow(n)" of the first sound signal of the current frame is substituted for the power value "nx_pow(n)" of the-first noise signal of the current frame when the first power value calculating unit 171 is adapted to judge as the power value "x_pow(n)" of the first sound signal of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the first power value calculating unit 171 is adapted to judge as the power value "x_pow(n)" of the first sound signal of the current frame exceeds the power value "ny_pow(n−1)" of the first noise signal of the preceding frame.

The far-end speaker sound signal detecting unit 173 has two input terminals comprising first and second input terminals, the first terminal being electrically connected through a line to the power value calculating unit 171, the second input terminal being electrically connected through a line to the power value calculating unit 172. The far-end speaker sound signal detecting unit 173 is operative to detect the far-end speaker sound signal component on the basis of the judgment whether or not the power value of the first sound signal of the sequential frame calculated by the power value calculating means 171 exceeds the power value of the first noise signal component of the sequential frame calculated by the power value calculating means 172.

The attenuation value calculating means 174 is constituted by an attenuation signal calculating unit 174. The attenuation signal judging unit 174 has four input terminals comprising first to fourth input terminals, the first input terminal being electrically connected through a line to the power value calculating unit 107, the second input terminal being electrically connected through a line to the power value calculating unit 108, the third input terminal being electrically connected through a line to the peak value judging unit 110, and fourth input terminal being electrically connected through a line to the far-end speaker sound signal detecting unit 173. The attenuation signal judging unit 174 is adapted to calculate the attenuation value of the current frame on the basis of the judgment whether or not the peak value of the ratio of the power value of the band-limited second sound signal of the sequential frame to the power value of the band-limited echo replica sound signal of the sequential frame exceeds a predetermined threshold value "α" after receiving the peak value of the ratio of the power value of the band-limited second sound signal of the current frame to the power value of the band-limited echo replica sound signal of the current frame judged by the peak value judging unit 110, the power value of the second noise signal of the current frame calculated by the power value calculating unit 108, the power value of the band-limited difference signal calculated by the power value calculating unit 107, and the judgment whether or not the far-end speaker sound signal is detected by the far-end speaker sound signal detecting unit 173. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame does not exceed a predetermined threshold value "α".

From the above detailed description, it will be understood that the eleventh embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the twelfth embodiment of the echo sound signal suppressing apparatus different from those of the first to eleventh embodiments of the echo sound signal suppressing apparatus.

Figure 12:
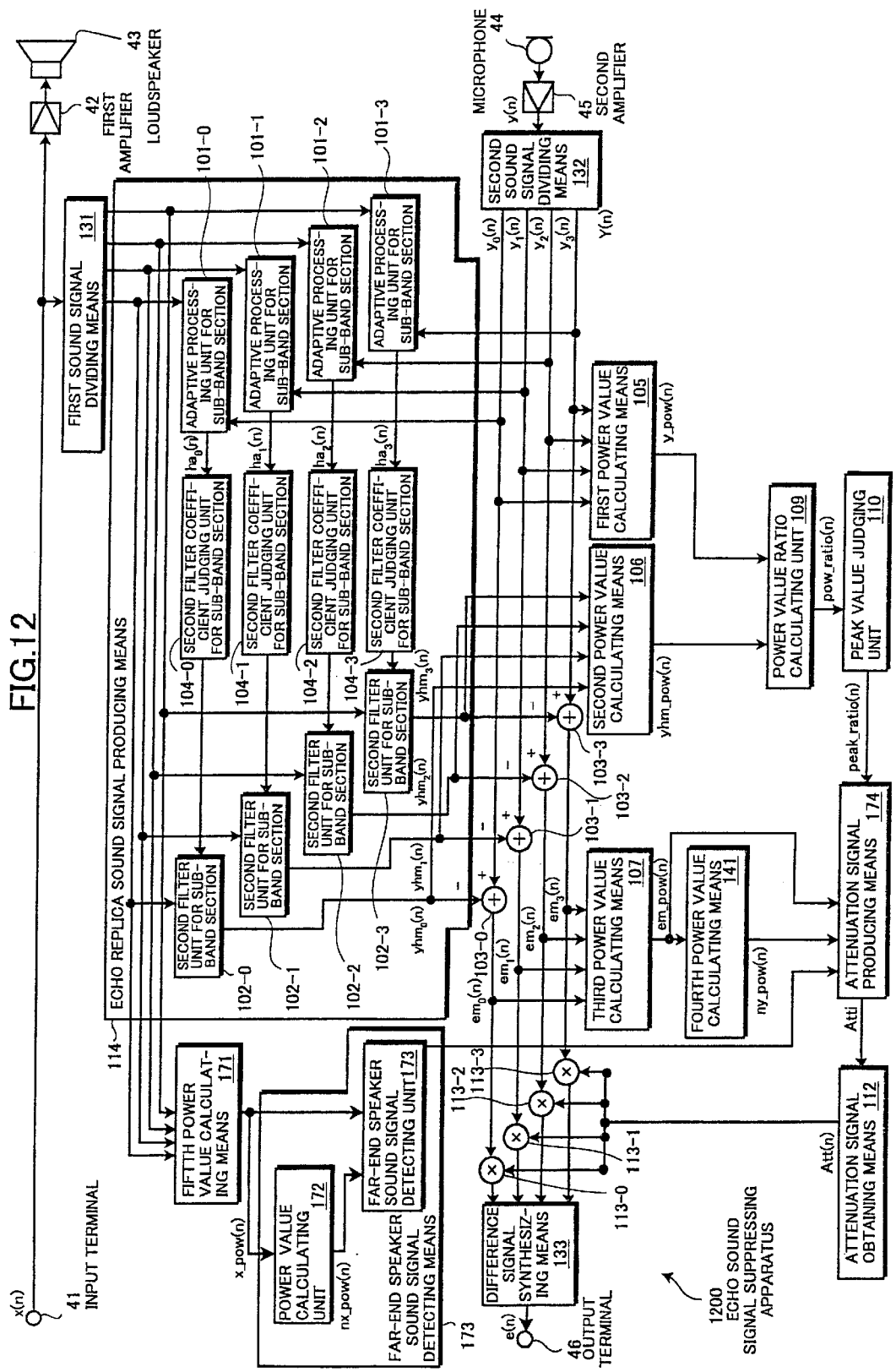
FIG. 12 is a block diagram of the twelfth embodiment of the echo sound signal suppressing apparatus according to the present invention.

The twelfth embodiment of the echo sound signal suppressing apparatus 1200 according to the present invention is shown in FIG. 12 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, and the peak value judging means 110, all of which are the same in construction as the third embodiment of the echo sound signal suppressing apparatus 300 shown in FIG. 3 and thus its construction will not be described hereinafter. The twelfth embodiment of the echo sound signal suppressing apparatus 1200 shown in FIG. 12 further comprises a fourth power value calculating means 141, a fifth power value calculating means 171, a far-end speaker sound signal detecting means 173, an attenuation signal producing means 111, and an attenuation signal updating means 112.

The fourth power value calculating means 141 is constituted by a power value calculating unit 141. The power value calculating unit 141 is electrically connected through a line to the power value calculating unit 107 to calculate the power value of the second noise signal component after receiving the power value of the difference signal calculated by the power value calculating unit 107. Similarly to the calculation of the power value of the second noise signal component performed by the fourth power value calculating means 108 as has been described with reference to the first embodiment according to the present invention, the power value of the second noise signal component of the sub-band section of the sequential frame is calculated by the two different ways comprising first and second ways on the basis of the judgment whether or not the power value of the second sound signal of the sub-band section of the current frame exceeds the power value of the second noise signal of the sub-band section of the preceding frame after receiving the power value of the difference signal of the sub-band section of the sequential frame calculated by the power value calculating unit 107. The first way means that the power value "em_pow(n)" of the difference signal of the sub-band section of the current frame is substituted for the power value "ny_pow(n)" of the second noise signal of the sub-band section of the current frame when the power value calculating unit 141 is operative to judge as the power value "em_pow(n)" of the difference signal of the sub-band section of the current frame does not exceed the power value "ny_pow(n−1)" of the second noise signal of the sub-band section of the preceding frame. The second way means that the power value "ny_pow(n−1)" of the second noise signal of the sub-band section of the preceding frame multiplied by a predetermined updating constant value "Lup" (the predetermined updating constant value Lup>1), Lup*ny_pow(n−1) is substituted for the power value "ny_pow(n)" of the second noise signal of the sub-band section of the current frame when the first power value calculating unit 108 is adapted to judge as the power value "y_pow(n)" of the second sound signal of the sub-band section of the current frame exceeds the power value "ny_pow(n−1)" of the second noise signal of the sub-band section of the preceding frame.

The fifth power value calculating means 171 is constituted by a power value calculating unit 171. The power value calculating unit 171 is electrically connected through a line to the input terminal 41 to divide the first sound signal of the sub-band section into a plurality of sequential frame along the time axis to calculate the power value of the first sound signal of the sub-band section of the sequential frame. The power value of the first sound signal is represented by the reference legend "x_pow". The calculation of the power value calculating unit 171 is preformed by the following equation (24) for calculating the power value of the first sound signal of the sub-band section of the sequential fame.

$$\text{x\_pow}(n) = \sum_{i=0}^{L-1} x(n-i)^2 \tag{24}$$

wherein the legend "L" is indicative of the number of the sampled first sound signal of the sub-band section of the sequential frame, and the legend "n" is indicative of the serial number of the sampled first sound signal of the sub-band section.

The far-end speaker sound signal detecting means 173 is constituted by a power value calculating unit 172 and a far-end speaker sound signal detecting unit 173. The power value calculating unit 172 is electrically connected through a line to the power value calculating unit 171 to calculate the power value of the first noise signal component of the sequential frame on the basis of the power value of the first sound signal of the sub-band section of the sequential frame calculated by the first power value calculating unit 171. The power value of the first noise signal component of the sequential frame is calculated by the two different ways comprising first and second ways on the basis of the judgment whether or not the power value of the first sound signal of the sub-band section of the current frame exceeds the power value of the first noise signal of the preceding frame after receiving the power value of the first sound signal of the sub-band section of the sequential frame calculated by the power value calculating unit 171. The first way means that the power value "x_pow(n)" of the first sound signal of the sub-band section of the current frame is substituted for the power value "nx_pow(n)" of the first noise signal of the current frame when the first power value calculating unit 171 is adapted to judge as the power value "x_pow(n)" of the first sound signal of the sub-band section of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the first power value calculating unit 171 is adapted to judge as the power value "x_pow(n)" of tile first sound signal of the sub-band section of the current frame exceeds the power value "ny_pow(n−1)" of the first noise signal of the preceding frame.

The far-end speaker sound signal detecting unit 173 has two input terminals comprising first and second input terminals, the first terminal being electrically connected through a line to the power value calculating unit 171, the second input terminal being electrically connected through a line to the power value calculating unit 172. The far-end speaker sound signal detecting unit 173 is operative to detect the far-end speaker sound signal component on the basis of the judgment whether or not the power value of the first sound signal of the sequential frame calculated by the power value calculating means 171 exceeds the power value of the first noise signal component of the sequential frame calculated by the power value calculating means 172.

$$x\_pow(n) = \sum_{i=0}^{L-1} x(n-i)^2 \qquad (25)$$

wherein the legend "L" is indicative of the number of the sampled first sound signal of the sub-band section of the sequential frame, and the legend "n" is indicative of the serial number of the sampled first sound signal of the sub-band section.

The attenuation value calculating means 174 is constituted by an attenuation signal calculating unit 174. The attenuation signal judging unit 174 has four input terminals comprising first to fourth input terminals, the first input terminal being electrically connected through a line to the power value calculating unit 107, the second input terminal being electrically connected through a line to the power value calculating unit 108, the third input terminal being electrically connected through a line to the peak value judging unit 110, and fourth input terminal being electrically connected through a line to the far-end speaker sound signal detecting unit 173. The attenuation signal judging unit 174 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 108, the power value of the difference signal calculated by the power value calculating unit 107, and the judgment whether or not the far-end speaker sound signal is detected by the far-end speaker sound signal detecting unit 173. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

From the above detailed description, it will be understood that the twelfth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the thirteenth embodiment of the echo sound signal suppressing apparatus different from those of the first to twelfth embodiments of the echo sound signal suppressing apparatus.

Figure 13:
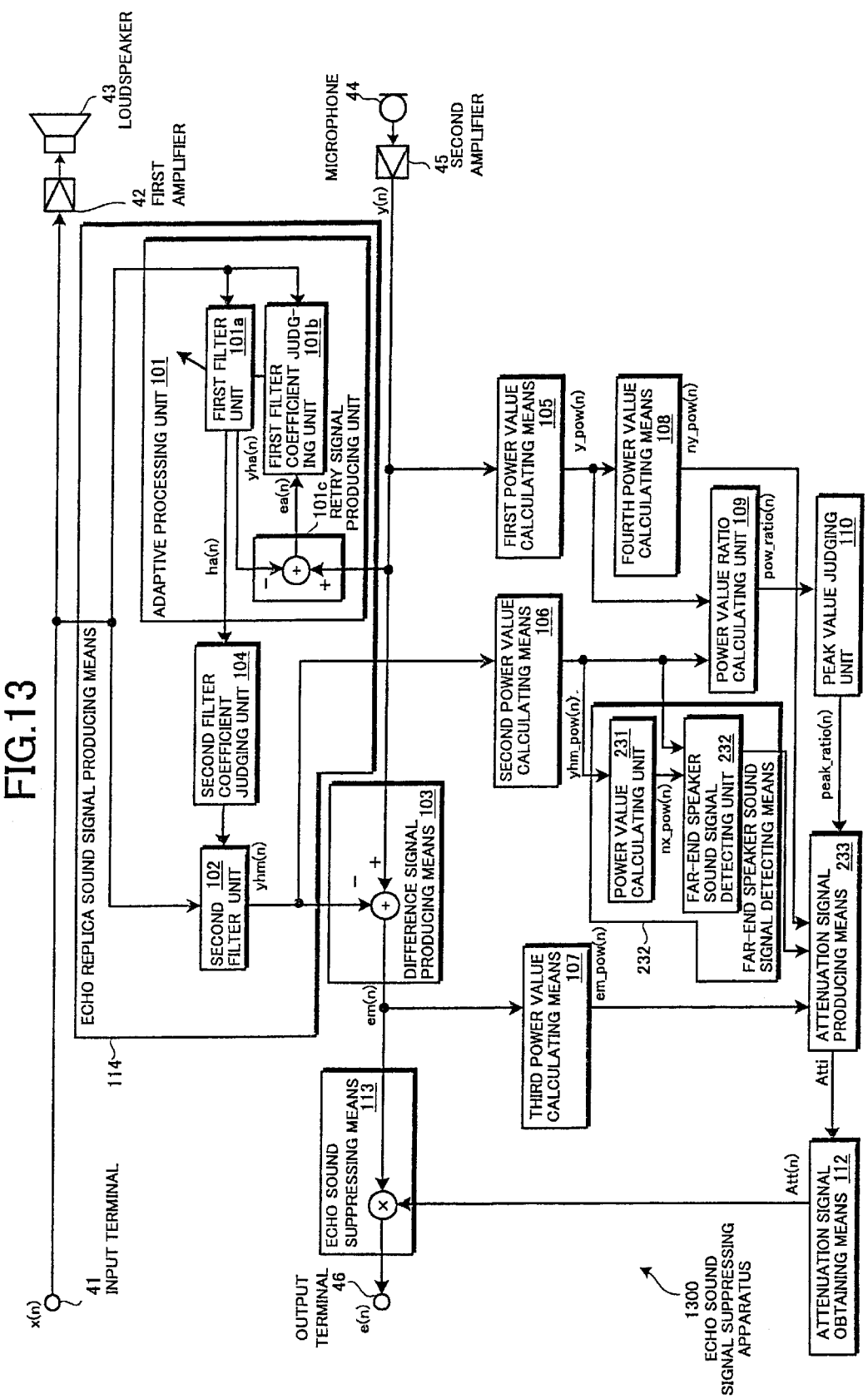
FIG. 13 is a block diagram of the thirteenth embodiment of the echo sound signal suppressing apparatus according to the present invention.

The thirteenth embodiment of the echo sound signal suppressing apparatus 1300 according to the present invention is shown in FIG. 13 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, the peak value judging means 110, and the attenuation signal updating means 112, all of which are the same in construction as the first embodiment of the echo sound signal suppressing apparatus 100 shown in FIG. 1 and thus its construction will not be described hereinafter. The thirteenth embodiment of the echo sound signal suppressing apparatus 1300 shown in FIG. 13 further comprises the fourth power value calculating means 108, and an attenuation signal producing means 111.

The fourth power value calculating means 108 is constituted by a power value calculating unit 105. The power value calculating unit 108 is electrically connected through a line to the power value calculating unit 105 to calculate the power value of the second noise signal after receiving the power value of the second sound signal calculated by the first power value calculating means 105. Similarly to the calculation of the power value of the second noise signal component performed by the fourth power value calculating means 108 as has been described with reference to the first embodiment according to the present invention, the power value of the second noise signal component of the sequential frame is calculated by the two different ways comprising first and second ways on the basis of the judgment whether or not the power value of the second sound signal of the current frame exceeds the power value of the second noise signal of the preceding frame after receiving the power value of the second sound signal of the sequential frame calculated by the third power value calculating means 105. The first way means that the power value "y_pow(n)" of the second sound signal of the current frame is substituted for the power value "ny_pow(n)" of the second noise signal of the current frame when the fourth power value calculating means 108 is operative to judge as the power value "y_pow(n)" of the second sound signal of the current frame does not exceed the power value "ny_pow(n−1)" of the second noise signal of the current frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the second sound signal of the current frame exceeds the power value "ny_pow(n−1)" of the second noise signal of the preceding frame.

The far-end speaker sound signal detecting means 232 is constituted by a power value calculating unit 231 and a far-end speaker sound signal detecting unit 232. The power value calculating unit 231 is electrically connected through a line to the power value calculating unit 106 to calculate the power value of the first noise signal component of the sequential frame on the basis of the power value of the echo replica sound signal of the sequential frame calculated by the power value calculating unit 106. The power value of the first noise signal component of the sequential frame is calculated by the two different ways comprising first and second ways on the basis of the judgment whether or not the power value "yhm_pow(n)" of the echo replica sound signal of the current frame exceeds the power value "nx_pow(n)" of the first noise signal of the preceding frame after receiving the power value of the echo replica sound signal of the sequential frame calculated by the power value calculating unit 106. The first way means that the power value "yhm_pow(n)" of the echo replica sound signal of the current frame is substituted for the power value "nx_pow(n)" of the first noise signal of the current frame when the power value calculating unit 231 is adapted to judge as the power value "yhm_pow(n)" of the echo replica sound signal of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the power value calculating unit 231 is adapted to judge as the power value "yhm_pow(n)" of the echo replica sound signal of the current frame exceeds the power value "ny_pow(n−1)" of the first noise signal of the preceding frame.

The far-end speaker sound signal detecting unit 232 has two input terminals comprising first and second input terminals, the first terminal being electrically connected through a line to the power value calculating unit 231, the second input terminal being electrically connected through a line to the power value calculating unit 106. The far-end speaker sound signal detecting unit 232 is operative to detect the far-end speaker sound signal component on the basis of the judgment whether or not the power value of the echo sound signal of the current frame calculated by the power value calculating means 106 exceeds the power value of the first noise signal component of the preceding frame calculated by the power value calculating means 232.

The attenuation value calculating means 233 is constituted by an attenuation signal calculating unit 233. The attenuation signal judging unit 233 has four input terminal comprising first to fourth input terminal, the first input terminal being electrically connected through a line to the power value calculating unit 107, the second input terminal being electrically connected through a line to the power value calculating unit 108, the third input terminal being electrically connected through a line to the peak value judging unit 110, and fifth input terminal being electrically connected through a line to the far-end speaker sound signal detecting unit 232. The attenuation signal judging unit 233 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 108, the power value of the difference signal calculated by the power value calculating unit 107, and the judgment whether or not the far-end speaker sound signal is detected by the far-end speaker sound signal detecting unit 232. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the-current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

The attenuation value calculating means 233 is constituted by an attenuation signal calculating unit 233. The attenuation signal judging unit 233 has four input terminal comprising first to fourth input terminal, the first input terminal being electrically connected through a line to the power value calculating unit 107, the second input terminal being electrically connected through a line to the power value calculating unit 141, the third input terminal being electrically connected through a line to the peak value judging unit 110, and fifth input terminal being electrically connected through a line to the far-end speaker sound signal detecting unit 232. The attenuation signal judging unit 233 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 141, the power value of the difference signal calculated by the power value calculating unit 107, and the judgment whether or not the far-end speaker sound signal is detected by the far-end speaker sound signal detecting unit 232. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

In the attached drawings is no flow chart showing the process of the thirteenth embodiment of the echo sound signal suppressing apparatus, but the process of the thirteenth embodiment differing from that of the first embodiment of the echo sound signal suppressing apparatus will simply be described hereinafter.

The power value of the second noise signal of the sequential frame is then calculated on the basis of the judgment whether or not the power value of the second sound signal of the current frame exceeds the power value of the second noise signal of the preceding sequential by the power value calculating unit 108. The ratio of the power value of the second sound signal of the sequential frame to the power value of the echo replica sound signal of the sequential frame is then calculated by the power value ratio calculating unit 109. The power value of the first noise signal of the sequential frame is then calculated by the power value ratio calculating unit 231. The far-end speaker sound signal is then detected by the power value ratio calculating unit 232. The peak value of the ratio of the power value of the second sound signal of the sequential frame to the power value of the echo replica sound signal of the sequential frame is then calculated and updated by the peak value judging unit 110 on the basis of the judgment whether or not the ratio of the power value of the second sound signal of the current frame to the power value of the echo replica sound signal of the current frame exceeds the ratio of the power value of the second sound signal of the preceding frame to the power value of the echo replica sound signal of the preceding frame. The attenuation signal is then produced by the attenuation signal producing unit 233 on the basis of the judgment whether or not the ratio of the power value of the second sound signal of the sequential frame to the power value of the echo replica sound signal of the sequential frame exceeds the predetermined threshold power value, the judgment whether or not the far-end speaker sound signal is detected by the far-end speaker sound signal detecting unit 232, three different power values comprising the power value of the second sound signal of the sequential frame, the power value of the echo replica sound signal of the sequential frame, the power value of the difference signal of the sequential frame, and the power value of the second noise signal of the sequential frame.

Figure 27:
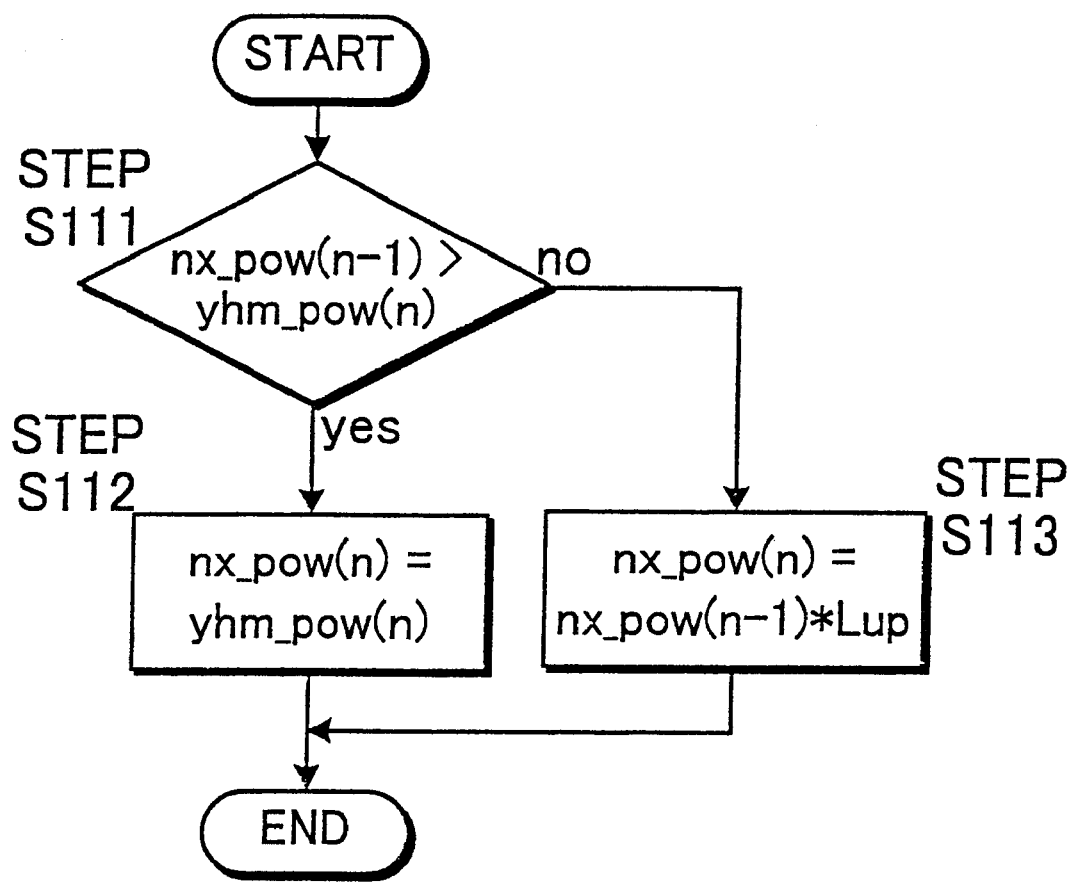
FIG. 27 is a flow chart of the process of the fifth power value calculating means forming part of the thirteenth embodiment of the echo sound signal suppressing apparatus according to the present invention shown in FIG. 13.

The following description will now be directed to the process of the power value ratio calculating unit 231 of the thirteenth embodiment of the echo sound signal suppressing apparatus 1300 according to the present invention with reference to FIGS. 13 and 27.

The judgment is initially made on whether or not the power value "nx_pow(n−1)" of the first noise signal of the preceding frame exceeds the power value "yhm_pow(n)" of the echo replica sound signal of the current frame in the step S111 by the power value calculating unit 231. When the answer in the step S111 is in the affirmative "YES", i.e., the power value "nx_pow(n−1)" of the first noise signal of the preceding frame exceeds the power value "yhm_pow(n)" of the echo replica sound signal of the current frame, the step S111 proceeds to the step S112. When, on the other hand, the answer in the step S111 is in the negative "NO", i.e., the power value "nx_pow(n−1)" of the first noise signal of the preceding frame does not exceed the power value "yhm_pow(n)" of the echo replica sound signal of the current frame, the step S111 proceeds to the step S113.

The power value "yhm_pow(n)" of the echo replica sound signal of the current frame is then substituted for the power value "nx_pow(n)" of the first noise signal of the current frame in the step S112 by the power value calculating unit 231 when the power value calculating unit 231 is operative to judge as the power value "nx_pow(n−1)" of the first noise signal of the preceding frame exceeds the power value "yhm_pow(n)" of the echo replica sound signal of the current frame.

The power value "nx_pow(n−1)" of the first sound signal of the preceding frame multiplied by a predetermined updating constant value "Lup" (the predetermined updating constant value Lup>1), Lup*nx_pow(n−1), on the other hand, is substituted for the power value "nx_pow(n)" of the first noise signal of the current frame in the step S113 by the power value calculating unit 231 when the power value calculating unit 231 is operative to judge as the power value "nx_pow(n−1)" of the first noise signal of the preceding frame does not exceed the power value "yhm_pow(n)" of the echo replica sound signal of the current frame.

Figure 28:
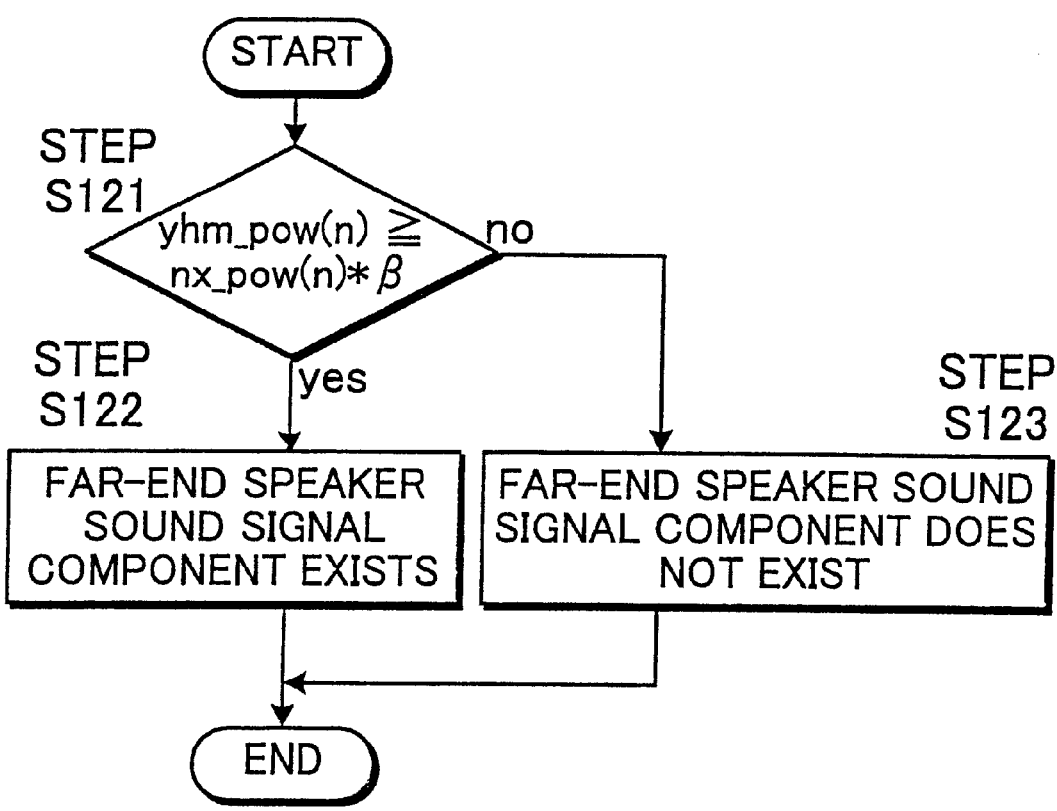
FIG. 28 is a flow chart of the process of the far-end speaker sound signal detecting means forming part of the thirteenth embodiment of the echo sound signal suppressing apparatus according to the present invention shown in FIG. 13.

The following description will now be directed to the process of the far-end speaker sound signal detecting unit 232 of the thirteenth embodiment of the echo sound signal suppressing apparatus 1300 according to the present invention with reference to FIGS. 13 and 28.

The judgment is initially made on whether or not the power value "yhm_pow(n)" of the echo replica sound signal of the current frame exceeds the power value "nx_pow(n)" of the first noise signal of the current frame multiplied by a predetermined value "β" (the predetermined value β>1), nx_pow(n) * β in the step S121 by the far-end speaker sound signal detecting unit 232. When the answer in the step S121 is in the affirmative "YES", i.e., the power value "yhm_pow(n)" of the echo replica sound signal of the current frame exceeds nx_pow(n) * β, the step S121 proceeds to the step S122. When, on the other hand, the answer in the step S121 is in the negative "NO", i.e., the power value "yhm_pow(n)" of the echo replica sound signal of the current frame does not exceed nx_pow(n) * β, the step S121 proceeds to the step S123.

The far-end speaker sound signal detecting unit 232 is operative to detect that the far-end speaker sound signal component exists when the far-end speaker sound signal detecting unit 232 is operative to judge as the power value "yhm_pow(n)" of the echo replica sound signal of the current frame exceeds nx_pow(n) * β in the step S122.

The far-end speaker sound signal detecting unit 232 is operative to detect that the far-end speaker sound signal component does not exist when the far-end speaker sound signal detecting unit 232 is operative to judge as the power value "yhm_pow(n)" of the echo replica sound signal of the current frame does not exceed nx_pow(n)* β in the step S123.

From the above detailed description, it will be understood that the thirteenth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the fourteenth embodiment of the echo sound signal suppressing apparatus different from those of the first to thirteenth embodiments of the echo sound signal suppressing apparatus.

Figure 14:
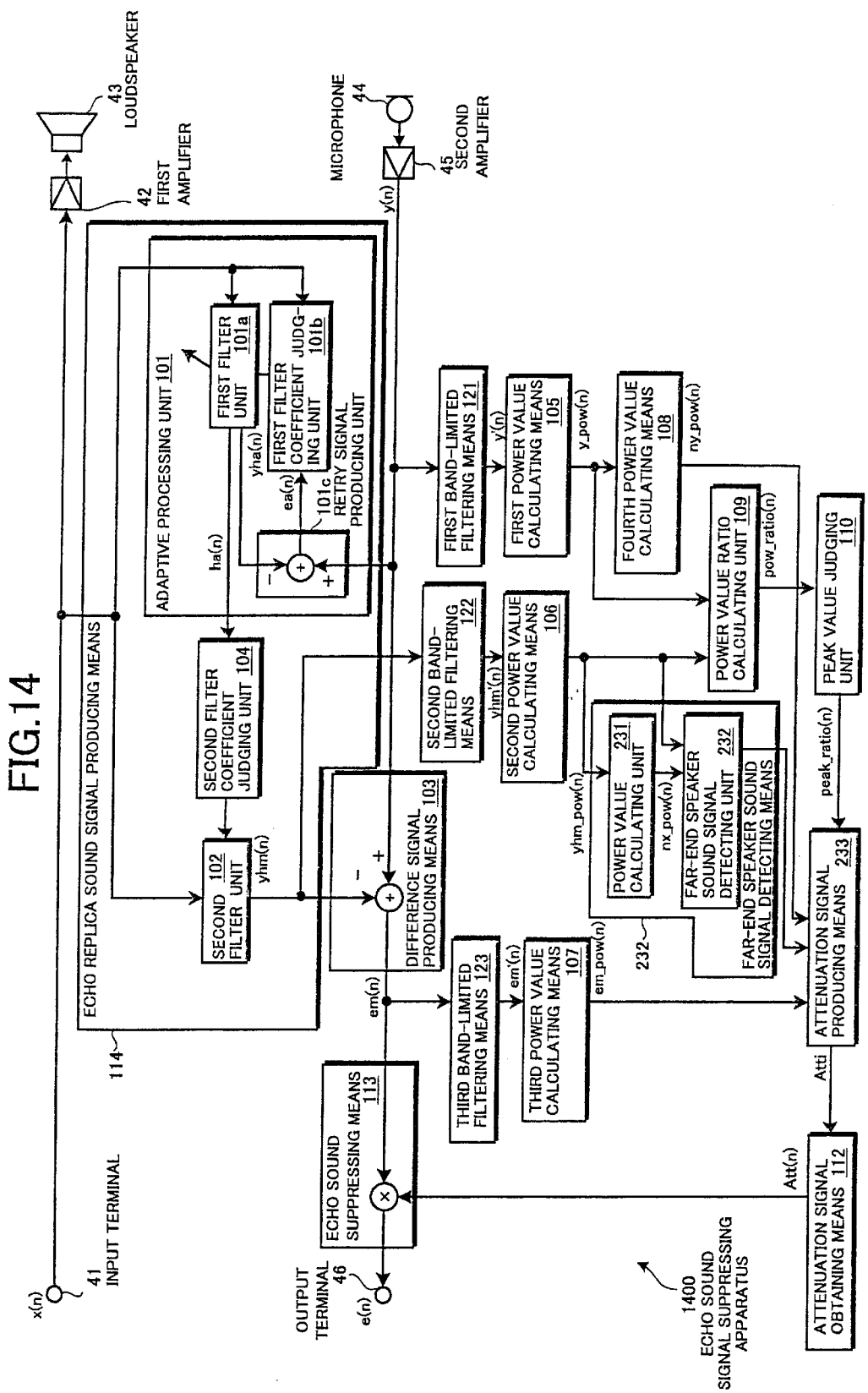
FIG. 14 is a block diagram of the fourteenth embodiment of the echo sound signal suppressing apparatus according to the present invention.

The fourteenth embodiment of the echo sound signal suppressing apparatus 1400 according to the present invention is shown in FIG. 14 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the first filtering means 121, the second filtering means 122, the third filtering means 123, the power value ratio calculating unit 109, the peak value judging means 110, and the attenuation signal updating means 112, all of which are the same in construction as the second embodiment of the echo sound signal suppressing apparatus 200 shown in FIG. 2 and thus its construction will not be described hereinafter. The fourteenth embodiment of the echo sound signal suppressing apparatus 1400 shown in FIG. 14 further comprises a fourth power value calculating means 108, a far-end speaker sound signal detecting means 231, and an attenuation signal producing means 111.

The fourth power value calculating means 108 is constituted by a power value calculating unit 105. The power value calculating unit 108 is electrically connected through a line to the power value calculating unit 105 to calculate the power value of the second noise signal after receiving the power value of the band-limited second sound signal calculated by the first power value calculating means 105. Similarly to the calculation of the power value of the second noise signal component performed by the fourth power value calculating means 108 as has been described with reference to the first embodiment according to the present invention, the power value of the second noise signal component of the sequential frame is calculated by the two different ways comprising first and second ways on the basis of the judgment whether or not the power value of the band-limited second sound signal of the current frame exceeds the power value of the second noise signal of the preceding frame after receiving the power value of the second sound signal of the sequential frame calculated by the third power value calculating means 105. The first way means that the power value "y_pow(n)" of the band-limited second sound signal of the current frame is substituted for the power value "ny_pow(n)" of the second noise signal of the current frame when the fourth power value calculating means 108 is operative to judge as the power value "y_pow(n)" of the band-limited second sound signal of the current frame does not exceed the power value "ny_pow(n−1)" of the second noise signal of the current frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the band-limited second sound signal of the current frame exceeds the power value "ny_pow(n−1)" of the second noise signal of the preceding frame.

The far-end speaker sound signal detecting means 232 is constituted by a power value calculating unit 231 and a far-end speaker sound signal detecting unit 232. The power value calculating unit 231 is electrically connected through a line to the power value calculating unit 106 to calculate the power value of the first noise signal component of the sequential frame on the basis of the power value of the echo replica sound signal of the sequential frame calculated by the power value calculating unit 106. The power value of the first noise signal component of the sequential frame is calculated by the two different ways comprising first and second ways on the basis of the judgment whether or not the power value "yhm_pow(n)" of the band-limited echo replica sound signal of the current frame exceeds the power value "nx_pow(n)" of the first noise signal of the preceding frame after receiving the power value of the echo replica sound signal of the sequential frame calculated by the power value calculating unit 106. The first way means that the power value "yhm_pow(n)" of the band-limited echo replica sound signal of the current frame is substituted for the power value "nx_pow(n)" of the first noise signal of the current frame when the power value calculating unit 231 is adapted to judge as the power value "yhm_pow(n)" of the band-limited echo replica sound signal of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the power value calculating unit 231 is adapted to judge as the power value "yhm_pow(n)" of the band-limited echo replica sound signal of the current frame exceeds the power value "ny_pow(n−1)" of the first noise signal of the preceding frame.

The far-end speaker sound signal detecting unit 232 has two input terminals comprising first and second input terminals, the first terminal being electrically connected through a line to the power value calculating unit 231, the second input terminal being electrically connected through a line to the power value calculating unit 106. The far-end speaker sound signal detecting unit 232 is operative to detect the far-end speaker sound signal component on the basis of the judgment whether or not the power value of the band-limited echo sound signal of the current frame calculated by the power value calculating means 106 exceeds the power value of the first noise signal component of the preceding frame calculated by the power value calculating means 232.

The attenuation value calculating means 233 is constituted by an attenuation signal calculating unit 233. The attenuation signal judging unit 233 has four input terminal comprising first to fourth input terminal, the first input terminal being electrically connected through a line to the power value calculating unit 107, the second input terminal being electrically connected through a line to the power value calculating unit 108, the third input terminal being electrically connected through a line to the peak value judging unit 110, and fifth input terminal being electrically connected through a line to the far-end speaker sound signal detecting unit 232. The attenuation signal judging unit 233 is adapted to calculate the attenuation value of the current frame on the basis of the judgment whether or not the peak value of the ratio of the power value of the band-limited second sound signal of the sequential frame to the power value of the band-limited echo replica sound signal of the sequential frame exceeds a predetermined threshold value "α" after receiving the peak value of the ratio of the power value of the band-limited second sound signal of the current frame to the power value of the band-limited echo replica sound signal of the current frame judged by the peak value judging unit 110, the power value of the second noise signal of the current frame calculated by the power value calculating unit 108, the power value of the band-limited difference signal calculated by the power value calculating unit 107, and the judgment whether or not the far-end speaker sound signal is detected by the far-end speaker sound signal detecting unit 232. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame does not exceed a predetermined threshold value "α".

From the above detailed description, it will be understood that the fourteenth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the fifteenth embodiment of the echo sound signal suppressing apparatus different from those of the first to fourteenth embodiments of the echo sound signal suppressing apparatus.

Figure 15:
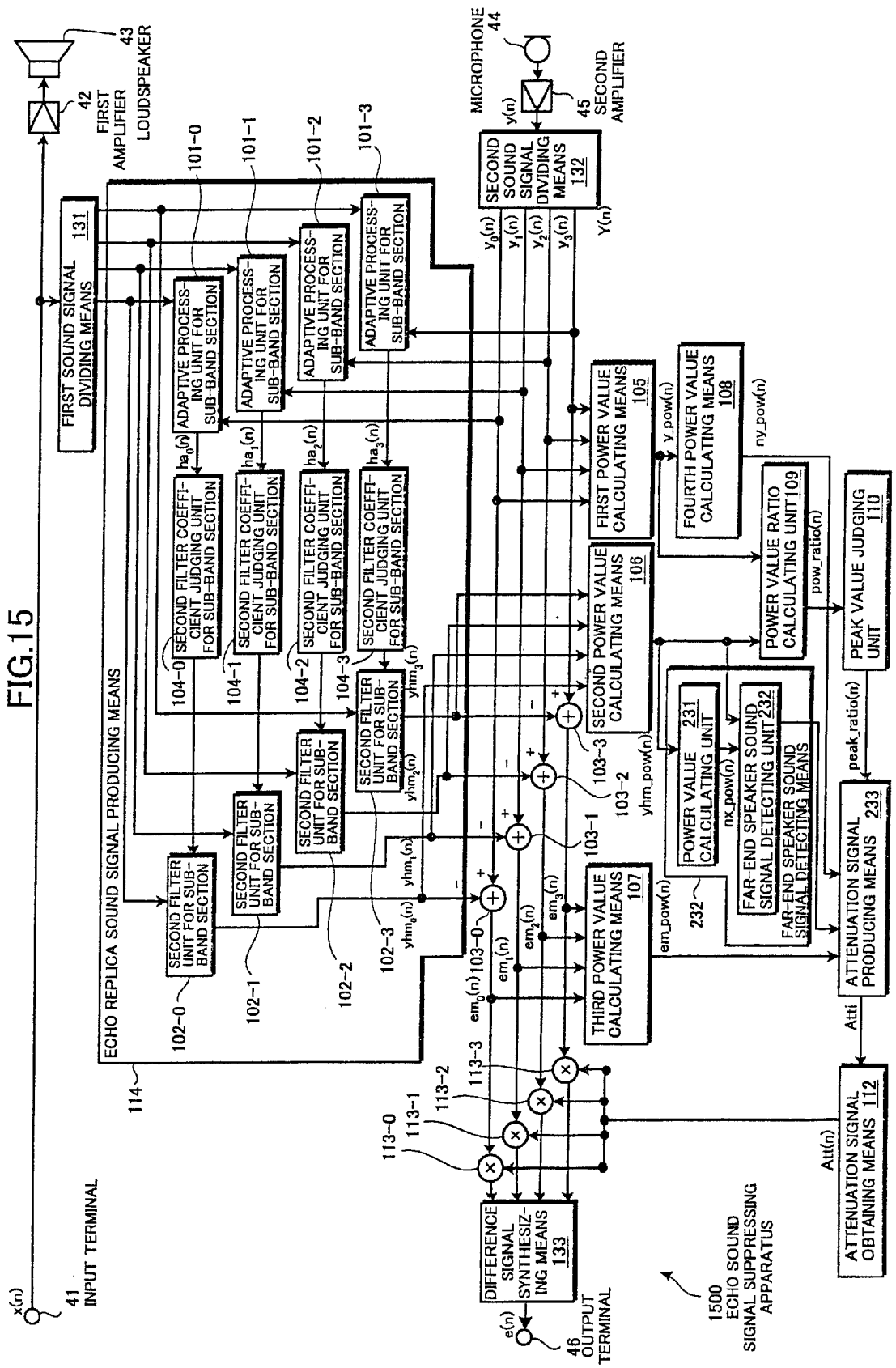
FIG. 15 is a block diagram of the fifteenth embodiment of the echo sound signal suppressing apparatus according to the present invention.

The fifteenth embodiment of the echo sound signal suppressing apparatus 1500 according to the present invention is shown in FIG. 15 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, the peak value judging means 110, and the attenuation signal updating means 112, all of which are the same in construction as the third embodiment of the echo sound signal suppressing apparatus 300 shown in FIG. 3 and thus its construction will not be described hereinafter. The fifteenth embodiment of the echo sound signal suppressing apparatus 1500 shown in FIG. 15 further comprises a fourth power value calculating means 108, a far-end speaker sound signal detecting means 232, and an attenuation signal producing means 111.

The fourth power value calculating means 108 is constituted by a power value calculating unit 105. The power value calculating unit 108 is electrically connected through a line to the power value calculating unit 105 to calculate the power value of the second noise signal after receiving the power value of the second sound signal calculated by the first power value calculating means 105. Similarly to the calculation of the power value of the second noise signal component performed by the fourth power value calculating means 108 as has been described with reference to the first embodiment according to the present invention, the power value of the second noise signal component of the sub-band section of the sequential frame is calculated by the two different ways comprising first and second ways on the basis of the judgment whether or not the power value of the second sound signal of the sub-band section of the current frame exceeds the power value of the second noise signal of the sub-band section of the preceding frame after receiving the power value of the second sound signal of the sub-band section of the sequential frame calculated by the third power value calculating means 105. The first way means that the power value "y_pow(n)" of the second sound signal of the sub-band section of the current frame is substituted for the power value "ny_pow(n)" of the second noise signal of the sub-band section of the current frame when the fourth power value calculating means 108 is operative to judge as the power value "y_pow(n)" of the second sound signal of the sub-band section of the current frame does not exceed the power value "ny_pow(n−1)" of the second noise signal of the sub-band section of the current frame. The second way means that the power value "ny_pow(n−1)" of the second noise signal of the sub-band section of the preceding frame multiplied by a predetermined updating constant value "Lup" (the predetermined updating constant value Lup>1), Lup*ny_pow(n−1) is substituted for the power value "ny_pow(n)" of the second noise signal of the sub-band section of the current frame when the first power value calculating unit 108 is adapted to judge as the power value "y_pow(n)" of the second sound signal of the sub-band section of the current frame exceeds the power value "ny_pow(n−1)" of the second noise signal of the sub-band section of the preceding frame.

The far-end speaker sound signal detecting means 232 is constituted by a power value calculating unit 231 and a far-end speaker sound signal detecting unit 232. The power value calculating unit 231 is electrically connected through a line to the power value calculating unit 106 to calculate the power value of the first noise signal component of the sequential frame on the basis of the power value of the echo replica sound signal of the sequential frame calculated by the power value calculating unit 106. The power value of the first noise signal component of the sequential frame is calculated by the two different ways comprising first and second ways on the basis of the judgment whether or not the power value "yhm_pow(n)" of the echo replica sound signal of the current frame exceeds the power value "nx_pow(n)" of the first noise signal of the preceding frame after receiving the power value of the echo replica sound signal of the sequential frame calculated by the power value calculating unit 106. The first way means that the power value "yhm_pow(n)" of the echo replica sound signal of the current frame is substituted for the power value "nx_pow(n)" of the first noise signal of the current frame when the power value calculating unit 231 is adapted to judge as the power value "yhm_pow(n)" of the echo replica sound signal of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the power value calculating unit 231 is adapted to judge as the power value "yhm_pow(n)" of the echo replica sound signal of the current frame exceeds the power value "ny_pow(n−1)" of the first noise signal of the preceding frame.

The far-end speaker sound signal detecting unit 232 has two input terminals comprising first and second input terminals, the first terminal being electrically connected through a line to the power value calculating unit 231, the second input terminal being electrically connected through a line to the power value calculating unit 106. The far-end speaker sound signal detecting unit 232 is operative to detect the far-end speaker sound signal component on the basis of the judgment whether or not the power value of the echo sound signal of the current frame calculated by the power value calculating means 106 exceeds the power value of the first noise signal component of the preceding frame calculated by the power value calculating means 232.

The attenuation value calculating means 233 is constituted by an attenuation signal calculating unit 233. The attenuation signal judging unit 233 has four input terminal comprising first to fourth input terminal, the first input terminal being electrically connected through a line to the power value calculating unit 107, the second input terminal being electrically connected through a line to the power value calculating unit 108, the third input terminal being electrically connected through a line to the peak value judging unit 110, and fifth input terminal being electrically connected through a line to the far-end speaker sound signal detecting unit 232. The attenuation signal judging unit 233 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 108, the power value of the difference signal calculated by the power value calculating unit 107, and the judgment whether or not the far-end speaker sound signal is detected by the far-end speaker sound signal detecting unit 232. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

From the above detailed description, it will be understood that the fifteenth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the sixteenth embodiment of the echo sound signal suppressing apparatus different from those of the first to fifteenth embodiments of the echo sound signal suppressing apparatus.

Figure 16:
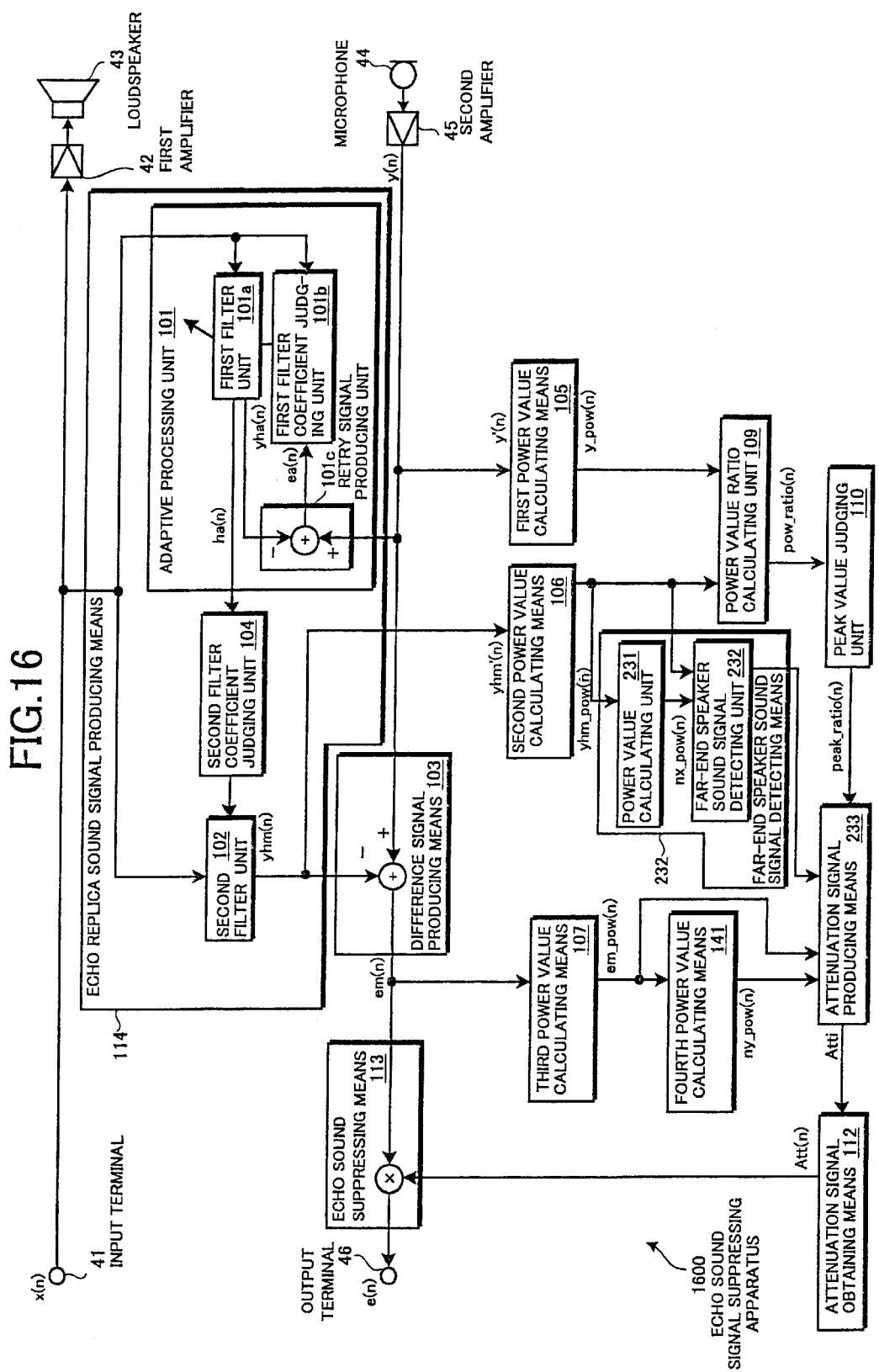
FIG. 16 is a block diagram of the sixteenth embodiment of the echo sound signal suppressing apparatus according to the present invention.

The sixteenth embodiment of the echo sound signal suppressing apparatus 1600 according to the present invention is shown in FIG. 16 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, the peak value judging means 110, and an attenuation signal updating means 112, all of which are the same in construction as the first embodiment of the echo sound signal suppressing apparatus 100 shown in FIG. 1 and thus its construction will not be described hereinafter. The sixteenth embodiment of the echo sound signal suppressing apparatus 1600 shown in FIG. 16 further comprises the fourth power value calculating means 141, and an attenuation signal producing means 111.

The fourth power value calculating means 141 is constituted by a power value calculating unit 141. The power value calculating unit 141 is electrically connected through a line to the power value calculating unit 107 to calculate the power value of the second noise signal component after receiving the power value of the difference signal calculated by the power value calculating unit 107. Similarly to the calculation of the power value of the second noise signal component performed by the fourth power value calculating means 108 as has been described with reference to the first embodiment according to the present invention, the power value of the second noise signal component of the sequential frame is calculated by the two different ways comprising first and second ways on the basis of the judgment whether or not the power value of the second sound signal of the current frame exceeds the power value of the second noise signal of the preceding frame after receiving the power value of the difference signal of the sequential frame calculated by the power value calculating unit 107. The first way means that the power value "em_pow(n)" of the difference signal of the current frame is substituted for the power value "ny_pow(n)" of the second noise signal of the current frame when the power value calculating unit 141 is operative to judge as the power value "em_pow(n)" of the difference signal of the current frame does not exceed the power value "ny_pow(n−1)" of the second noise signal of the preceding frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the second sound signal of the current frame exceeds the power value "ny_pow(n−1)" of the second noise signal of the preceding frame.

The attenuation value calculating means 111 is constituted by an attenuation signal calculating unit 111. The attenuation signal judging unit 111 has three input terminal comprising first to third input terminal, the first input terminal being electrically connected through a line to the power value calculating unit 107, the second input terminal being electrically connected through a line to the power value calculating unit 141, and the third input terminal being electrically connected through a line to the peak value judging unit 110. The attenuation signal judging unit 111 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 105 and the power value of the difference signal calculated by the power value calculating unit 107. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

In the attached drawings is no flow chart showing the process of the sixteenth embodiment of the echo sound signal suppressing apparatus, but the process of the sixteenth embodiment differing from that of the first embodiment of the echo sound signal suppressing apparatus will simply be described hereinafter.

The power value of the second noise signal of the sequential frame is then calculated on the basis of the judgment whether or not the power value of the second sound signal of the current frame exceeds the power value of the second noise signal of the preceding sequential by the power value calculating unit 141. The ratio of the power value of the second sound signal of the sequential frame to the power value of the echo replica sound signal of the sequential frame is then calculated by the power value ratio calculating unit 109. The power value of the first noise signal of the sequential frame is then calculated by the power value ratio calculating unit 231. The far-end speaker sound signal is then detected by the power value ratio calculating unit 232. The peak value of the ratio of the power value of the second sound signal of the sequential frame to the power value of the echo replica sound signal of the sequential frame is then calculated and updated by the peak value judging unit 110 on the basis of the judgment whether or not the ratio of the power value of the second sound signal of the current frame to the power value of the echo replica sound signal of the current frame exceeds the ratio of the power value of the second sound signal of the preceding frame to the power value of the echo replica sound signal of the preceding frame. The attenuation signal is then produced by the attenuation signal producing unit 233 on the basis of the judgment whether or not the ratio of the power value of the second sound signal of the sequential frame to the power value of the echo replica sound signal of the sequential frame exceeds the predetermined threshold power value, the judgment whether or not the far-end speaker sound signal is detected by the far-end speaker sound signal detecting unit 232, three different power values comprising the power value of the second sound signal of the sequential frame, the power value of the echo replica sound signal of the sequential frame, the power value of the difference signal of the sequential frame, and the power value of the second noise signal of the sequential frame.

From the above detailed description, it will be understood that the sixteenth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal calculated by the first power value calculating means 105, the power value of the echo replica sound signal calculated by the second power value calculating means 106, and the power value of the difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the seventeenth embodiment of the echo sound signal suppressing apparatus different from those of the first to sixteenth embodiments of the echo sound signal suppressing apparatus.

Figure 17:
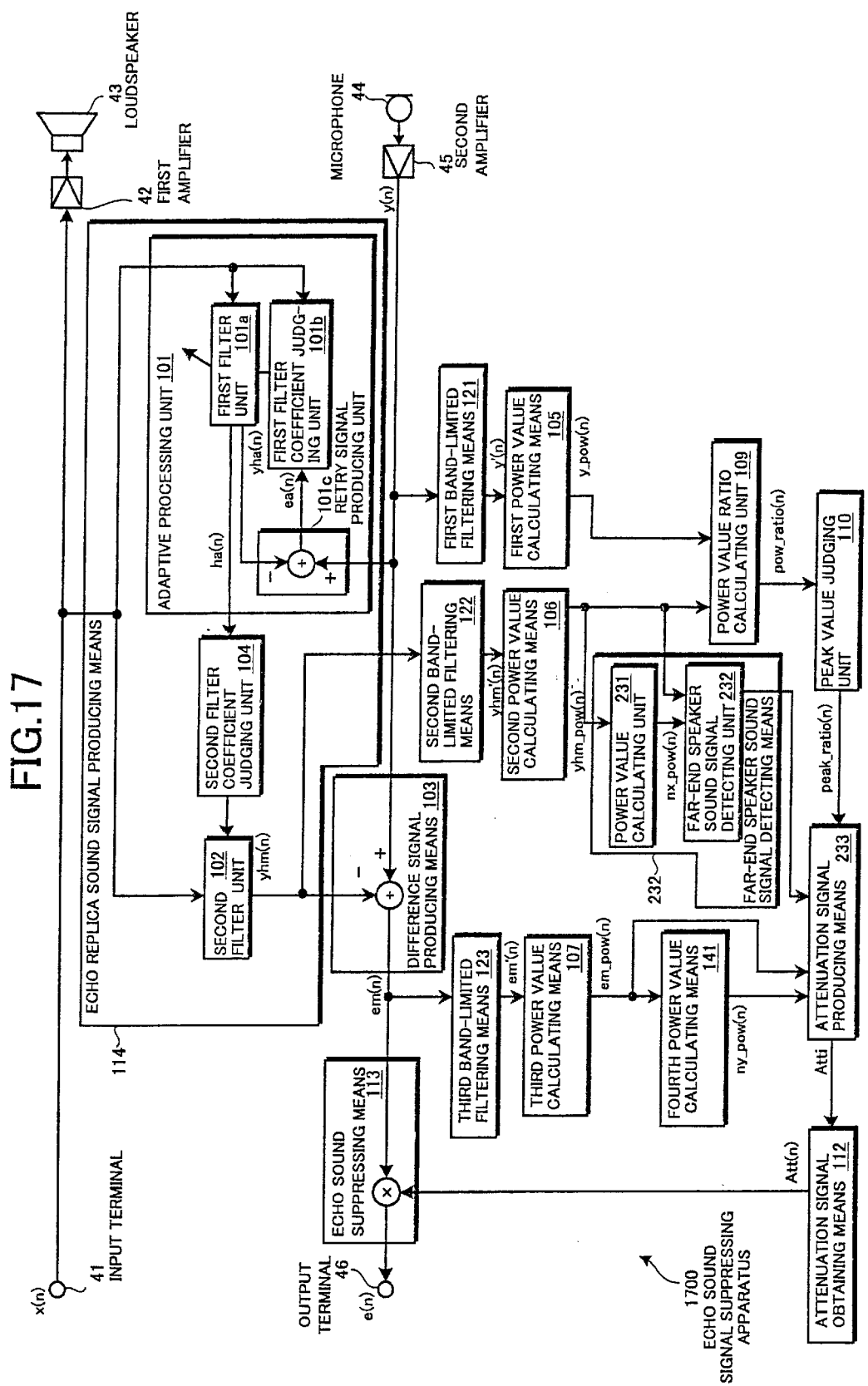
FIG. 17 is a block diagram of the seventeenth embodiment of the echo sound signal suppressing apparatus according to the present invention.

The seventeenth embodiment of the echo sound signal suppressing apparatus 1700 according to the present invention is shown in FIG. 17 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the first filtering means 121, the second filtering means 122, the third filtering means 123. the power value ratio calculating unit 109, the peak value judging means 110, and the attenuation signal updating means 112, all of which are the same in construction as the second embodiment of the echo sound signal suppressing apparatus 200 shown in FIG. 2 and thus its construction will not be described hereinafter. The seventeenth embodiment of the echo sound signal suppressing apparatus 1700 shown in FIG. 17 further comprises a fourth power value calculating means 141, a far-end speaker sound signal detecting means 232, an attenuation signal producing means 111.

The fourth power value calculating means 141 is constituted by a power value calculating unit 141. The power value calculating unit 141 is electrically connected through a line to the power value calculating unit 107 to calculate the power value of the second noise signal component after receiving the power value of the band-limited difference signal calculated by the power value calculating unit 107. Similarly to the calculation of the power value of the second noise signal component performed by the fourth power value calculating means 108 as has been described with reference to the second embodiment according to the present invention, the power value of the second noise signal component of the sequential frame is calculated by the two different ways comprising first and second ways on the basis of the judgment whether or not the power value of the second sound signal of the current frame exceeds the power value of the second noise signal of the preceding frame after receiving the power value of the band-limited difference signal of the sequential frame calculated by the power value calculating unit 107. The first way means that the power value "em_pow(n)" of the band-limited difference signal of the current frame is substituted for the power value "ny_pow(n)" of the second noise signal of the current frame when the power value calculating unit 141 is operative to judge as the power value "em_pow(n)" of the band-limited difference signal of the current frame does not exceed the power value "ny_pow(n−1)" of the second noise signal of the preceding frame. The second way means that the power value "ny_pow(n−1)" of the second noise signal of the preceding frame multiplied by a predetermined updating constant value "Lup" (the predetermined updating constant value Lup>1), Lup*ny_pow(n−1) is substituted for the power value "ny_pow(n)" of the second noise signal of the current frame when the first power value calculating unit 108 is adapted to judge as the power value "y_pow(n)" of the second sound signal of the current fame exceeds the power value "ny_pow(n−1)" of the second noise signal of the preceding frame.

The attenuation value calculating means 233 is constituted by an attenuation signal calculating unit 233. The attenuation signal judging unit 233 has four input terminal comprising first to fourth input terminal, the first input terminal being electrically connected through a line to the power value calculating unit 107, the second input terminal being electrically connected through a line to the power value calculating unit 141, the third input terminal being electrically connected through a line to the peak value judging unit 110, and fifth input terminal being electrically connected through a line to the far-end speaker sound signal detecting unit 232. The attenuation signal judging unit 233 is adapted to calculate the attenuation value of the current frame on the basis of the judgment whether or not the peak value of the ratio of the power value of the band-limited second sound signal of the sequential frame to the power value of the band-limited echo replica sound signal of the sequential frame exceeds a predetermined threshold value "α" after receiving the peak value of the ratio of the power value of the band-limited second sound signal of the current frame to the power value of the band-limited echo replica sound signal of the current frame judged by the peak value judging unit 110, the power value of the second noise signal of the current frame calculated by the power value calculating unit 141, the power value of the band-limited difference signal calculated by the power value calculating unit 107, and the judgment whether or not the far-end speaker sound signal is detected by the far-end speaker sound signal detecting unit 232. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the band-limited second sound signal of the current frame to the power value of the band-limited echo replica sound signal of the current frame does not exceed a predetermined threshold value "α".

From the above detailed description, it will be understood that the seventeenth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the band-limited second sound signal calculated by the first power value calculating means 105, the power value of the band-limited echo replica sound signal calculated by the second power value calculating means 106, and the power value of the band-limited difference signal calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

The following description will be directed to the constitution elements and the steps of the eighteenth embodiment of the echo sound signal suppressing apparatus different from those of the first to seventeenth embodiments of the echo sound signal suppressing apparatus.

Figure 18:
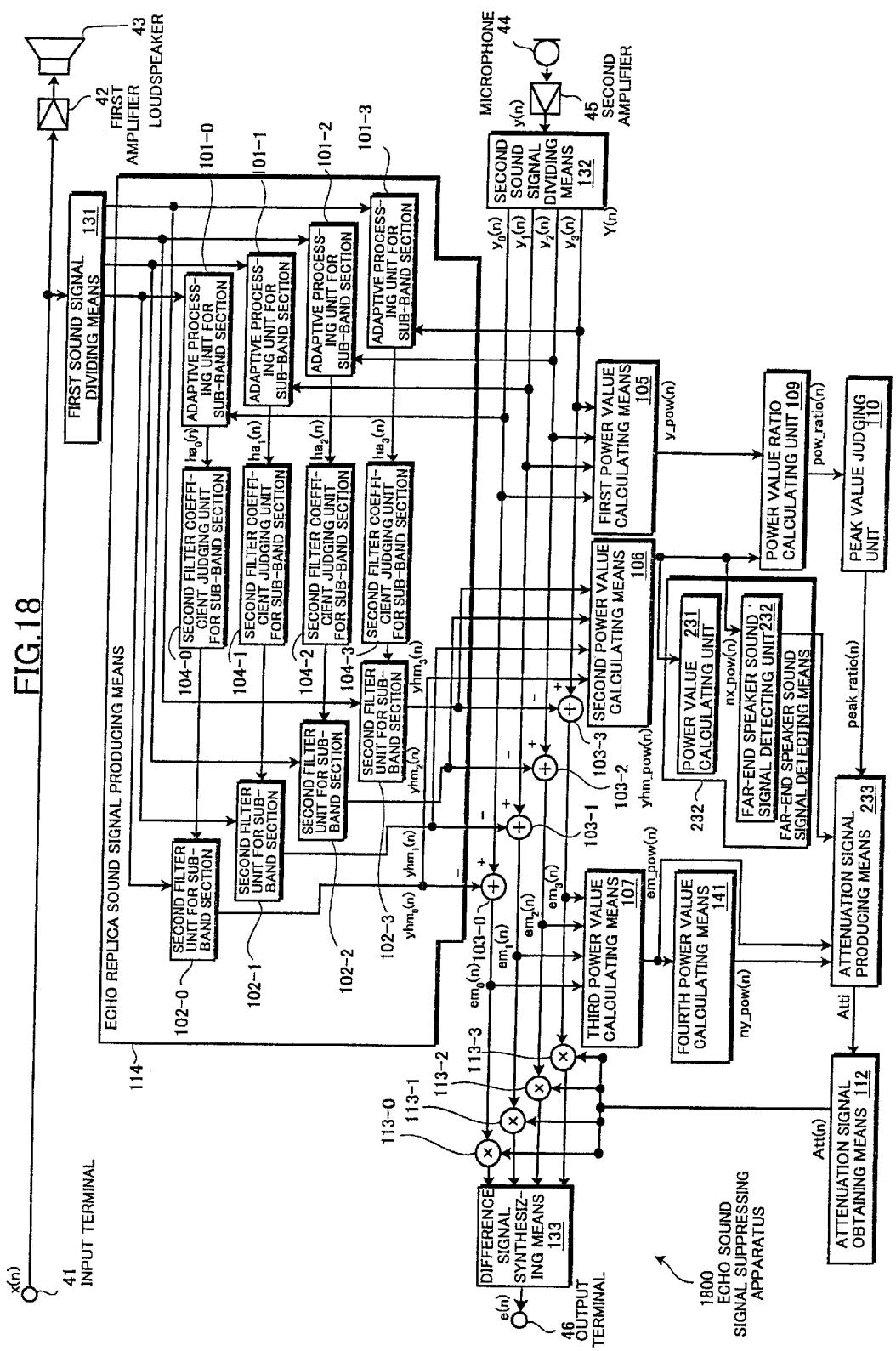
FIG. 18 is a block diagram of the eighteenth embodiment of the echo sound signal suppressing apparatus according to the present invention.

The eighteenth embodiment of the echo sound signal suppressing apparatus 1800 according to the present invention is shown in FIG. 18 as comprising the first amplifier 42, the loudspeaker 43, the microphone 44, the second amplifier 45, the echo replica sound signal producing means 114, the difference signal producing means 103, the first power value calculating means 105, the second power value calculating means 106, the third power value calculating means 107, the power value ratio calculating unit 109, the peak value judging means 110, and the attenuation signal updating means 112, all of which are the same in construction as the third embodiment of the echo sound signal suppressing apparatus 300 shown in FIG. 3 and thus its construction will not be described hereinafter. The eighteenth embodiment of the echo sound signal suppressing apparatus 1800 shown in FIG. 18 further comprises a fourth power value calculating means 141, a far-end speaker sound signal detecting means 231, and an attenuation signal producing means 111.

The fourth power value calculating means 141 is constituted by a power value calculating unit 141. The power value calculating unit 141 is electrically connected through a line to the power value calculating unit 107 to calculate the power value of the second noise signal component after receiving the power value of the difference signal calculated by the power value calculating unit 107. Similarly to the calculation of the power value of the second noise signal component performed by the fourth power value calculating means 108 as has been described with reference to the first embodiment according to the present invention, the power value of the second noise signal component of the sub-band section of the sequential frame is calculated by the two different ways comprising first and second ways on the basis of the judgment whether or not the power value of the second sound signal of the sub-band section of the current frame exceeds the power value of the second noise signal of the sub-band section of the preceding frame after receiving the power value of the difference signal of the sub-band section of the sequential frame calculated by the power value calculating unit 107. The first way means that the power value "em_pow(n)" of the difference signal of the sub-band section of the current frame is substituted for the power value "ny_pow(n)" of the second noise signal of the sub-band section of the current frame when the power value calculating unit 141 is operative to judge as the power value "em_pow(n)" of the difference signal of the sub-band section of the current frame does not exceed the power value "ny_pow(n−1)" of the second noise signal of the sub-band section of the preceding frame. The second way means that the power value "ny_pow(n−1)" of the second noise signal of the sub-band section of the preceding frame multiplied by a predetermined updating constant value "Lup" (the predetermined updating constant value Lup>1), Lup*ny_pow(n−1) is substituted for the power value "ny_pow(n)" of the second noise signal of the sub-band section of the current frame when the first power value calculating unit 108 is adapted to judge as the power value "y_pow(n)" of the second sound signal of the sub-band section of the current frame exceeds the power value "ny_pow(n−1)" of the second noise signal of the sub-band section of the preceding frame.

The far-end speaker sound signal detecting means 232 is constituted by a power value calculating unit 231 and a far-end speaker sound signal detecting unit 232. The power value calculating unit 231 is electrically connected through a line to the power value calculating unit 106 to calculate the power value of the first noise signal component of the sequential frame on the basis of the power value of the echo replica sound signal of the sequential frame calculated by the power value calculating unit 106. The power value of the first noise signal component of the sequential frame is calculated by the two different ways comprising first and second ways on the basis of the judgment whether or not the power value "yhm_pow(n)" of the echo replica sound signal of the current frame exceeds the power value "nx_pow(n)" of the first noise signal of the preceding frame after receiving the power value of the echo replica sound signal of the sequential frame calculated by the power value calculating unit 106. The first way means that the power value "yhm_pow(n)" of the echo replica sound signal of the current frame is substituted for the power value "nx_pow(n)" of the first noise signal of the current frame when the power value calculating unit 231 is adapted to judge as the power value "yhm_pow(n)" of the echo replica sound signal of the current frame does not exceed the power value "nx_pow(n−1)" of the first noise signal of the preceding frame. The second way means that the power value "nx_pow(n−1)" of the first noise signal of the preceding frame multiplied by a predetermined updating constant value "Lup" (the predetermined updating constant value Lup>1), Lup*nx_pow(n−1) is substituted for the power value "ny_pow(n)" of the first noise signal of the current frame when the power value calculating unit 231 is adapted to judge as the power value "yhm_pow(n)" of the echo replica sound signal of the current frame exceeds the power value "ny_pow(n−1)" of the first noise signal of the preceding frame.

The far-end speaker sound signal detecting unit 232 has two input terminals comprising first and second input terminals, the first terminal being electrically connected through a line to the power value calculating unit 231, the second input terminal being electrically connected through a line to the power value calculating unit 106. The far-end speaker sound signal detecting unit 232 is operative to detect the far-end speaker sound signal component on the basis of the judgment whether or not the power value of the echo sound signal of the current frame calculated by the power value calculating means 106 exceeds the power value of the first noise signal component of the preceding frame calculated by the power value calculating means 232.

The attenuation value calculating means 233 is constituted by an attenuation signal calculating unit 233. The attenuation signal judging unit 233 has four input terminal comprising first to fourth input terminal, the first input terminal being electrically connected through a line to the power value calculating unit 107, the second input terminal being electrically connected through a line to the power value calculating unit 141, the third input terminal being electrically connected through a line to the peak value judging unit 110, and fifth input terminal being electrically connected through a line to the far-end speaker sound signal detecting unit 232. The attenuation signal judging unit 233 is adapted to calculate the attenuation value of the current frame on the basis of the judgment whether or not the peak value of the ratio of the power value of the second sound signal of the sequential frame to the power value of the echo replica sound signal of the sequential frame exceeds a predetermined threshold value "α" after receiving the peak value of the ratio of the power value of the second sound signal of the current frame to the power value of the echo replica sound signal of the current frame judged by the peak value judging unit 110, the power value of the second noise signal of the current frame calculated by the power value calculating unit 141, the power value of the difference signal calculated by the power value calculating unit 107, and the judgment whether or not the far-end speaker sound signal is detected by the far-end speaker sound signal detecting unit 232. The predetermined threshold value "α" exceeds the numeral number "1". The attenuation value of the current frame and the attenuation value of the preceding frame is respectively represented by the legends "Att(n)", "Att(n−1)".

The attenuation value "Att(n)" of the current frame is calculated by the two different ways comprising first and second ways. The first way means that the numeral number "1" is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame exceeds a predetermined threshold value "α". The second way means that the square root of the ratio of the power value "ny_pow(n)" of the second noise signal of the current frame to the power value "em_pow(n)" of the difference signal of the current frame is substituted for the attenuation value "Att(n)" of the current frame when the attenuation value calculating unit 111 is adapted to judge as the peak value of the ratio of the power value of the second sound signal of the current frame to the power value of the echo replica sound signal of the current frame does not exceed a predetermined threshold value "α".

From the above detailed description, it will be understood that the eighteenth embodiment of the echo sound signal suppressing apparatus according to the present invention can suppress the echo sound signal component under two different states comprising first and second states. In the first state, the difference signal cannot be suppressed by the echo sound suppressing means 113 when the judging means 110 is operative to judge as the power value of the difference signal increases with the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. In the second state, the difference signal can be suppressed by the echo sound suppressing means 113 when the judging means 110 is operative to judge as the power value of the difference signal increases without the fluctuation of the near-end speaker sound signal component on the basis of the power value of the second sound signal of the sub-band section calculated by the first power value calculating means 105, the power value of the echo replica sound signal of the sub-band section calculated by the second power value calculating means 106, and the power value of the difference signal of the sub-band section calculated by the third power value calculating means 107. Therefore, the first and second states make it possible to realize an echo-reduced interactive speech communication among far-end speakers and near-end speakers in at least two conference rooms distant from each other and each having therein a hand-free speakerphone provided to enable both the speakers to speak and listen with no handset microphone-speaker unit.

As will be seen from the foregoing description, the echo sound signal suppressing apparatus can provide an echo sound signal suppressing apparatus which can enhance the quality of the second sound from the near-end speaker to be received by the far-end speaker by discriminating the second sound signal component from the echo sound signal component and the outside noise signal generated in the neighborhood of the near-end speaker.

Also, the echo sound signal suppressing apparatus can provide an echo sound signal suppressing apparatus which can suppress the echo sound signal component and the outside noises signal to a minimum level to realize echo and noises reduced interactive speech communication between the far-end speaker and the near-end speaker without the echo and noises and with the clear sound received by the far-end speaker.

While the subject invention has been described with relation to the preferred embodiments, various modifications and adaptations thereof will now be apparent to those skilled in the art as far as such modifications and adaptations fall within the scope of the appended claims intended to be covered thereby.

What is claimed is:

1. An echo sound signal suppressing apparatus for suppressing an echo sound signal to ensure speech communication between a far-end speaker and a near-end speaker, comprising:

a loudspeaker for outputting a first sound in its loudened state after converting a first sound signal from said far-end speaker to said first sound, said loudspeaker having an input terminal connected to a communication line to have said first sound signal pass therethrough, said first sound signal comprising a far-end speaker sound signal component indicative of a first sound from said far-end speaker, and a first noise signal component indicative of far-end outside noises generated in the neighborhood of said far-end speaker, said first noise signal component having a power value;

a microphone for inputting three different sounds before converting said three different sounds to a second sound signal, said three different sounds comprising a second sound from said near-end speaker, an echo sound indicative of said first sound reflected under the influence of the objects outside said near-end speaker, and near-end outside noises generated in the neighborhood of said near-end speaker, said second sound signal comprising a near-end speaker sound signal component indicative of said second sound from said near-end speaker, an echo sound signal component indicative of said echo sound, and a second noise signal component indicative of said near-end outside noises generated in the neighborhood of said near-end speaker, said second sound signal having a power value, and said second noise signal component having a power value;

echo replica sound signal producing means for producing an echo replica sound signal with said first sound signal and said second sound signal, said echo replica sound signal having a power value;

difference signal producing means for producing a difference signal by subtracting said echo replica sound signal from said second sound signal, said difference signal comprising said near-end speaker sound signal component and a difference signal component indicative of subtracting said echo replica sound signal from said second sound signal, and having a power value;

first power value calculating means for calculating said power value of said second sound signal;

second power value calculating means for calculating said power value of said echo replica sound signal produced by said echo replica sound signal producing means;

echo sound suppressing means for suppressing said echo sound difference signal component outputted from said difference signal producing means to a minimum level with said power value of said second sound signal calculated by said first power value calculating means and said power value of said echo replica sound signal calculated by second power value calculating means with said near-end speaker sound signal component being allowed to pass therethrough, said echo sound suppressing means having an output terminal to said communication line to output said near-end speaker sound signal component under the condition that said echo sound signal component is reduced to its smallest level.

2. An echo sound signal suppressing apparatus as set forth in claim 1, which further comprises first filtering means for filtering said second sound signal to be discharged to said first power value calculating means as a band-limited second sound signal indicative of said second sound having a frequency bandwidth limited to a predetermined frequency range; and second filtering means for filtering said echo replica signal to be discharged to said second power value calculating means as a band-limited echo replica signal indicative of said echo replica signal having a frequency bandwidth limited to a predetermined frequency range; and in which said first power value calculating means is operative to calculate said power value of said band-limited second sound signal of said sequential frame after receiving said band-limited second sound signal from said first filtering means; and said second power value calculating means is operative to calculate said power values of said band-limited echo replica sound signals of said sequential frames after receiving said band-limited echo replica sound signal from said second filtering means, echo sound suppressing means for suppressing said echo sound difference signal component outputted from said difference signal producing means to a minimum level with said power value of said band-limited second sound signal calculated by said first power value calculating means and said power value of said band-limited echo replica sound signal calculated by second power value calculating means with said near-end speaker sound signal component being allowed to pass therethrough, said echo sound suppressing means having an output terminal to said communication line to output said near-end speaker sound signal component under the condition that said echo sound signal component is reduced to its smallest level.

3. An echo sound signal suppressing apparatus as set forth in claim 1, which further comprises first sound signal dividing means for dividing said first sound signal into a plurality of sub-band section along a frequency axis of said first sound signal, said first sound signal of said sub-band section comprising a far-end speaker sound signal component of said sub-band section and a first noise signal component of said sub-band section;

second sound signal dividing means for dividing said second sound signal into a plurality of said sub-band section along said frequency axis of said second sound signal, said second sound signal of said sub-band section comprising a near-end speaker sound signal component of said sub-band section, an echo sound signal component of said sub-band section, and a second noise signal component of said sub-band section, said second noise signal component of said sub-band section having a power value of said sub-band section; and difference signal synthesizing means for synthesizing said difference signal after receiving said difference signals of said sub-band sections; and in which said echo replica sound signal producing means is operative to produce an echo replica sound signal of said sub-band section with said first sound signal of said sub-band section and said second sound signal of said sub-band section, said echo replica sound signal of said sub-band section having a power value of said sub-band section;

said difference signal producing means is operative to produce a difference signal of said sub-band section by subtracting said echo replica sound signal of said sub-band section from said second sound signal of said sub-band section, said difference signal of said sub-band section comprising a near-end speaker sound signal component of said sub-band section, a difference signal component of sub-band section indicative of subtracting said echo replica sound signal of said sub-band section from said second sound signal of said sub-band section, and said second noise signal component of said sub-band section, said difference signal of said sub-band section having a power value of said sub-band section;

said first power value calculating means is operative to calculate said power value of said second sound signal of said sub-band section;

said second power value calculating means is operative to calculate said power value of said echo replica sound signal of said sub-band section; and said echo sound suppressing means is operative to suppress said difference signal component of said sub-band section outputted from said difference signal producing means to a minimum level of said sub-band section with said power value of said second sound signal of said sub-band section calculated by said first power value calculating means and said power value of said echo replica sound signal of said sub-band section calculated by said second power value calculating means, said echo sound suppressing means having an output terminal to said communication line to output said near-end speaker sound signal component of said sub-band section under the condition that said echo sound signal component of said sub-band section is reduced to its smallest level of said sub-band section.

4. An echo sound signal suppressing apparatus as set forth in claim 1, which further comprises
attenuation signal producing means for producing an attenuation signal after receiving said power value of said second sound signal calculated by said first power value calculating means and said power value of said echo replica sound signal calculated by said second power value calculating means, and in which
said echo sound suppressing means is operative to suppress said difference signal component outputted from said difference signal producing means to a minimum level with said attenuation signal produced by said attenuation signal producing means.

5. An echo sound signal suppressing apparatus as set forth in claim 1, which further comprises
third power value calculating means for calculating said power value of said difference signal; and
fourth power value calculating means for calculating said power value of said second noise signal after receiving said power value of said second sound signal calculated by said first power value calculating means; and in which
said echo sound suppressing means is operative to suppress said difference signal component outputted from said difference signal producing means to a minimum level with said power value of said second sound signal calculated by said first power value calculating means, said power value of said echo replica sound signal calculated by said second power value calculating means, said power value of said difference sound signal calculated by third power value calculating means, and said power value of said second noise signal calculated by fourth power value calculating means.

6. An echo sound signal suppressing apparatus as set forth in claim 1, which further comprises
third power value calculating means for calculating said power value of said difference signal; and
fourth power value calculating means for calculating said power value of said second noise signal after receiving said power value of said difference signal calculated by said third power value calculating means; and in which
said echo sound suppressing means is operative to suppress said difference signal component outputted from said difference signal producing means to a minimum level with said power value of said second sound signal calculated by said first power value calculating means, said power value of said echo replica sound signal calculated by said second power value calculating means, said power value of said difference signal calculated by said third power value calculating means, and said power value of said second noise signal calculated by said fourth power value calculating means.

7. An echo sound signal suppressing apparatus as set forth in claim 1, which further comprises
third power value calculating means for calculating said power value of said difference signal;
fourth power value calculating means for calculating said power value of said second noise signal after receiving said power value of said second sound signal calculated by said first power value calculating means;
fifth power value calculating means for calculating said power value of said first sound signal; and
far-end speaker sound signal detecting means for detecting and judging whether or not said far-end speaker sound signal component is detected on the basis of said power value of said first sound signal calculated by said fifth power value calculating means; and in which
said echo sound suppressing means is operative to suppress said difference signal component outputted from said difference signal producing means to a minimum level with said power value of said second sound signal calculated by said first power value calculating means, said power value of said echo replica sound signal calculated by said second power value calculating means, said power value of said difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means.

8. An echo sound signal suppressing apparatus as set forth in claim 1, which further comprises
third power value calculating means for calculating said power value of said difference signal;
fourth power value calculating means for calculating said power value of said second noise signal after receiving said power value of said difference signal calculated by said third power value calculating means;
fifth power value calculating means for calculating said power value of said first sound signal; and
far-end speaker sound signal detecting means for detecting and judging whether or not said far-end speaker sound signal component is detected on the basis of said power value of said first sound signal calculated by said fifth power value calculating means; and in which
said echo sound suppressing means is operative to suppress said difference signal component outputted from said difference signal producing means to a minimum level with said power value of said second sound signal calculated by said first power value calculating means, said power value of said echo replica sound signal calculated by said second power value calculating means, said power value of said difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means.

9. An echo sound signal suppressing apparatus as set forth in claim 1, which further comprises
third power value calculating means for calculating said power value of said difference signal;
fourth power value calculating means for calculating said power value of said second noise signal after receiving said power value of said second sound signal calculated by said first power value calculating means;
a power value calculating unit for calculating said power values of said first sound signals after receiving said power value of said echo replica sound signal calculated by said second power value calculating means; and far-end speaker sound signal detecting means for detecting and judging whether or not said far-end speaker sound signal component is detected on the basis of said power value of said first sound signal calculated by said fifth power value calculating means; and in which said echo sound suppressing means is operative to suppress said difference signal component outputted from said difference signal producing means to a minimum level with said power value of said second sound signal calculated by said first power value calculating means, said power value of said echo replica sound signal calculated by said second power value calculating means, said power value of said difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means.

10. An echo sound signal suppressing apparatus as set forth in claim 1, which further comprises third power value calculating means for calculating said power value of said difference signal;

fourth power value calculating means for calculating said power value of said second noise signal after receiving said power value of said difference signal calculated by said third power value calculating means;

a power value calculating unit for calculating said power value of said first sound signal after receiving said power value of said echo replica sound signal calculated by said second power value calculating means; and far-end speaker sound signal detecting means for detecting and judging whether or not said far-end speaker sound signal component is detected on the basis of said power value of said first sound signal calculated by said fifth power value calculating means; and in which said echo sound suppressing means is operative to suppress said difference signal component outputted from said difference signal producing means to a minimum level with said power value of said second sound signal calculated by said first power value calculating means, said power value of said echo replica sound signal calculated by said second power value calculating means, said power value of said difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means.

11. An echo sound signal suppressing apparatus as set forth in claim 4, which further comprises third power value calculating means for calculating said power values of said difference signal; and fourth power value calculating means for calculating said power value of said second noise signal after receiving said power value of said second sound signal calculated by said first power value calculating means; and in which said attenuation signal producing means is operative to produce said attenuation signal after receiving said power value of said second sound signal calculated by said first power value calculating means, said power value of said echo replica sound signal calculated by said second power value calculating means, said power value of said difference sound signal calculated by third power value calculating means, and said power value of said second noise signal calculated by fourth power value calculating means; and said echo sound suppressing means is operative to suppress said difference signal component outputted from said difference signal producing means to a minimum level with said attenuation signal produced by said attenuation signal producing means.

12. An echo sound signal suppressing apparatus as set forth in claim 4, which further comprises third power value calculating means for calculating said power value of said difference signal; and fifth power value calculating means for calculating said power value of said second noise signal after receiving said power value of said difference signal calculated by said third power value calculating means; and in which said attenuation signal producing means is operative to produce said attenuation signal after receiving said power value of said second sound signal calculated by said first power value calculating means, said power value of said echo replica sound signal calculated by said second power value calculating means, said power value of said difference signal calculated by said third power value calculating means, and said power value of said second noise signal calculated by said fifth power value calculating means; and said echo sound suppressing means is operative to suppress said difference signal component outputted from said difference signal producing means to a minimum level with said attenuation signal produced by said attenuation signal producing means.

13. An echo sound signal suppressing apparatus as set forth in claim 4, which further comprises third power value calculating means for calculating said power value of said difference signal;

fourth power value calculating means for calculating said power value of said second noise signal after receiving said power value of said second sound signal calculated by said first power value calculating means;

fifth power value calculating means for calculating said power value of said first sound signal; and far-end speaker sound signal detecting means for detecting and judging whether or not said far-end speaker sound signal component is detected on the basis of said power value of said first sound signal calculated by said fifth power value calculating means; and in which said attenuation signal producing means is operative to produce said attenuation signal after receiving said power value of said second sound signal calculated by said first power value calculating means, said power value of said echo replica sound signal calculated by said second power value calculating means, said power value of said difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means; and said echo sound suppressing means is operative to suppress said echo sound difference signal component outputted from said difference signal producing means to a minimum level with said attenuation signal produced by said attenuation signal producing means.

14. An echo sound signal suppressing apparatus as set forth in claim 4, which further comprises third power value calculating means for calculating said power value of said difference signal;

fourth power value calculating means for calculating said power value of said second noise signal after receiving said power value of said difference signal calculated by said third power value calculating means;

fifth power value calculating means for calculating said power value of said first sound signal; and far-end speaker sound signal detecting means for detecting and judging whether or not said far-end speaker sound signal component is detected on the basis of said power value of said first sound signal calculated by said fifth power value calculating means; and in which said attenuation signal producing means is operative to produce an attenuation signal after receiving said power value of said second sound signal calculated by said first power value calculating means, said power value of said echo replica sound signal calculated by said second power value calculating means, said power value of said difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means; and said echo sound suppressing means is operative to suppress said echo sound difference signal component outputted from said difference signal producing means to a minimum level with said attenuation signal produced by said attenuation signal producing means.

15. An echo sound signal suppressing apparatus as set forth in claim 4, which further comprises third power value calculating means for calculating said power value of said difference signal;

fourth power value calculating means for calculating said power value of said second noise signal after receiving said power value of said second sound signal calculated by said first power value calculating means;

a power value calculating unit for calculating said power values of said first sound signals after receiving said power values of said echo replica sound signals calculated by said second power value calculating means; and far-end speaker sound signal detecting means for detecting and judging whether or not said far-end speaker sound signal component is detected on the basis of said power value of said first sound signal calculated by said fifth power value calculating means; and in which said attenuation signal producing means is operative to produce an attenuation signal after receiving said power value of said second sound signal of calculated by said first power value calculating means, said power value of said echo replica sound signal calculated by said second power value calculating means, said power value of said difference sound signal calculated by third power value calculating means, said power value of said second noise signal calculated by fourth power value calculating means, and said judgment whether or not said far-end speaker sound signal component is detected on the basis of said fifth power value of said first sound signal calculated by said power value calculating unit; and said echo sound suppressing means is operative to suppress said echo sound difference signal component outputted from said difference signal producing means to a minimum level with said attenuation signal produced by said attenuation signal producing means.

16. An echo sound signal suppressing apparatus as set forth in claim 4, which further comprises third power value calculating means for calculating said power value of said difference signal;

fourth power value calculating means for calculating said power value of said second noise signal after receiving said power values of said difference signal calculated by said third power value calculating means;

a power value calculating unit for calculating said power value of said first sound signal after receiving said power value of said echo replica sound signal calculated by said second power value calculating means; and far-end speaker sound signal detecting means for detecting and judging whether or not said far-end speaker sound signal component is detected on the basis of said power value of said first sound signal calculated by said fifth power value calculating means; and in which said attenuation signal producing means is operative to produce an attenuation signal after receiving said power value of said second sound signal calculated by said first power value calculating means, said power value of said echo replica sound signal calculated by said second power value calculating means, said power value of said difference sound signal calculated by third power value calculating means, said power value of said second noise signal calculated by fourth power value calculating means, and said judgment whether or not said far-end speaker sound signal component is detected on the basis of said fifth power value of said first sound signal calculated by said power value calculating unit; and said echo sound suppressing means is operative to suppress said echo sound difference signal component outputted from said difference signal producing means to a minimum level with said attenuation signal produced by said attenuation signal producing means.

17. An echo sound signal suppressing apparatus as set forth in claim 1, in which said echo replica sound signal producing means, comprises a first filter unit for producing a first echo replica sound signal;

a second filter unit for producing an echo replica sound signal;

a retry signal producing unit for producing a retry signal on the basis of both said first echo replica sound signal and said second sound signal after receiving both said first echo replica sound signal from said first filter unit and said second sound signal;

a first filter coefficient judging unit for judging whether or not to update a first filter coefficient after calculating said first filter coefficient based on both said first sound signal and said retry signal, said first filter coefficient having said first filter unit produce said first echo replica sound signal together with said first sound signal; and a second filter coefficient judging unit for judging whether or not to update said first filter coefficient after receiving said first filter coefficient judged by said first filter coefficient judging unit.

18. An echo sound signal suppressing apparatus as set forth in claim 1, in which said first power value calculating means is operative to divide said second sound signal into a plurality of sequential frames along a time axis to calculate said power value of said second sound signal of said sequential frame;

said second power value calculating means is operative to divide said echo replica sound signal into a plurality of said sequential frames along a time axis to calculate said power value of said echo replica sound signal of said sequential frame produced by said echo replica sound signal producing means; and said echo sound suppressing means is operative to suppress said echo sound difference signal component outputted from said difference signal producing means to a minimum level based on said power value of said second sound signal of said sequential frame calculated by said first power value calculating means and said power value of said echo replica sound signal of said sequential frame calculated by second power value calculating means with said near-end speaker sound signal component being allowed to pass therethrough.

19. An echo sound signal suppressing apparatus as set forth in claim 4, in which said first power value calculating means is operative to divide said second sound signal into a plurality of sequential frames along a time axis to calculate said power value of said second sound signal of said sequential frame;

said second power value calculating means is operative to divide said echo replica sound signal into a plurality of said sequential frames along a time axis to calculate said power value of said echo replica sound signal of said sequential frame produced by said echo replica sound signal producing means;

said attenuation signal producing means is operative to produce an attenuation signal of said sequential frame after receiving said power value of said second sound signal of said sequential frame calculated by said first power value calculating means and said power value of said echo replica sound signal of said sequential frame calculated by said second power value calculating means; and said echo sound suppressing means is operative to suppress said difference signal component outputted from said difference signal producing means to a minimum level based on said attenuation signal of said sequential frame produced by said attenuation signal producing means.

20. An echo sound signal suppressing apparatus as set forth in claim 5, in which said first power value calculating means is operative to divide said second sound signal into a plurality of sequential frames along a time axis to calculate said power value of said second sound signal of said sequential frame, said power values of said second sound signals of said sequential frames having a power value of said second sound signal of said current frame and a power value of said second sound signal of said preceding frame;

said second power value calculating means is operative to divide said echo replica sound signal into a plurality of said sequential frames along a time axis to calculate said power value of said echo replica sound signal of said sequential frame produced by said echo replica sound signal producing means;

said third power value calculating means is operative to divide said difference signal into a plurality of sequential frames along a time axis to calculate said power value of said difference signal of said sequential frame produced by said difference signal producing means;

said fourth power value calculating means is operative to judge whether or not said power value of said second sound signal of said current frame exceeds said power value of said second sound signal of said preceding frame to calculate said power value of said second noise signal of said sequential frame after said fourth power value calculating means is operative to receive said power value of said second sound signal of said sequential frame calculated by said first power value calculating means; and said echo sound suppressing means is operative to suppress said difference signal component outputted from said difference signal producing means to a minimum level based on said power value of said second sound signal of said sequential frame calculated by said first power value calculating means, said power value of said echo replica sound signal of said sequential frame calculated by said second power value calculating means, said power value of said difference sound signal of said sequential frame calculated by third power value calculating means, and said power value of said second noise signal of said sequential frame calculated by fourth power value calculating means with said near-end speaker sound signal component being allowed to pass therethrough.

21. An echo sound signal suppressing apparatus as set forth in claim 11, in which said first power value calculating means is operative to divide said second sound signal into a plurality of sequential frames along a time axis to calculate said power value of said second sound signal of said sequential frame, said power values of said second sound signals of said sequential frames having a power value of said second sound signal of said current frame and a power value of said second sound signal of said preceding frame;

said second power value calculating means is operative to divide said echo replica sound signal into a plurality of said sequential frames along a time axis to calculate said power value of said echo replica sound signal of said sequential frame produced by said echo replica sound signal producing means;

said third power value calculating means is operative to divide said difference signal into a plurality of sequential frames along a time axis to calculate said power value of said difference signal of said sequential frame produced by said difference signal producing means;

said fourth power value calculating means is operative to judge whether or not said power value of said second sound signal of said current frame exceeds said power value of said second sound signal of said preceding frame to calculate said power value of said second noise signal of said sequential frame after said fourth power value calculating means is operative to receive said power value of said second sound signal of said sequential frame calculated by said first power value calculating means;

said attenuation signal producing means is operative to produce an attenuation signal of said sequential frame after receiving said power value of said second sound signal of said sequential frame calculated by said first power value calculating means, said power value of said echo replica sound signal of said sequential frame calculated by said second power value calculating means, said power value of said difference sound signal of said sequential frame calculated by third power value calculating means, and said power value of said second noise signal of said sequential frame calculated by fourth power value calculating means; and said echo sound suppressing means is operative to suppress said difference signal component outputted from said difference signal producing means to a minimum level with said attenuation signal of said sequential frame produced by said attenuation signal producing means.

22. An echo sound signal suppressing apparatus as set forth in claim 4, in which said attenuation signal producing means comprises a power value ratio calculating unit for calculating the ratio of said power value of said second sound signal of said sequential frame calculated by said first power value calculating means to said power value of said echo replica sound signal of said sequential frame calculated by said second power value calculating means, said ratios of said power value of said second sound signal of said sequential frame to said power value of said echo replica sound signal of said sequential frame calculated having a peak value, and said ratios of said power value of said second sound signal of said sequential frame to said power value of said echo replica sound signal of said sequential frame having a ratio of said power value of said second sound signal of said current frame to said power value of said echo replica sound signal of said current frame and a ratio of said power value of said second sound signal of said preceding frame to said power value of said echo replica sound signal of said preceding frame;

a peak value judging unit for judging whether or not said ratio of said power value of said second sound signal of said current frame to said power value of said echo replica sound signal of said current frame exceeds said ratio of said power value of said second sound signal of said preceding frame to said power value of said echo replica sound signal of said preceding frame to calculate a peak value of said ratio of said power value of said second sound signal of said sequential frame to said power value of said echo replica sound signal of said sequential frame; and an attenuation signal judging unit for judging whether or not said ratio of said power value of said second sound signal of said sequential frame to said power value of said echo replica sound signal of said sequential frame exceeds a predetermined threshold power value to calculate and produce an attenuation signal after receiving said power value of said second sound signal of said sequential frame calculated by said first power value calculating means, said power value of said echo replica sound signal of said sequential frame calculated by said second power value calculating means, and said peak value of said ratio of said power value of said second sound signal of said sequential frame to said power value of said echo replica sound signal of said sequential frame.

23. An echo sound signal suppressing apparatus as set forth in claim 5, in which said attenuation signal producing means comprises a power value ratio calculating unit for calculating the ratio of said power value of said second sound signal of said sequential frame calculated by said first power value calculating means to said power value of said echo replica sound signal of said sequential frame calculated by said second power value calculating means, said ratio of said power value of said second sound signal of said sequential frame to said power value of said echo replica sound signal of said sequential frame having a peak value, and said ratio of said power value of said second sound signal of said sequential frame to said power value of said echo replica sound signal of said sequential frame having the ratio of said power value of said second sound signal of said current frame to said power value of said echo replica sound signal of said current frame and the ratio of said power value of said second sound signal of said preceding frame to said power value of said echo replica sound signal of said preceding frame;

a peak value judging unit for judging whether or not said ratio of said power value of said second sound signal of said current frame to said power value of said echo replica sound signal of said current frame exceeds said ratio of said power value of said second sound signal of said preceding frame to said power value of said echo replica sound signal of said preceding frame to calculate a peak value of said ratio of said power value of said second sound signal of said sequential frame to said power value of said echo replica sound signal of said sequential frame; and an attenuation signal judging unit for judging whether or not said ratio of said power value of said second sound signal of said sequential frame to said power value of said echo replica sound signal of said sequential frame exceeds a predetermined threshold power value to calculate and produce an attenuation signal after receiving said power value of said second sound signal of said sequential frame calculated by said first power value calculating means, said power value of said echo replica sound signal of said sequential frame calculated by said second power value calculating means, said power value of said difference sound signal of said sequential frame calculated by third power value calculating means, said power value of said second noise signal of said sequential frame calculated by fourth power value calculating means, and said peak value of said ratio of said power value of said second sound signal of said sequential frame to said power value of said echo replica sound signal of said sequential frame.

24. An echo sound signal suppressing apparatus as set forth in claim 11, in which said attenuation signal producing means comprises a power value ratio calculating unit for calculating the ratio of said power value of said second sound signal of said sequential frame calculated by said first power value calculating means to said power value of said echo replica sound signal of said sequential frame calculated by said second power value calculating means, said ratio of said power value of said second sound signal of said sequential frame to said power value of said echo replica sound signal of said sequential frame having a peak value, and said ratio of said power value of said second sound signal of said sequential frame to said power value of said echo replica sound signal of said sequential frame having the ratio of said power value of said second sound signal of said current frame to said power value of said echo replica sound signal of said current frame and the ratio of said power value of said second sound signal of said preceding frame to said power value of said echo replica sound signal of said preceding frame;

a peak value judging unit for judging whether or not said ratio of said power value of said second sound signal of said current frame to said power value of said echo replica sound signal of said current frame exceeds said ratio of said power value of said second sound signal of said preceding frame to said power value of said echo replica sound signal of said preceding frame to calculate a peak value of said ratio of said power value of said second sound signal of said sequential frame to said power value of said echo replica sound signal of said sequential frame; and an attenuation signal judging unit for judging whether or not said ratio of said power value of said second sound signal of said sequential frame to said power value of said echo replica sound signal of said sequential frame exceeds a predetermined threshold power value to calculate and produce an attenuation signal after receiving said power value of said second sound signal of said sequential frame calculated by said first power value calculating means, said power value of said echo replica sound signal of said sequential frame calculated by said second power value calculating means, said power value of said difference signal of said sequential frame calculated by said third power value calculating means, said power value of said second noise signal of said sequential frame calculated by said fourth power value calculating means, said power value of said first sound signal of said sequential frame calculated by said power value calculating unit, and said peak value of said ratio of said power value of said second sound signal of said sequential frame to said power value of said echo replica sound signal of said sequential frame.

25. An echo sound signal suppressing apparatus as set forth in claim 22, which further comprises said attenuation signal obtaining means for obtaining an attenuation signal of current frame through the steps of calculating: an addition of a square root A to a difference multiplied by a predetermined value, said difference being indicative of the difference between said square root A and a square root B, said square root A being indicative of the square root of the ratio of said power value of said second noise signal of said current frame to said power value of said difference signal of said current frame, and said square root B being indicative of the square root of the ratio of said power value of said second noise signal component of said preceding frame to said power value of said difference signal of said preceding frame.

26. An echo sound signal suppressing apparatus as set forth in claim 2, which further comprises attenuation signal producing means for producing an attenuation signal after receiving said power value of said band-limited second sound signal calculated by said first power value calculating means and said power value of said band-limited echo replica sound signal calculated by said second power value calculating means; and in which said echo sound suppressing means is operative to suppress said difference signal component outputted from said difference signal producing means to a minimum level based on said attenuation signal produced by said attenuation signal producing means.

27. An echo sound signal suppressing apparatus as set forth in claim 2, which further comprises third filtering means for filtering said difference signal to output a band-limited difference signal having a frequency bandwidth limited to a predetermined frequency range;

third power value calculating, means for calculating said power values of said band-limited difference signal; and fourth power value calculating means for calculating said power value of said second noise signal after receiving said power value of said band-limited second sound signal calculated by said first power value calculating means; and in which said echo sound suppressing means is operative to suppress said difference signal component outputted from said difference signal producing means to a minimum level based on said power value of said band-limited second sound signal calculated by said first power value calculating means, said power value of said band-limited echo replica sound signal calculated by said second power value calculating means, said power value of said band-limited difference sound signal calculated by third power value calculating means, and said power value of said second noise signal calculated by fourth power value calculating means.

28. An echo sound signal suppressing apparatus as set forth in claim 2, which further comprises third power value calculating means for calculating said power value of said band-limited difference signal; and fifth power value calculating means for calculating said power value of said second noise signal after receiving said power value of said band-limited difference signal calculated by said third power value calculating means; and in which said echo sound suppressing means is operative to suppress said difference signal component outputted from said difference signal producing means to a minimum level based on said power value of said band-limited second sound signal calculated by said first power value calculating means, said power value of said band-limited echo replica sound signal calculated by said second power value calculating means, said power value of said band-limited difference signal calculated by said third power value calculating means, and said power value of said second noise signal calculated by said fifth power value calculating means.

29. An echo sound signal suppressing apparatus as set forth in claim 2, which further comprises third power value calculating means for calculating said power value of said band-limited difference signal;

fourth power value calculating means for calculating said power value of said second noise signal after receiving said power value of said band-limited second sound signal calculated by said first power value calculating means;

fifth power value calculating means for calculating said power value of said first sound signal; and far-end speaker sound signal detecting means for detecting and judging whether or not said far-end speaker sound signal component is detected on the basis of said power value of said first sound signal calculated by said fifth power value calculating means; and in which said echo sound suppressing means is operative to suppress said difference signal component outputted from said difference signal producing means to a minimum level based on said power value of said band-limited second sound signal calculated by said first power value calculating means, said power value of said band-limited echo replica sound signal calculated by said second power value calculating means, said power value of said band-limited difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means.

30. An echo sound signal suppressing apparatus as set forth in claim 2, which further comprises third power value calculating means for calculating said power value of said band-limited difference signal;

fourth power value calculating means for calculating said power value of said second noise signal after receiving said power value of said band-limited difference signal calculated by said third power value calculating means;

fifth power value calculating means for calculating said power value of said first sound signal; and far-end speaker sound signal detecting means for detecting and judging whether or not said far-end speaker sound signal component is detected on the basis of said power value of said first sound signal calculated by said fifth power value calculating means; and in which said echo sound suppressing means is operative to suppress said difference signal component outputted from said difference signal producing means to a minimum level based on said power value of said second sound signal calculated by said first power value calculating means, said power value of said band-limited echo replica sound signal calculated by said second power value calculating means, said power value of said band-limited difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means.

31. An echo sound signal suppressing apparatus as set forth in claim 2, which further comprises third power value calculating means for calculating said power value of said band-limited difference signal;

fourth power value calculating means for calculating said power value of said second noise signal after receiving said power value of said band-limited second sound signal calculated by said first power value calculating means;

fifth power value calculating means for calculating said power values of said first sound signals after receiving said power values of said band-limited echo replica sound signals calculated by said second power value calculating means; and far-end speaker sound signal detecting means for detecting and judging whether or not said far-end speaker sound signal component is detected on the basis of said power value of said first sound signal calculated by said fifth power value calculating means; and in which said echo sound suppressing means is operative to suppress said difference signal component outputted from said difference signal producing means to a minimum level based on said power value of said band-limited second sound signal calculated by said first power value calculating means, said power value of said band-limited echo replica sound signal calculated by said second power value calculating means, said power value of said band-limited difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means.

32. An echo sound signal suppressing apparatus as set forth in claim 2, which further comprises third power value calculating means for calculating said power value of said band-limited difference signal;

fourth power value calculating means for calculating said power value of said second noise signal after receiving said power values of said band-limited difference signal calculated by said third power value calculating means;

fifth power value calculating means for calculating said power value of said first sound signal after receiving said power value of said band-limited echo replica sound signal calculated by said second power value calculating means; and far-end speaker sound signal detecting means for detecting and judging whether or not said far-end speaker sound signal component is detected on the basis of said power value of said first sound signal calculated by said fifth power value calculating means; and in which said echo sound suppressing means is operative to suppress said difference signal component outputted from said difference signal producing means to a minimum level based on said power value of said band-limited second sound signal calculated by said first power value calculating means, said power value of said band-limited echo replica sound signal calculated by said second power value calculating means, said power value of said band-limited difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means.

33. An echo sound signal suppressing apparatus as set forth in claim 4, which further comprises third power value calculating means for calculating said power value of said band-limited difference signal; and fourth power value calculating means for calculating said power value of said second noise signal after receiving said power value of said band-limited second sound signal calculated by said first power value calculating means; and in which said attenuation signal producing means is operative to produce said attenuation signal after receiving said power value of said band-limited second sound signal calculated by said first power value calculating means, said power value of said band-limited echo replica sound signal calculated by said second power value calculating means, said power value of said band-limited difference sound signal calculated by third power value calculating means, and said power value of said second noise signal calculated by fourth power value calculating means; and said echo sound suppressing means is operative to suppress said difference signal component outputted from said difference signal producing means to a minimum level based on said attenuation signal produced by said attenuation signal producing means.

34. An echo sound signal suppressing apparatus as set forth in claim 4, which further comprises third power value calculating means for calculating said power value of said band-limited difference signal; and fifth power value calculating means for calculating said power value of said second noise signal after receiving said power value of said band-limited difference signal calculated by said third power value calculating means; and in which said attenuation signal producing means is operative to produce said attenuation signal after receiving said power value of said band-limited second sound signal calculated by said first power value calculating means, said power value of said band-limited echo replica sound signal calculated by said second power value calculating means, said power value of said band-limited difference signal calculated by said third power value calculating means, and said power value of said second noise signal calculated by said fifth power value calculating means; and said echo sound suppressing means is operative to suppress said difference signal component outputted from said difference signal producing means to a minimum level based on said attenuation signal produced by said attenuation signal producing means.

35. An echo sound signal suppressing apparatus as set forth in claim 4, which further comprises third power value calculating means for calculating said power value of said band-limited difference signal;

fourth power value calculating means for calculating said power value of said second noise signal after receiving said power value of said band-limited second sound signal calculated by said first power value calculating means;

fifth power value calculating means for calculating said power value of said first sound signal; and far-end speaker sound signal detecting means for detecting and judging whether or not said far-end speaker sound signal component is detected on the basis of said power value of said first sound signal calculated by said fifth power value calculating means; and in which said attenuation signal producing means is operative to produce said attenuation signal after receiving said power value of said band-limited second sound signal calculated by said first power value calculating means, said power value of said band-limited echo replica sound signal calculated by said second power value calculating means, said power value of said band-limited difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means; and said echo sound suppressing means is operative to suppress said echo sound difference signal component outputted from said difference signal producing means to a minimum level based on said attenuation signal produced by said attenuation signal producing means.

36. An echo sound signal suppressing apparatus as set forth in claim 4, which further comprises third power value calculating means for calculating said power value of said band-limited difference signal;

fourth power value calculating means for calculating said power value of said second noise signal after receiving said power value of said band-limited difference signal calculated by said third power value calculating means;

fifth power value calculating means for calculating said power value of said first sound signal; and far-end speaker sound signal detecting means for detecting and judging whether or not said far-end speaker sound signal component is detected on the basis of said power value of said first sound signal calculated by said fifth power value calculating means; and in which said attenuation signal producing means is operative to produce an attenuation signal after receiving said power value of said band-limited second sound signal calculated by said first power value calculating means, said power value of said band-limited echo replica sound signal calculated by said second power value calculating means, said power value of said band-limited difference sound signal calculated by third power value calculating means, said power values of said second noise signal calculated by fourth power value calculating means; and said judgment whether or not said far-end speaker sound signal component is detected on the basis of said fifth power value of said first sound signal calculated by said fifth power value calculating means; and said echo sound suppressing means is operative to suppress said echo sound difference signal component outputted from said difference signal producing means to a minimum level based on said attenuation signal produced by said attenuation signal producing means.

37. An echo sound signal suppressing apparatus as set forth in claim 4, which further comprises third power value calculating means for calculating said power value of said band-limited difference signal;

fourth power value calculating means for calculating said power value of said second noise signal after receiving said power value of said band-limited second sound signal calculated by said first power value calculating means;

a power value calculating unit for calculating said power value of said first sound signal after receiving said power value of said band-limited echo replica sound signal calculated by said second power value calculating means; and far-end speaker sound signal detecting means for detecting and judging whether or not said far-end speaker sound signal component is detected on the basis of said power value of said first sound signal calculated by said fifth power value calculating means; and in which said attenuation signal producing means is operative to produce an attenuation signal after receiving said power value of said band-limited second sound signal of calculated by said first power value calculating means, said power value of said band-limited echo replica sound signal calculated by said second power value calculating means, said power value of said band-limited difference sound signal calculated by third power value calculating means, said power value of said second noise signal calculated by fourth power value calculating means; and said judgment whether or not said far-end speaker sound signal component is detected on the basis of said fifth power value of said first sound signal calculated by said power value calculating unit; and said echo sound suppressing means is operative to suppress said echo sound difference signal component outputted from said difference signal producing means to a minimum level based on said attenuation signal produced by said attenuation signal producing means.

38. An echo sound signal suppressing apparatus as set forth in claim 4, which further comprises third power value calculating means for calculating said power value of said band-limited difference signal;

fourth power value calculating means for calculating said power value of said second noise signal after receiving said power value of said band-limited difference signal calculated by said third power value calculating means;

a power value calculating unit for calculating said power value of said first sound signal after receiving said power value of said band-limited echo replica sound signal calculated by said second power value calculating means; and far-end speaker sound signal detecting means for detecting and judging whether or not said far-end speaker sound signal component is detected on the basis of said power value of said first sound signal calculated by said fifth power value calculating means; and in which said attenuation signal producing means is operative to produce an attenuation signal after receiving said power value of said band-limited second sound signal calculated by said first power value calculating means, said power value of said band-limited echo replica sound signal calculated by said second power value calculating means, said power value of said band-limited difference sound signal calculated by third power value calculating means, said power value of said second noise signal calculated by fourth power value calculating means, and said judgment whether or not said far-end speaker sound signal component is detected on the basis of said fifth power value of said first sound signal calculated by said fifth power value calculating means; and said echo sound suppressing means is operative to suppress said echo sound difference signal component outputted from said difference signal producing means to a minimum level based on said attenuation signal produced by said attenuation signal producing means.

39. An echo sound signal suppressing apparatus as set forth in claim 1, in which said echo replica sound signal producing means, comprises a first filter unit for producing a first echo replica sound signal;

a second filter unit for producing an echo replica sound signal;

a retry signal producing unit for producing a retry signal on the basis of both said first echo replica sound signal and said second sound signal after receiving both said first echo replica sound signal from said first filter unit and said second sound signal;

a first filter coefficient judging unit for judging whether or not to update a first filter coefficient after calculating said first filter coefficient based on both said first sound signal and said retry signal, said first filter coefficient having said first filter unit produce said first echo replica sound signal together with said first sound signal; and a second filter coefficient judging unit for judging whether or not to update said first filter coefficient after receiving said first filter coefficient judged by said first filter coefficient judging unit.

40. An echo sound signal suppressing apparatus as set forth in claim 1, in which said first power value calculating means is operative to divide said second sound signal into a plurality of sequential frames along a time axis to calculate said power value of said band-limited second sound signal of said sequential frame;

said second power value calculating means is operative to divide said echo replica sound signal into a plurality of said sequential frames along a time axis to calculate said power value of said band-limited echo replica sound signal of said sequential frame produced by said echo replica sound signal producing means; and said echo sound suppressing means is operative to suppress said echo sound difference signal component outputted from said difference signal producing means to a minimum level based on said power value of said band-limited second sound signal of said sequential frame calculated by said first power value calculating means and said power value of said band-limited echo replica sound signal of said sequential frame calculated by second power value calculating means with said near-end speaker sound signal component being allowed to pass therethrough.

41. An echo sound signal suppressing apparatus as set forth in claim 4, in which said first power value calculating means is operative to divide said second sound signal into a plurality of sequential frames along a time axis to calculate said power value of said band-limited second sound signal of said sequential frame;

said second power value calculating means is operative to divide said echo replica sound signal into a plurality of said sequential frames along a time axis to calculate said power value of said band-limited echo replica sound signal of said sequential frame produced by said echo replica sound signal producing means;

said attenuation signal producing means is operative to produce an attenuation signal of said sequential frame after receiving said power value of said band-limited second sound signal of said sequential frame calculated by said first power value calculating means and said power value of said band-limited echo replica sound signal of said sequential frame calculated by said second power value calculating means; and said echo sound suppressing means is operative to suppress said difference signal component outputted from said difference signal producing means to a minimum level based on said attenuation signal of said sequential frame produced by said attenuation signal producing means.

42. An echo sound signal suppressing apparatus as set forth in claim 5, in which said first power value calculating means is operative to divide said second sound signal into a plurality of sequential frames along a time axis to calculate said power value of said band-limited second sound signal of said sequential frame, said power values of said band-limited second sound signals of said sequential frames having a power value of said second sound signal of said current frame and a power value of said second sound signal of said preceding frame;

said second power value calculating means is operative to divide said echo replica sound signal into a plurality of said sequential frames along a time axis to calculate said power value of said band-limited echo replica sound signal of said sequential frame produced by said echo replica sound signal producing means;

said third power value calculating means is operative to divide said difference signal into a plurality of sequential frames along a time axis to calculate said power value of said band-limited difference signal of said sequential frame produced by said difference signal producing means;

said fourth power value calculating means is operative to judge whether or not said power value of said band-limited second sound signal of said current frame exceeds said power value of said band-limited second sound signal of said preceding frame to calculate said power value of said second noise signal of said sequential frame after said fourth power value calculating means is operative to receive said power value of said band-limited second sound signal of said sequential frame calculated by said first power value calculating means; and said echo sound suppressing means is operative to suppress said difference signal component outputted from said difference signal producing means to a minimum level based on said power value of said band-limited second sound signal of said sequential frame calculated by said first power value calculating means, said power value of said band-limited echo replica sound signal of said sequential frame calculated by said second power value calculating means, said power value of said band-limited difference sound signal of said sequential frame calculated by third power value calculating means, and said power value of said second noise signal of said sequential frame calculated by fourth power value calculating means with said near-end speaker sound signal component being allowed to pass therethrough.

43. An echo sound signal suppressing apparatus as set forth in claim 11, in which said first power value calculating means is operative to divide said second sound signal into a plurality of sequential frames along a time axis to calculate said power value of said band-limited second sound signal of said sequential frame, said power values of said band-limited second sound signals of said sequential frames having a power value of said band-limited second sound signal of said current frame and a power value of said band-limited second sound signal of said preceding frame;

said second power value calculating means is operative to divide said echo replica sound signal into a plurality of said sequential frames along a time axis to calculate said power value of said band-limited echo replica sound signal of said sequential frame produced by said echo replica sound signal producing means;

said third power value calculating means is operative to divide said difference signal into a plurality of sequential frames along a time axis to calculate said power value of said band-limited difference signal of said sequential frame produced by said difference signal producing means;

said fourth power value calculating means is operative to judge whether or not said power value of said band-limited second sound signal of said current frame exceeds said power value of said band-limited second sound signal of said preceding frame to calculate said power value of said second noise signal of said sequential frame after said fourth power value calculating means is operative to receive said power value of said band-limited second sound signal of said sequential frame calculated by said first power value calculating means;

said attenuation signal producing means is operative to produce an attenuation signal of said sequential frame after receiving said power value of said band-limited second sound signal of said sequential frame calculated by said first power value calculating means, said power value of said band-limited echo replica sound signal of said sequential frame calculated by said second power value calculating means, said power value of said band-limited difference sound signal of said sequential frame calculated by third power value calculating means, and said power value of said second noise signal of said sequential frame calculated by fourth power value calculating means; and said echo sound suppressing means is operative to suppress said difference signal component outputted from said difference signal producing means to a minimum level based on said attenuation signal of said sequential frame produced by said attenuation signal producing means.

44. An echo sound signal suppressing apparatus as set forth in claim 4, in which said attenuation signal producing means comprises power value ratio calculating unit for calculating the ratio of said power value of said band-limited second sound signal of said sequential frame calculated by said first power value calculating means to said power value of said band-limited echo replica sound signal of said sequential frame calculated by said second power value calculating means, said ratios of said power value of said band-limited second sound signal of said sequential frame to said power value of said band-limited echo replica sound signal of said sequential frame calculated having a peak value, and said ratios of said power value of said band-limited second sound signal of said sequential frame to said power value of said band-limited echo replica sound signal of said sequential frame having a ratio of said power value of said band-limited second sound signal of said current frame to said power value of said band-limited echo replica sound signal of said current frame and a ratio of said power value of said band-limited second sound signal of said preceding frame to said power value of said band-limited echo replica sound signal of said preceding frame;

peak value judging unit for judging whether or not said ratio of said power value of said band-limited second sound signal of said current frame to said power value of said band-limited echo replica sound signal of said current frame exceeds said ratio of said power value of said band-limited second sound signal of said preceding frame to said power value of said band-limited echo replica sound signal of said preceding frame to calculate a peak value of said ratio of said power value of said band-limited second sound signal of said sequential frame to said power value of said band-limited echo replica sound signal of said sequential frame; and attenuation signal judging unit for judging whether or not said ratio of said power value of said band-limited second sound signal of said sequential frame to said power value of said band-limited echo replica sound signal of said sequential frame exceeds a predetermined threshold power value to produce an attenuation signal after receiving said power value of said band-limited second sound signal of said sequential frame calculated by said first power value calculating means, said power value of said band-limited echo replica sound signal of said sequential frame calculated by said second power value calculating means, and said peak value of said ratio of said power value of said band-limited second sound signal of said sequential frame to said power value of said band-limited echo replica sound signal of said sequential frame.

45. An echo sound signal suppressing apparatus as set forth in claim 5, in which said attenuation signal producing means comprises a power value ratio calculating unit for calculating the ratio of said power value of said band-limited second sound signal of said sequential frame calculated by said first power value calculating means to said power value of said band-limited echo replica sound signal of said sequential frame calculated by said second power value calculating means, said ratios of said power value of said band-limited second sound signal of said sequential frame to said power value of said band-limited echo replica sound signal of said sequential frame calculated having a peak value, and said ratios of said power value of said band-limited second sound signal of said sequential frame to said power value of said band-limited echo replica sound signal of said sequential frame having a ratio of said power value of said band-limited second sound signal of said current frame to said power value of said band-limited echo replica sound signal of said current frame and a ratio of said power value of said band-limited second sound signal of said preceding frame to said power value of said band-limited echo replica sound signal of said preceding frame;

a peak value judging unit for judging whether or not said ratio of said power value of said band-limited second sound signal of said current frame to said power value of said band-limited echo replica sound signal of said current frame exceeds said ratio of said power value of said band-limited second sound signal of said preceding frame to said power value of said band-limited echo replica sound signal of said preceding frame to calculate a peak value of said ratio of said power value of said band-limited second sound signal of said sequential frame to said power value of said band-limited echo replica sound signal of said sequential frame; and an attenuation signal judging unit for judging whether or not said ratio of said power value of said band-limited second sound signal of said sequential frame to said power value of said band-limited echo replica sound signal of said sequential frame exceeds a predetermined threshold power value to calculate and produce an attenuation signal after receiving said power value of said band-limited second sound signal of said sequential frame calculated by said first power value calculating means, said power value of said band-limited echo replica sound signal of said sequential frame calculated by said second power value calculating means, said power value of said band-limited difference sound signal of said sequential frame calculated by third power value calculating means, said power value of said second noise signal of said sequential frame calculated by fourth power value calculating means, and said peak value of said ratio of said power value of said band-limited second sound signal of said sequential frame to said power value of said band-limited echo replica sound signal of said sequential frame.

46. An echo sound signal suppressing apparatus as set forth in claim 11, in which said attenuation signal producing means comprises a power value ratio calculating unit for calculating the ratio of said power value of said band-limited second sound signal of said sequential frame calculated by said first power value calculating means to said power value of said band-limited echo replica sound signal of said sequential frame calculated by said second power value calculating means, said ratios of said power value of said band-limited second sound signal of said sequential frame to said power value of said band-limited echo replica sound signal of said sequential frame calculated having a peak value, and said ratios of said power value of said band-limited second sound signal of said sequential frame to said power value of said band-limited echo replica sound signal of said sequential frame having a ratio of said power value of said band-limited second sound signal of said current frame to said power value of said band-limited echo replica sound signal of said current frame and a ratio of said power value of said band-limited second sound signal of said preceding frame to said power value of said band-limited echo replica sound signal of said preceding frame;

a peak value judging unit for judging whether or not said ratio of said power value of said band-limited second sound signal of said current frame to said power value of said band-limited echo replica sound signal of said current frame exceeds said ratio of said power value of said band-limited second sound signal of said preceding frame to said power value of said band-limited echo replica sound signal of said preceding frame to calculate a peak value of said ratio of said power value of said band-limited second sound signal of said sequential frame to said power value of said band-limited echo replica sound signal of said sequential frame; and an attenuation signal judging unit for judging whether or not said ratio of said power value of said band-limited second sound signal of said sequential frame to said power value of said band-limited echo replica sound signal of said sequential frame exceeds a predetermined threshold power value to calculate and produce an attenuation signal after receiving said power value of said band-limited second sound signal of said sequential frame calculated by said first power value calculating means, said power value of said band-limited echo replica sound signal of said sequential frame calculated by said second power value calculating means, said power value of said band-limited difference signal of said sequential frame calculated by said third power value calculating means, said power value of said second noise signal of said sequential frame calculated by said fourth power value calculating means, said power value of said first sound signal of said sequential frame calculated by said power value calculating unit, and said peak value of said ratio of said power value of said band-limited second sound signal of said sequential frame to said power value of said band-limited echo replica sound signal of said sequential frame.

47. An echo sound signal suppressing apparatus as set forth in claim 44, which further comprises said attenuation signal obtaining means for obtaining an attenuation signal of current frame through the steps of calculating: an addition of a square root A to a difference multiplied by a predetermined value, said difference being indicative of the difference between said square root A and a square root B, said square root A being indicative of the square root of the ratio of said power value of said second noise signal of said current frame to said power value of said difference signal of said current frame, and said square root B being indicative of the square root of the ratio of said power value of said second noise signal component of said preceding frame to said power value of said difference signal of said preceding frame.

48. An echo sound signal suppressing apparatus as set forth in claim 3, which further comprises attenuation signal producing means for producing an attenuation signal of said sub-band section after receiving said power value of said second sound signal of said sub-band section calculated by said first power value calculating means and said power value of said echo replica sound signal of said sub-band section calculated by said second power value calculating means; and in which said echo sound suppressing means is operative to suppress said echo sound difference signal component of said sub-band section outputted from said difference signal producing means to a minimum level of said sub-band section based on said attenuation signal of said sub-band section produced by said attenuation signal producing means.

49. An echo sound signal suppressing apparatus as set forth in claim 3, which further comprises third power value calculating means for calculating said power values of said difference signal of said sub-band section; and fourth power value calculating means for calculating said power value of said second noise signal of said sub-band section after receiving said power value of said second sound signal of said sub-band section calculated by said first power value calculating means; and in which said echo sound suppressing means is operative to suppress said difference signal component of said sub-band section outputted from said difference signal producing means to a minimum level of said sub-band section based on said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, and said power value of said second noise signal of said sub-band section calculated by fourth power value calculating means.

50. An echo sound signal suppressing apparatus as set forth in claim 3, which further comprises third power value calculating means for calculating said power value of said difference signal of said sub-band section; and fifth power value calculating means for calculating said power value of said second noise signal of said sub-band section after receiving said power value of said difference signal of said sub-band section calculated by said third power value calculating means; and in which said echo sound suppressing means is operative to suppress said difference signal component of said sub-band section outputted from said difference signal producing means to a minimum level of said sub-band section based on said power value of said second sound signal of said sub-band section calculated by said first power value calculating means, said power value of said echo replica sound signal of said sub-band section calculated by said second power value calculating means band section calculated by said third power value calculating means, and said power value of said second noise signal of said sub-band section calculated by said fifth power value calculating means.

51. An echo sound signal suppressing apparatus as set forth in claim 3, which further comprises third power value calculating means for calculating said power value of said difference signal of said sub-band section;

fourth power value calculating means for calculating said power value of said second noise signal of said sub-band section after receiving said power value of said second sound signal of said sub-band section calculated by said first power value calculating means;

fifth power value calculating means for calculating said power value of said first sound signal of said sub-band section; and far-end speaker sound signal detecting means for detecting and judging whether or not said far-end speaker sound signal component of said sub-band section is detected on the basis of said power value of said first sound signal of said sub-band section calculated by said fifth power value calculating means; and in which said echo sound suppressing means is operative to suppress said difference signal component of said sub-band section outputted from said difference signal producing means to a minimum level of said sub-band section based on said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, said power values of said second noise signal of said sub-band section calculated by fourth power value calculating means, and said judgment whether or not said far-end speaker sound signal component of said sub-band section is detected on the basis of said fifth power value of said first sound signal of said sub-band section calculated by said fifth power value calculating means.

52. An echo sound signal suppressing apparatus as set forth in claim 3, which further comprises third power value calculating means for calculating said power value of said difference signal of said sub-band section;

fourth power value calculating means for calculating said power value of said second noise signal of said sub-band section after receiving said power value of said difference signal of said sub-band section calculated by said third power value calculating means;

fifth power value calculating means for calculating said power value of said first sound signal of said sub-band section; and far-end speaker sound signal detecting means for detecting and judging whether or not said far-end speaker sound signal component of said sub-band section is detected on the basis of said power value of said first sound signal of said sub-band section calculated by said fifth power value calculating means; and in which said echo sound suppressing means is operative to suppress said difference signal component of said sub-band section outputted from said difference signal producing means to a minimum level of said sub-band section based on said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, said power values of said second noise signal of said sub-band section calculated by fourth power value calculating means; and said judgment whether or not said far-end speaker sound signal component of said sub-band section is detected on the basis of said fifth power value of said first sound signal of said sub-band section calculated by said fifth power value calculating means.

53. An echo sound signal suppressing apparatus as set forth in claim 3, which further comprises third power value calculating means for calculating said power value of said difference signal of said sub-band section;

fourth power value calculating means for calculating said power value of said second noise signal of said sub-band section after receiving said power value of said second sound signal of said sub-band section calculated by said first power value calculating means;

a power value calculating unit for calculating said power value of said first sound signal of said sub-band section after receiving said power value of said echo replica sound signal of said sub-band section calculated by said second power value calculating means; and far-end speaker sound signal detecting means for detecting and judging whether or not said far-end speaker sound signal component of said sub-band section is detected on the basis of said power value of said first sound signal of said sub-band section calculated by said fifth power value calculating means; and in which said echo sound suppressing means is operative to suppress said difference signal component of said sub-band section outputted from said difference signal producing means to a minimum level of said sub-band section based on said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, said power values of said second noise signal of said sub-band section calculated by fourth power value calculating means; and said judgment whether or not said far-end speaker sound signal component of said sub-band section is detected on the basis of said fifth power value of said first sound signal of said sub-band section calculated by said fifth power value calculating means.

54. An echo sound signal suppressing apparatus as set forth in claim 3, which further comprises third power value calculating means for calculating said power value of said difference signal of said sub-band section;

fourth power value calculating means for calculating said power value of said second noise signal of said sub-band section after receiving said power values of said difference signal of said sub-band section calculated by said third power value calculating means;

a power value calculating unit for calculating said power value of said first sound signal of said sub-band section after receiving said power value of said echo replica sound signal of said sub-band section calculated by said second power value calculating means; and far-end speaker sound signal detecting means for detecting and judging whether or not said far-end speaker sound signal component of said sub-band section is detected on the basis of said power value of said first sound signal of said sub-band section calculated by said fifth power value calculating means; and in which said echo sound suppressing means is operative to suppress said difference signal component of said sub-band section outputted from said difference signal producing means to a minimum level of said sub-band section based on said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, said power values of said second noise signal of said sub-band section calculated by fourth power value calculating means, and said judgment whether or not said far-end speaker sound signal component of said sub-band section is detected on the basis of said fifth power value of said first sound signal of said sub-band section calculated by said fifth power value calculating means.

55. An echo sound signal suppressing apparatus as set forth in claim 4, which further comprises third power value calculating means for calculating said power values of said difference signal of said sub-band section; and fourth power value calculating means for calculating said power value of said second noise signal of said sub-band section after receiving said power value of said second sound signal of said sub-band section calculated by said first power value calculating means; and in which said attenuation signal producing means is operative to produce said attenuation signal of said sub-band section after receiving said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, and said power value of said second noise signal of said sub-band section calculated by fourth power value calculating means; and said echo sound suppressing means is operative to suppress said difference signal component of said sub-band section outputted from said difference signal producing means to a minimum level of said sub-band section based on said attenuation signal of said sub-band section produced by said attenuation signal producing means.

56. An echo sound signal suppressing apparatus as set forth in claim 4, which further comprises third power value calculating means for calculating said power value of said difference signal of said sub-band section; and fifth power value calculating means for calculating said power value of said second noise signal of said sub-band section after receiving said power value of said difference signal of said sub-band section calculated by said third power value calculating means; and in which said attenuation signal producing means is operative to produce said attenuation signal of said sub-band section after receiving said power value of said second sound signal of said sub-band section calculated by said first power value calculating means, said power value of said echo replica sound signal of said sub-band section calculated by said second power value calculating means, said power value of said difference signal of said sub-band section calculated by said third power value calculating means, and said power value of said second noise signal of said sub-band section calculated by said fifth power value calculating means; and said echo sound suppressing means is operative to suppress said difference signal component of said sub-band section outputted from said difference signal producing means to a minimum level of said sub-band section based on said attenuation signal of said sub-band section produced by said attenuation signal producing means.

57. An echo sound signal suppressing apparatus as set forth in claim 4, which further comprises third power value calculating means for calculating said power value of said difference signal of said sub-band section;

fourth power value calculating means for calculating said power value of said second noise signal of said sub-band section after receiving said power value of said second sound signal of said sub-band section calculated by said first power value calculating means;

fifth power value calculating means for calculating said power value of said first sound signal of said sub-band section; and far-end speaker sound signal detecting means for detecting and judging whether or not said far-end speaker sound signal component of said sub-band section is detected on the basis of said power value of said first sound signal of said sub-band section calculated by said fifth power value calculating means; and in which said attenuation signal producing means is operative to produce said attenuation signal of said sub-band section after receiving said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, said power values of said second noise signal of said sub-band section calculated by fourth power value calculating means; and said judgment whether or not said far-end speaker sound signal component of said sub-band section is detected on the basis of said fifth power value of said first sound signal of said sub-band section calculated by said fifth power value calculating means; and said echo sound suppressing means is operative to suppress said echo sound difference signal component of said sub-band section outputted from said difference signal producing means to a minimum level of said sub-band section based on said attenuation signal of said sub-band section produced by said attenuation signal producing means.

58. An echo sound signal suppressing apparatus as set forth in claim 4, which further comprises third power value calculating means for calculating said power value of said difference signal of said sub-band section;

fourth power value calculating means for calculating said power value of said second noise signal of said sub-band section after receiving said power value of said difference signal of said sub-band section calculated by said third power value calculating means;

fifth power value calculating means for calculating said power value of said first sound signal of said sub-band section; and far-end speaker sound signal detecting means for detecting and judging whether or not said far-end speaker sound signal component of said sub-band section is detected on the basis of said power value of said first sound signal of said sub-band section calculated by said fifth power value calculating means; and in which said attenuation signal producing means is operative to produce an attenuation signal of said sub-band section after receiving said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, said power values of said second noise signal of said sub-band section calculated by fourth power value calculating means; and said judgment whether or not said far-end speaker sound signal component of said sub-band section is detected on the basis of said fifth power value of said first sound signal of said sub-band section calculated by said fifth power value calculating means; and said echo sound suppressing means is operative to suppress said echo sound difference signal component of said sub-band section outputted from said difference signal producing means to a minimum level based on said attenuation signal of said sub-band section produced by said attenuation signal producing means.

59. An echo sound signal suppressing apparatus as set forth in claim 4, which further comprises third power value calculating means for calculating said power value of said difference signal of said sub-band section;

fourth power value calculating means for calculating said power value of said second noise signal of said sub-band section after receiving said power value of said second sound signal of said sub-band section calculated by said first power value calculating means;

a power value calculating unit for calculating said power values of said first sound signals of said sub-band section after receiving said power values of said echo replica sound signals of said sub-band section calculated by said second power value calculating means; and far-end speaker sound signal detecting means for detecting and judging whether or not said far-end speaker sound signal component of said sub-band section is detected on the basis of said power value of said first sound signal of said sub-band section calculated by said fifth power value calculating means; and in which said attenuation signal producing means is operative to produce an attenuation signal of said sub-band section after receiving said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, said power values of said second noise signal of said sub-band section calculated by fourth power value calculating means, and said judgment whether or not said far-end speaker sound signal component of said sub-band section is detected on the basis of said fifth power value of said first sound signal of said sub-band section calculated by said power value calculating unit; and said echo sound suppressing means is operative to suppress said echo sound difference signal component of said sub-band section outputted from said difference signal producing means to a minimum level of said sub-band section based on said attenuation signal of said sub-band section produced by said attenuation signal producing means.

60. An echo sound signal suppressing apparatus as set forth in claim 4, which further comprises third power value calculating means for calculating said power value of said difference signal of said sub-band section;

fourth power value calculating means for calculating said power value of said second noise signal of said sub-band section after receiving said power values of said difference signal of said sub-band section calculated by said third power value calculating means;

a power value calculating unit for calculating said power value of said first sound signal of said sub-band section after receiving said power value of said echo replica sound signal of said sub-band section calculated by said second power value calculating means; and far-end speaker sound signal detecting means for detecting and judging whether or not said far-end speaker sound signal component of said sub-band section is detected on the basis of said power value of said first sound signal of said sub-band section calculated by said fifth power value calculating means; and in which said attenuation signal producing means is operative to produce an attenuation signal of said sub-band section after receiving said power value of said second sound signal of said sub-band section calculated by said first power value calculating means, said power value of said echo replica sound signal of said sub-band section calculated by said second power value calculating means, said power value of said difference sound signal of said sub-band section calculated by third power value calculating means, said power value of said second noise signal of said sub-band section calculated by fourth power value calculating means, and said judgment whether or not said far-end speaker sound signal component of said sub-band section is detected on the basis of said fifth power value of said first sound signal of said sub-band section calculated by said power value calculating unit; and said echo sound suppressing means is operative to suppress said echo sound difference signal component of said sub-band section outputted from said difference signal producing means to a minimum level of said sub-band section based on said attenuation signal of said sub-band section produced by said attenuation signal producing means.

61. An echo sound signal suppressing apparatus as set forth in claim 3, in which said echo replica sound signal producing means, comprises a first filter unit for producing a first echo replica sound signal of said sub-band section;

a second filter unit for producing an echo replica sound signal of said sub-band section;

a retry signal producing unit for producing a retry signal of said sub-band section on the basis of both said first echo replica sound signal of said sub-band section and said second sound signal of said sub-band section after receiving both said first echo replica sound signal of said sub-band section from said first filter unit and said second sound signal of said sub-band section;

a first filter coefficient judging unit for judging whether or not to update a first filter coefficient of said sub-band section after calculating said first filter coefficient of said sub-band section based on both said first sound signal of said sub-band section and said retry signal of said sub-band section, said first filter coefficient of said sub-band section having said first filter unit produce said first echo replica sound signal of said sub-band section together with said first sound signal of said sub-band section; and a second filter coefficient judging unit for judging whether or not to update said first filter coefficient of said sub-band section after receiving said first filter coefficient of said sub-band section judged by said first filter coefficient judging unit.

62. An echo sound signal suppressing apparatus as set forth in claim 1, in which said first power value calculating means is operative to divide said second sound signal of said sub-band section into a plurality of sequential frames along a time axis to calculate said power value of said second sound signal of said sequential frame;

said second power value calculating means is operative to divide said echo replica sound signal into a plurality of said sub-band section of said sequential frames along a time axis to calculate said power value of said echo replica sound signal of said sub-band section of said sequential frame produced by said echo replica sound signal producing means; and said echo sound suppressing means is operative to suppress difference signal component of said sub-band section outputted from said difference signal producing means to a minimum level of said sub-band section based on said power value of said second sound signal of said sub-band section of said sequential frame calculated by said first power value calculating means and said power value of said echo replica sound signal of said sub-band section of said sequential frame calculated by second power value calculating means with said near-end speaker sound signal component of said sub-band section being allowed to pass therethrough.

63. An echo sound signal suppressing apparatus as set forth in claim 4, in which said first power value calculating means is operative to divide said second sound signal of said sub-band section into a plurality of sequential frames along a time axis to calculate said power value of said second sound signal of said sub-band section of said sequential frame;

said second power value calculating means is operative to divide said echo replica sound signal of said sub-band section into a plurality of said sequential frames along a time axis to calculate said power value of said echo replica sound signal of said sub-band section of said sequential frame produced by said echo replica sound signal producing means;

said attenuation signal producing means is operative to produce an attenuation signal of said sub-band section of said sequential frame after receiving said power value of said second sound signal of said sub-band section of said sequential frame calculated by said first power value calculating means and said power value of said echo replica sound signal of said sub-band section of said sequential frame calculated by said second power value calculating means; and said echo sound suppressing means is operative to suppress said difference signal component of said sub-band section outputted from said difference signal producing means to a minimum level of said sub-band section based on said attenuation signal of said sub-band section of said sequential frame produced by said attenuation signal producing means.

64. An echo sound signal suppressing apparatus as set forth in claim 5, in which said first power value calculating means is operative to divide said second sound signal of said sub-band section into a plurality of sequential frames along a time axis to calculate said power value of said second sound signal of said sub-band section of said sequential frame, said power values of said second sound signals of said sub-band sections of said sequential frames having a power value of said second sound signal of said current frame and a power value of said second sound signal of said sub-band section of said preceding frame;

said second power value calculating means is operative to divide said echo replica sound signal of said sub-band section into a plurality of said sequential frames along a time axis to calculate said power value of said echo replica sound signal of said sub-band section of said sequential frame produced by said echo replica sound signal producing means;

said third power value calculating means is operative to divide said difference signal of said sub-band section into a plurality of sequential frames along a time axis to calculate said power value of said difference signal of said sub-band section of said sequential frame produced by said difference signal producing means;

said fourth power value calculating means is operative to judge whether or not said power value of said second sound signal of said sub-band section of said current frame exceeds said power value of said second sound signal of said sub-band section of said preceding frame to calculate said power value of said second noise signal of said sub-band section of said sequential frame after said fourth power value calculating means is operative to receive said power value of said second sound signal of said sub-band section of said sequential frame calculated by said first power value calculating means; and said echo sound suppressing means is operative to suppress said difference signal component of said sub-band section outputted from said difference signal producing means to a minimum level of said sub-band section based on said power value of said second sound signal of said sub-band section of said sequential frame calculated by said first power value calculating means, said power value of said echo replica sound signal of said sub-band section of said sequential frame calculated by said second power value calculating means, said power value of said difference sound signal of said sub-band section of said sequential frame calculated by third power value calculating means, and said power value of said second noise signal of said sub-band section of said sequential frame calculated by fourth power value calculating means with said near-end speaker sound signal component of said sub-band section being allowed to pass therethrough.

65. An echo sound signal suppressing apparatus as set forth in claim 11, in which said first power value calculating means is operative to divide said second sound signal of said sub-band section into a plurality of sequential frames along a time axis to calculate said power value of said second sound signal of said sub-band section of said sequential frame, said power values of said second sound signals of said sub-band sections of said sequential frames having a power value of said second sound signal of said sub-band section of said current frame and a power value of said second sound signal of said sub-band section of said preceding frame;

said second power value calculating means is operative to divide said echo replica sound signal of said sub-band section into a plurality of said sequential frames along a time axis to calculate said power value of said echo replica sound signal of said sub-band section of said sequential frame produced by said echo replica sound signal producing means;

said third power value calculating means is operative to divide said difference signal of said sub-band section into a plurality of sequential frames along a time axis to calculate said power value of said difference signal of said sub-band section of said sequential frame produced by said difference signal producing means;

said fourth power value calculating means is operative to judge whether or not said power value of said second sound signal of said sub-band section of said current frame exceeds said power value of said second sound signal of said sub-band section of said preceding frame to calculate said power value of said second noise signal of said sub-band section of said sequential frame after said fourth power value calculating means is operative to receive said power value of said second sound signal of said sub-band section of said sequential frame calculated by said first power value calculating means;

said attenuation signal producing means is operative to produce an attenuation signal of said sub-band section of said sequential frame after receiving said power value of said second sound signal of said sub-band section of said sequential frame calculated by said first power value calculating means, said power value of said echo replica sound signal of said sub-band section of said sequential frame calculated by said second power value calculating means, said power value of said difference sound signal of said sub-band section of said sequential frame calculated by third power value calculating means, and said power value of said second noise signal of said sub-band section of said sequential frame calculated by fourth power value calculating means; and said echo sound suppressing means is operative to suppress said difference signal component of said sub-band section outputted from said difference signal producing means to a minimum level of said sub-band section based on said attenuation signal of said sub-band section of said sequential frame produced by said attenuation signal producing means.

66. An echo sound signal suppressing apparatus as set forth in claim 4, in which said attenuation signal producing means comprises power value ratio calculating unit for calculating the ratio of said power value of said second sound signal of said sub-band section of said sequential frame calculated by said first power value calculating means to said power value of said echo replica sound signal of said sub-band section of said sequential frame calculated by said second power value calculating means, said ratios of said power value of said second sound signal of said sub-band section of said sequential frame to said power value of said echo replica sound signal of said sub-band section of said sequential frame calculated having a peak value, and said ratios of said power value of said second sound signal of said sub-band section of said sequential frame to said power value of said echo replica sound signal of said sub-band section of said sequential frame having a ratio of said power value of said second sound signal of said sub-band section of said current frame to said power value of said echo replica sound signal of said sub-band section of said current frame and a ratio of said power value of said second sound signal of said sub-band section of said preceding frame to said power value of said echo replica sound signal of said sub-band section of said preceding frame;

peak value judging unit for judging whether or not said ratio of said power value of said second sound signal of said sub-band section of said current frame to said power value of said echo replica sound signal of said sub-band section of said current fame exceeds said ratio of said power value of said second sound signal of said sub-band section of said preceding frame to said power value of said echo replica sound signal of said sub-band section of said preceding frame to calculate a peak value of said ratio of said power value of said second sound signal of said sub-band section of said sequential frame to said power value of said echo replica sound signal of said sub-band section of said sequential frame; and attenuation signal judging unit for judging whether or not said ratio of said power value of said second sound signal of said sub-band section of said sequential frame to said power value of said echo replica sound signal of said sub-band section of said sequential frame exceeds a predetermined threshold power value of said sub-band section to produce an attenuation signal after receiving said power value of said second sound signal of said sub-band section of said sequential frame calculated by said first power value calculating means, said power value of said echo replica sound signal of said sub-band section of said sequential frame calculated by said second power value calculating means, and said peak value of said ratio of said power value of said sub-band section of said second sound signal of said sequential frame to said power value of said echo replica sound signal of said sub-band section of said sequential frame.

67. An echo sound signal suppressing apparatus as set forth in claim 5, in which said attenuation signal producing means comprises a power value ratio calculating unit for calculating the ratio of said power value of said second sound signal of said sub-band section of said sequential frame calculated by said first power value calculating means to said power value of said echo replica sound signal of said sub-band section of said sequential frame calculated by said second power value calculating means, said ratios of said power value of said second sound signal of said sub-band section of said sequential frame to said power value of said echo replica sound signal of said sub-band section of said sequential frame calculated having a peak value, and said ratios of said power value of said second sound signal of said sub-band section of said sequential frame to said power value of said echo replica sound signal of said sub-band section of said sequential frame having a ratio of said power value of said second sound signal of said sub-band section of said current frame to said power value of said echo replica sound signal of said sub-band section of said current frame and a ratio of said power value of said second sound signal of said sub-band section of said preceding frame to said power value of said echo replica sound signal of said sub-band section of said preceding frame;

a peak value judging unit for judging whether or not said ratio of said power value of said second sound signal of said sub-band section of said current frame to said power value of said echo replica sound signal of said sub-band section of said current frame exceeds said ratio of said power value of said second sound signal of said sub-band section of said preceding frame to said power value of said echo replica sound signal of said sub-band section of said preceding frame to calculate a peak value of said ratio of said power value of said second sound signal of said sub-band section of said sequential frame to said power value of said echo replica sound signal of said sub-band section of said sequential frame; and an attenuation signal judging unit for judging whether or not said ratio of said power value of said second sound signal of said sub-band section of said sequential frame to said power value of said echo replica sound signal of said sub-band section of said sequential frame exceeds a predetermined threshold power value of said sub-band section to calculate and produce an attenuation signal of said sub-band section after receiving said power value of said second sound signal of said sub-band section of said sequential frame calculated by said first power value calculating means, said power value of said echo replica sound signal of said sub-band section of said sequential frame calculated by said second power value calculating means, said power value of said difference sound signal of said sub-band section of said sequential frame calculated by third power value calculating means, said power value of said second noise signal of said sub-band section of said sequential frame calculated by fourth power value calculating means, and said peak value of said ratio of said power value of said second sound signal of said sub-band section of said sequential frame to said power value of said echo replica sound signal of said sub-band section of said sequential frame.

68. An echo sound signal suppressing apparatus as set forth in claim 11, in which said attenuation signal producing means comprises a power value ratio calculating unit for calculating the ratio of said power value of said second sound signal of said sub-band section of said sequential frame calculated by said first power value calculating means to said power value of said echo replica sound signal of said sub-band section of said sequential frame calculated by said second power value calculating means, said ratios of said power value of said second sound signal of said sub-band section of said sequential frame to said power value of said echo replica sound signal of said sub-band section of said sequential frame calculated having a peak value, and said ratios of said power value of said second sound signal of said sub-band section of said sequential frame to said power value of said echo replica sound signal of said sub-band section of said sequential frame having a ratio of said power value of said second sound signal of said sub-band section of said current frame to said power value of said echo replica sound signal of said sub-band section of said current frame and a ratio of said power value of said second sound signal of said sub-band section of said preceding frame to said power value of said echo replica sound signal of said sub-band section of said preceding frame;

a peak value judging unit for judging whether or not said ratio of said power value of said second sound signal of said sub-band section of said current frame to said power value of said echo replica sound signal of said sub-band section of said current frame exceeds said ratio of said power value of said second sound signal of said sub-band section of said preceding frame to said power value of said echo replica sound signal of said sub-band section of said preceding frame to calculate a peak value of said ratio of said power value of said second sound signal of said sub-band section of said sequential frame to said power value of said echo replica sound signal of said sub-band section of said sequential frame; and an attenuation signal judging unit for judging whether or not said ratio of said power value of said second sound signal of said sub-band section of said sequential frame to said power value of said echo replica sound signal of said sub-band section of said sequential frame exceeds a predetermined threshold power value of said sub-band section to calculate and produce an attenuation signal of said sub-band section after receiving said power value of said second sound signal of said sub-band section of said sequential frame calculated by said first power value calculating means, said power value of said echo replica sound signal of said sub-band section of said sequential frame calculated by said second power value calculating means, said power value of said difference signal of said sub-band section of said sequential frame calculated by said third power value calculating means, said power value of said second noise signal of said sub-band section of said sequential frame calculated by said fourth power value calculating means, said power value of said first sound signal of said sub-band section of said sequential fame calculated by said power value calculating unit, and said peak value of said ratio of said power value of said second sound signal of said sub-band section of said sequential frame to said power value of said echo replica sound signal of said sub-band section of said sequential frame.

69. An echo sound signal suppressing apparatus as set forth in claim 22, which further comprises said attenuation signal obtaining means for obtaining an attenuation signal of current frame through the steps of calculating: an addition of a square root A to a difference multiplied by a predetermined value, said difference being indicative of the difference a square root A and a square root B, a square root A being indicative of the square root of the ratio of said power value of said second noise signal of said current frame to said power value of said difference signal of said current frame, and a square root B being indicative of the square root of the ratio of said power value of said second noise signal component of said preceding frame to said power value of said difference signal of said preceding frame.

* * * * *

UNITED STATES PATENT AND TRADEMARK OFFICE
CERTIFICATE OF CORRECTION

PATENT NO. : 6,611,601 B2
DATED : August 26, 2003
INVENTOR(S) : Yasuhiro Terada et al.

It is certified that error appears in the above-identified patent and that said Letters Patent is hereby corrected as shown below:

Column 22,
Lines 12-13, please delete "(1)", and insert therefor -- (11) --.

Column 29,
Lines 38-42, please delete "*Kl*", and insert therefor -- K1 --.
Lines 38-42, please delete "*k-K0*", and insert therefor -- k=K0 --.
Lines 38-42, please delete "*i-0*", and insert therefor -- i=0 --.
Line 61-65, please delete "*Kl*", and insert -- K1 --.

Column 30,
Lines 15-19, please delete "*Kl*", and insert therefor -- K1 --.

Column 31,
Line 23, please delete "to, the", and insert therefor -- to the --.

Signed and Sealed this

Eleventh Day of May, 2004

JON W. DUDAS
*Acting Director of the United States Patent and Trademark Office*